March 20, 1934. E. W. SAUERMAN 1,951,445
MANUFACTURE OF ONE-PIECE WINDOW ENVELOPE BLANKS
Original Filed April 19, 1929 31 Sheets-Sheet 1
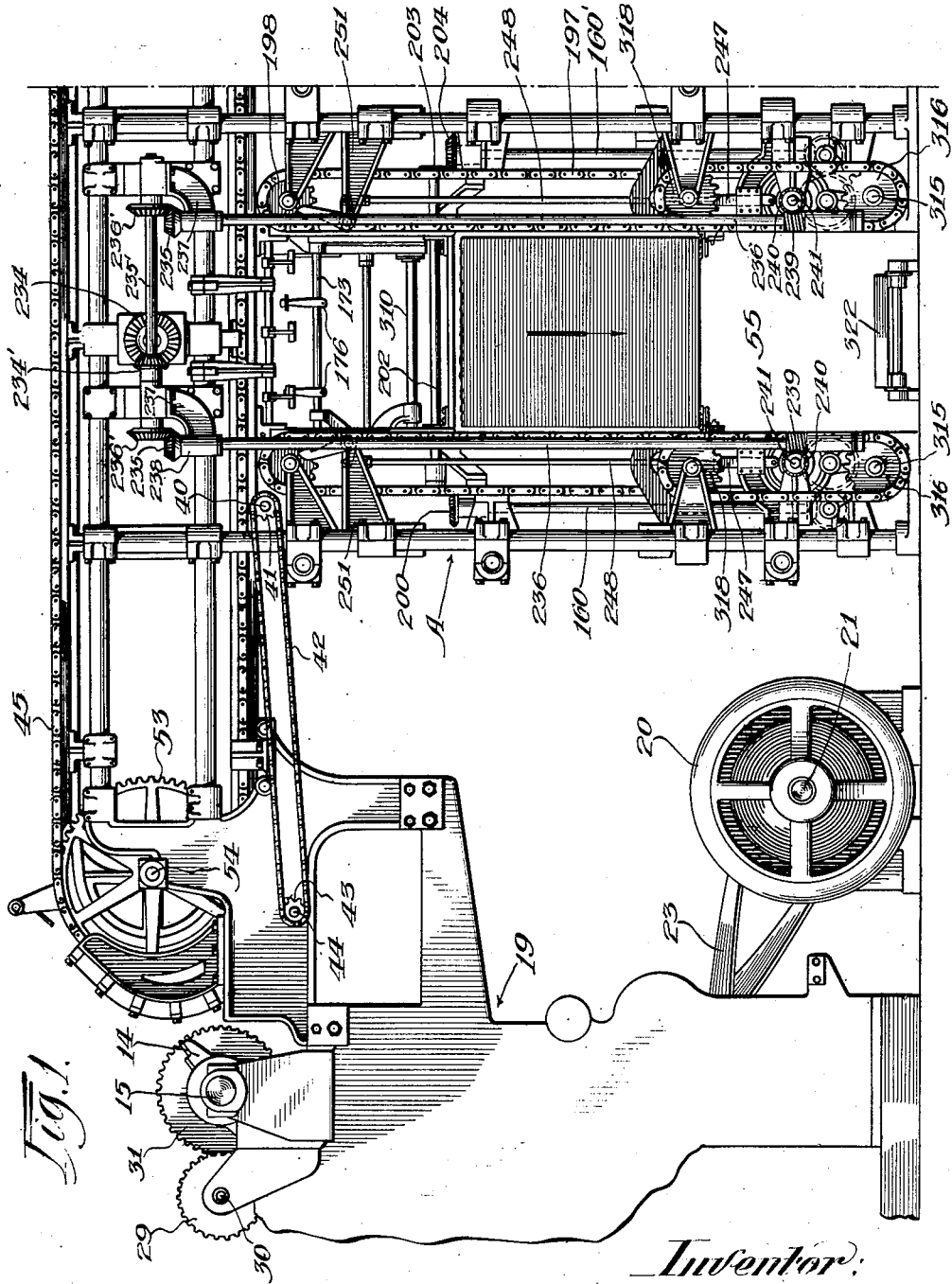

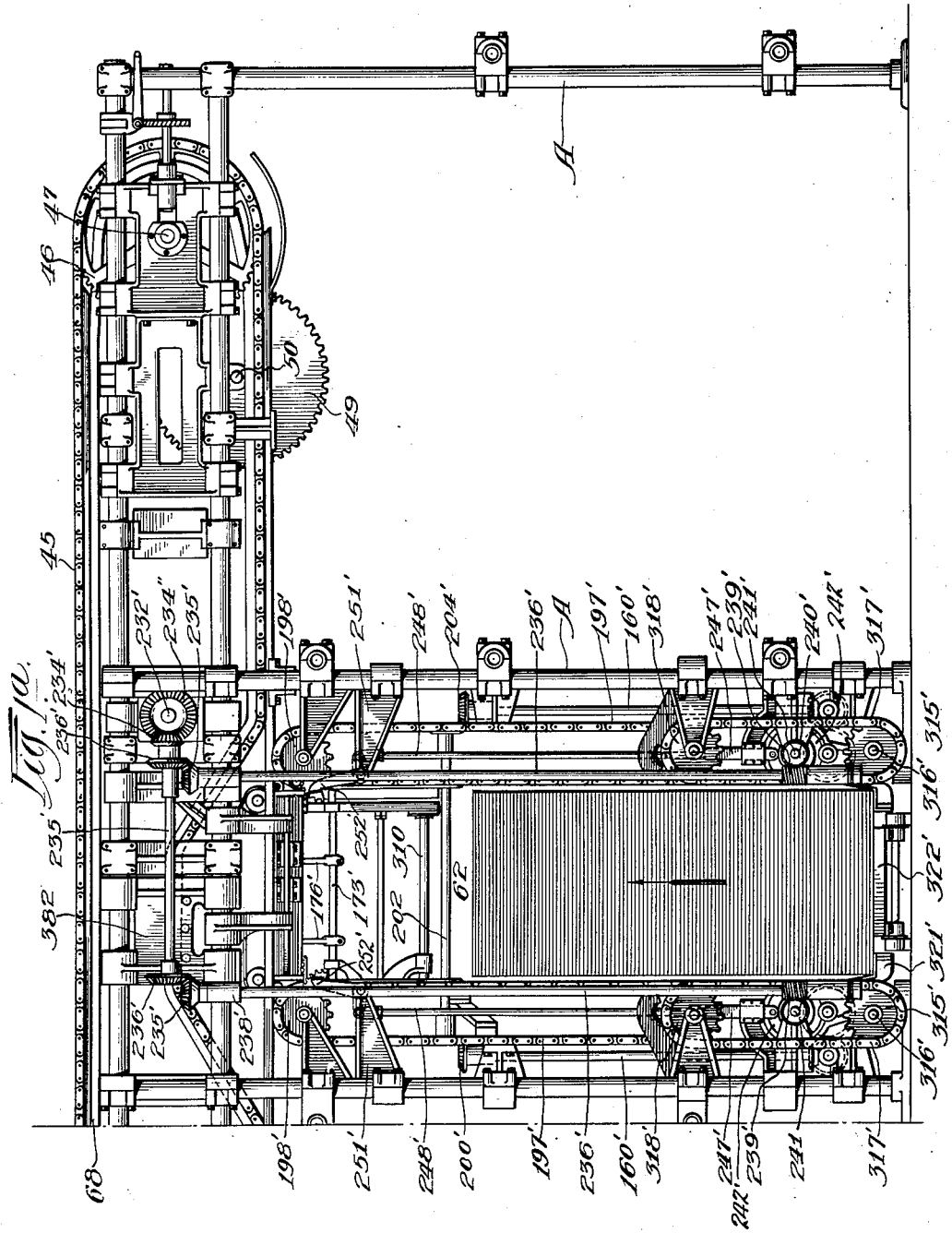

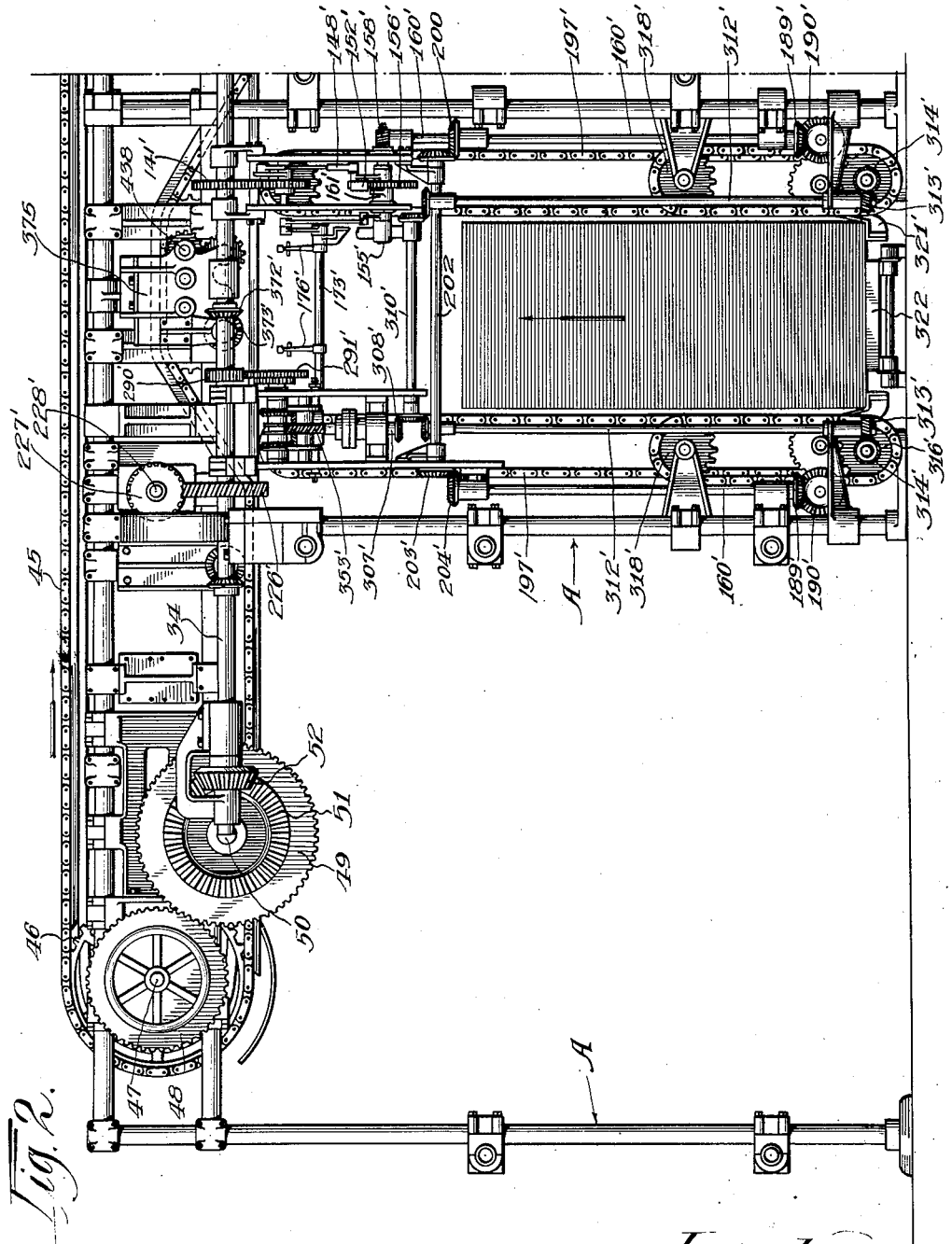

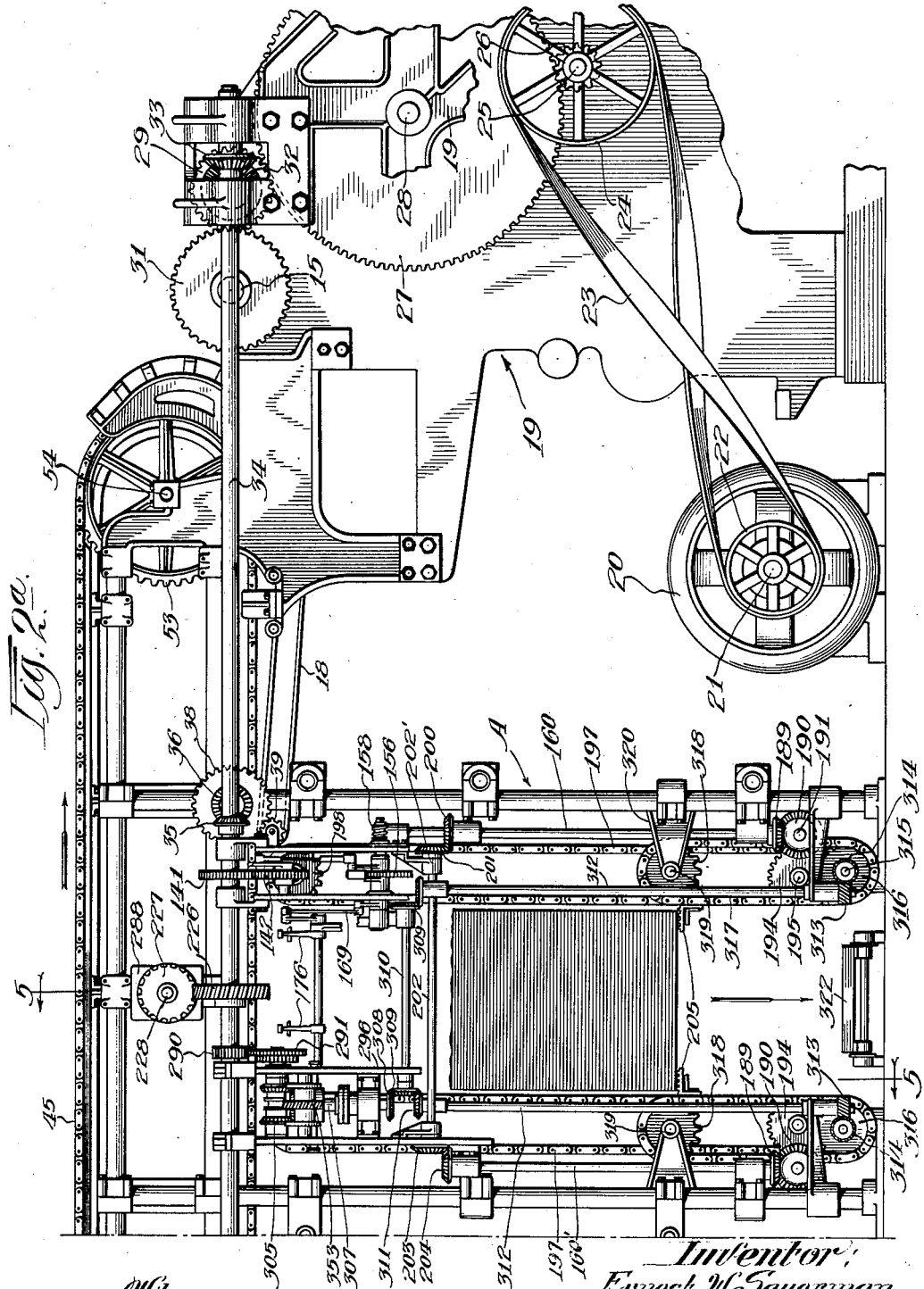

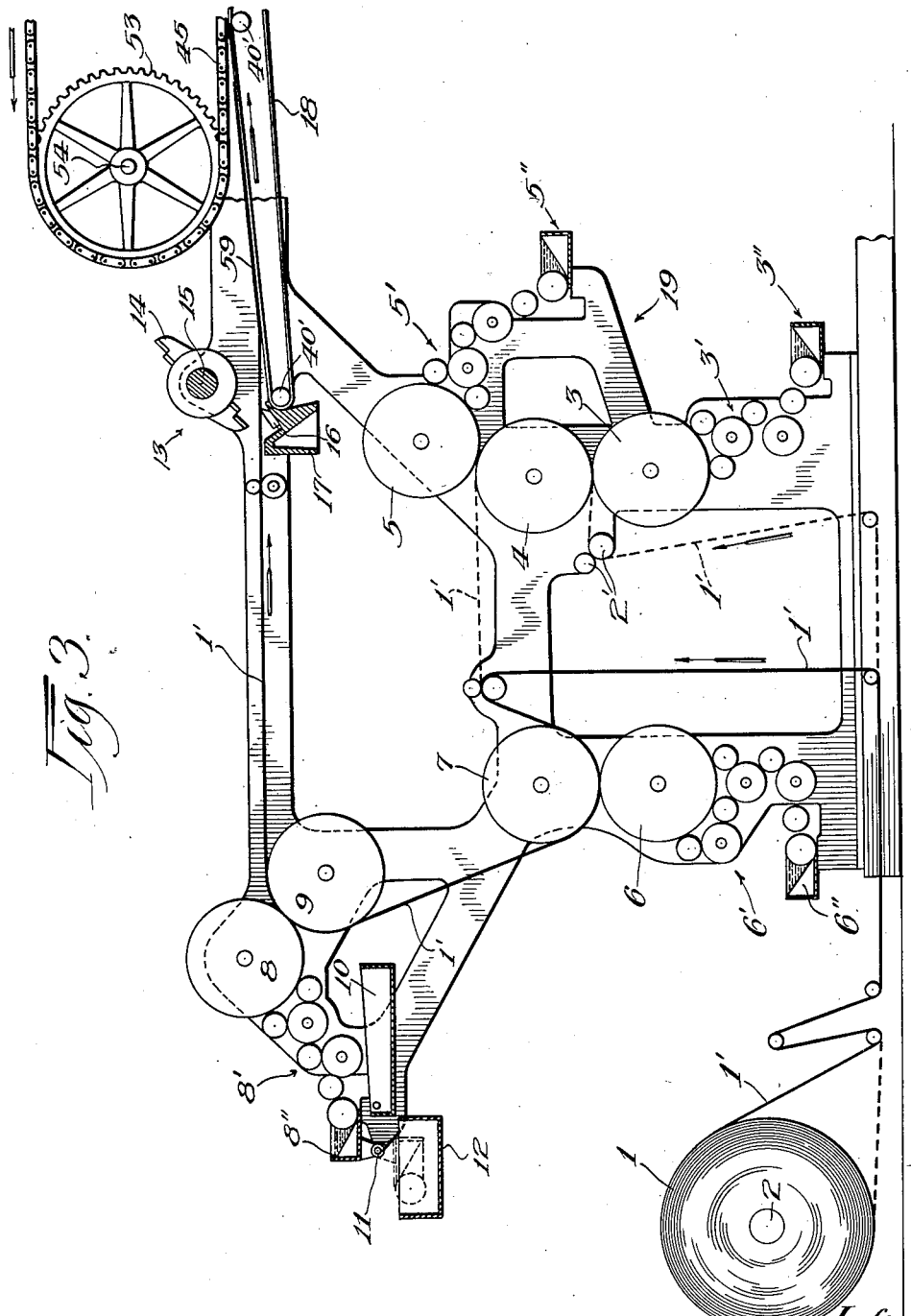

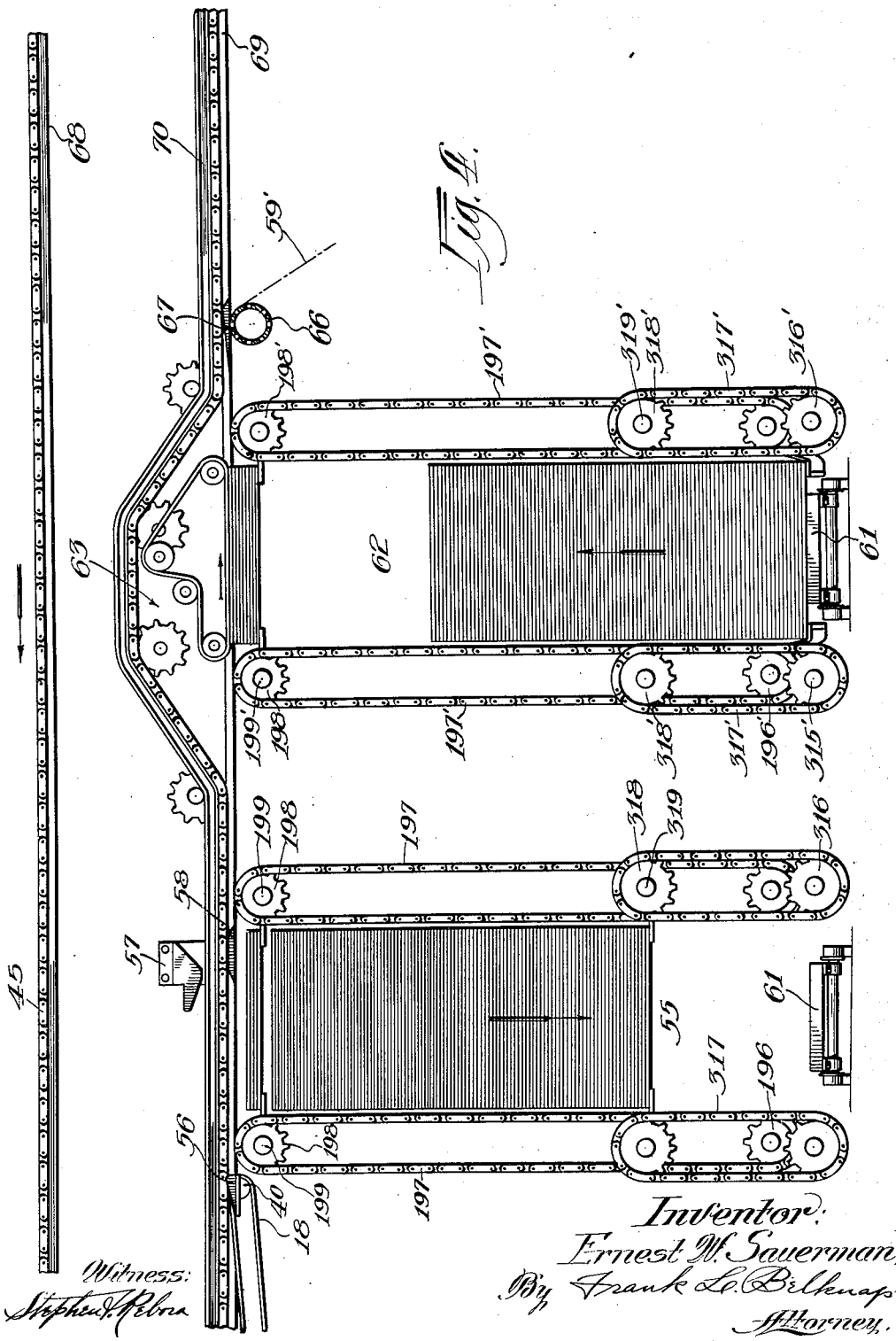

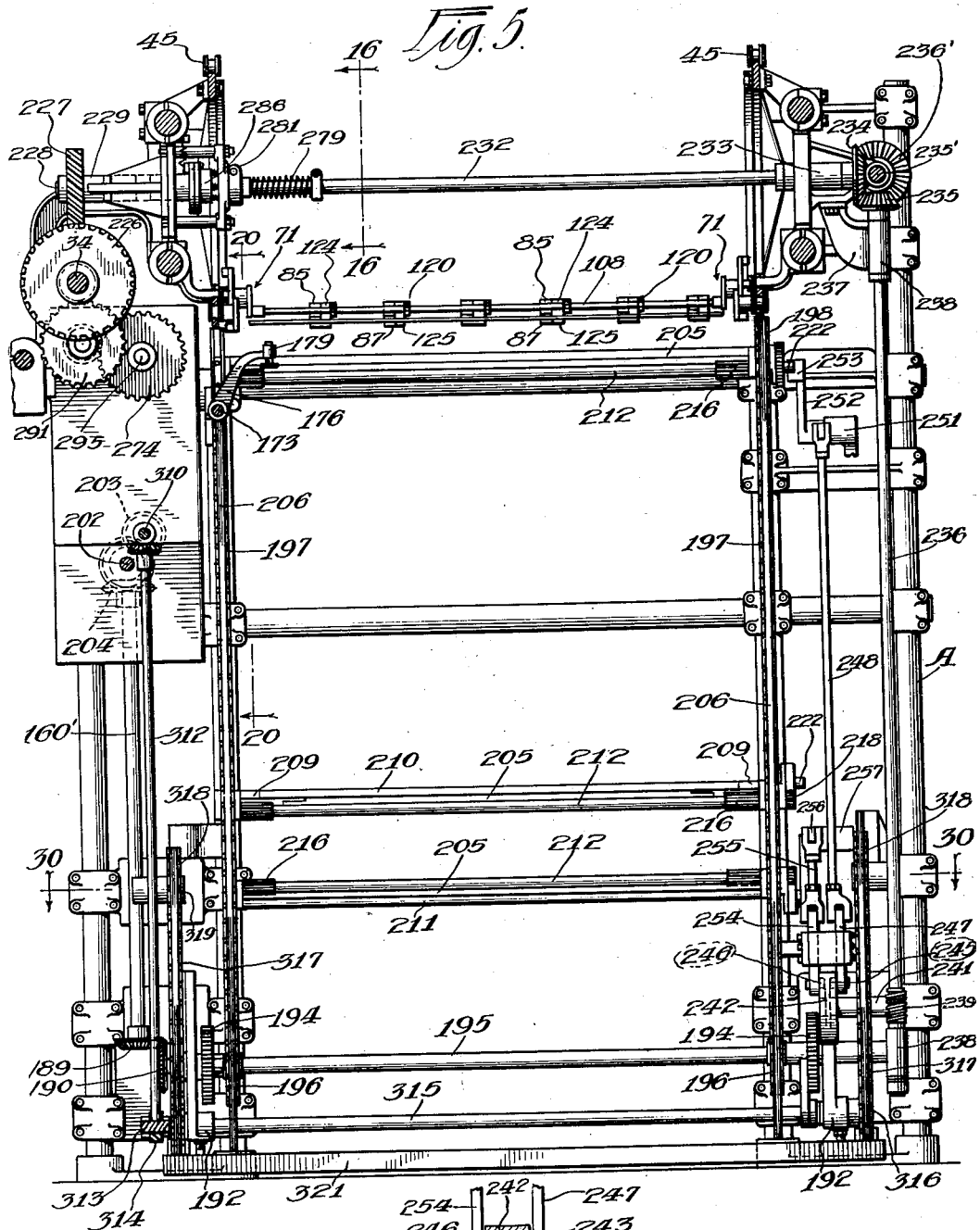

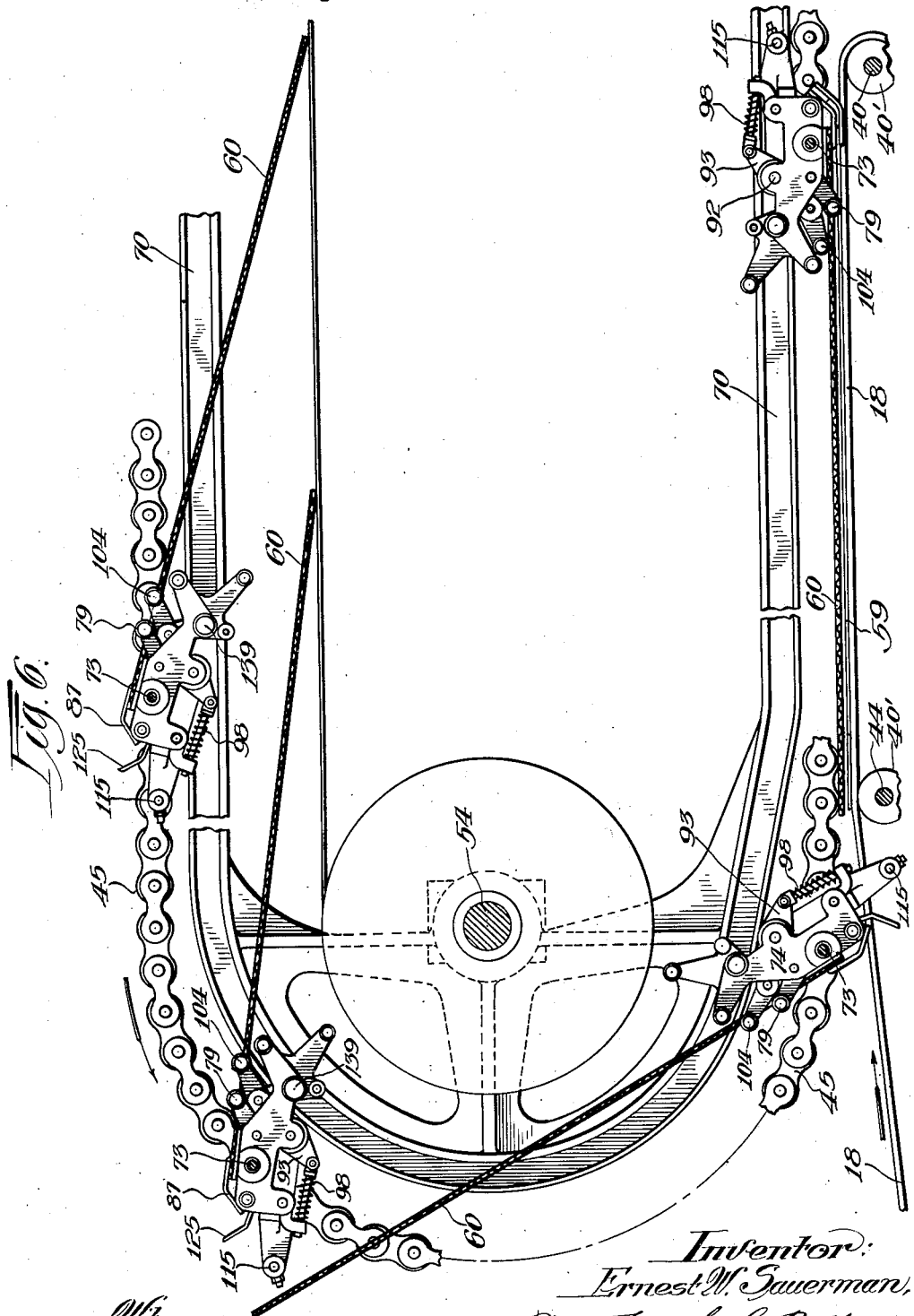

March 20, 1934. E. W. SAUERMAN 1,951,445
MANUFACTURE OF ONE-PIECE WINDOW ENVELOPE BLANKS
Original Filed April 19, 1929 31 Sheets-Sheet 9

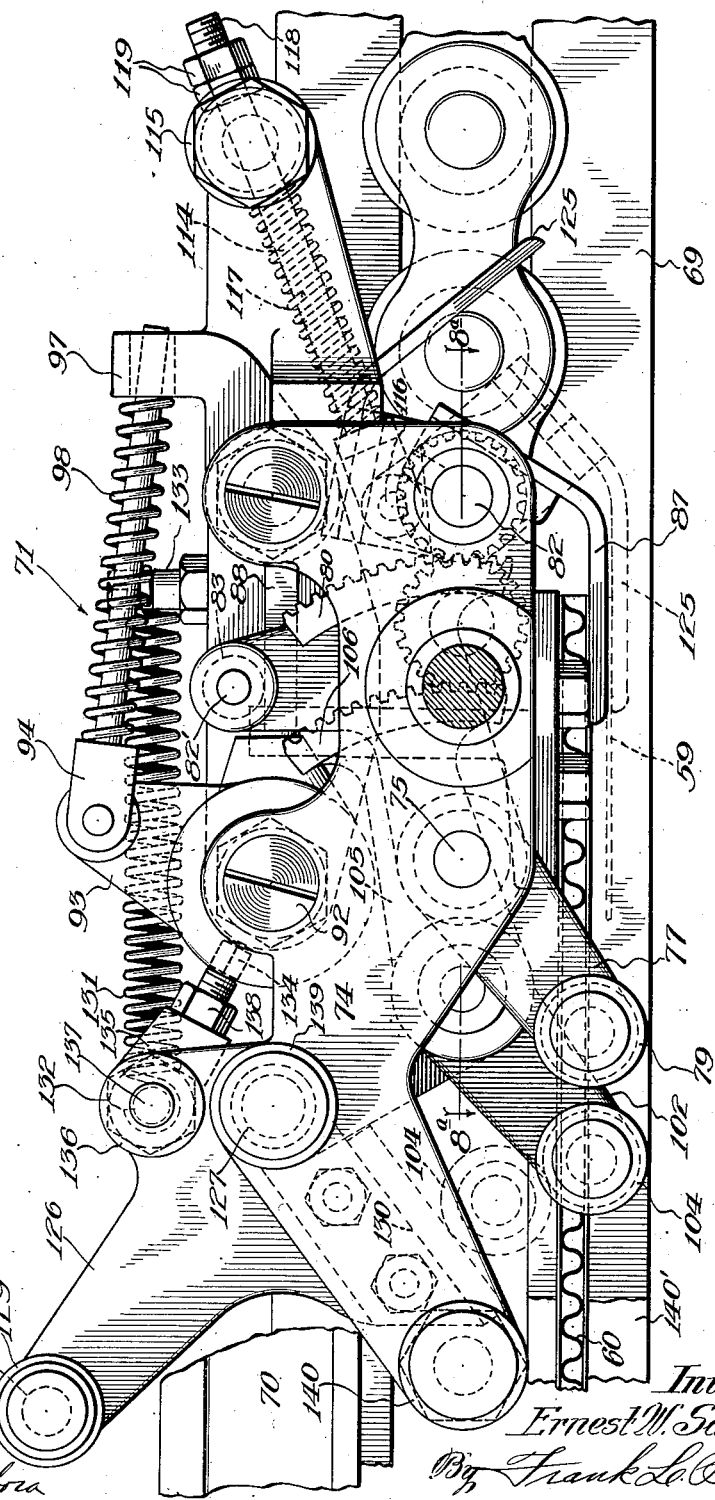

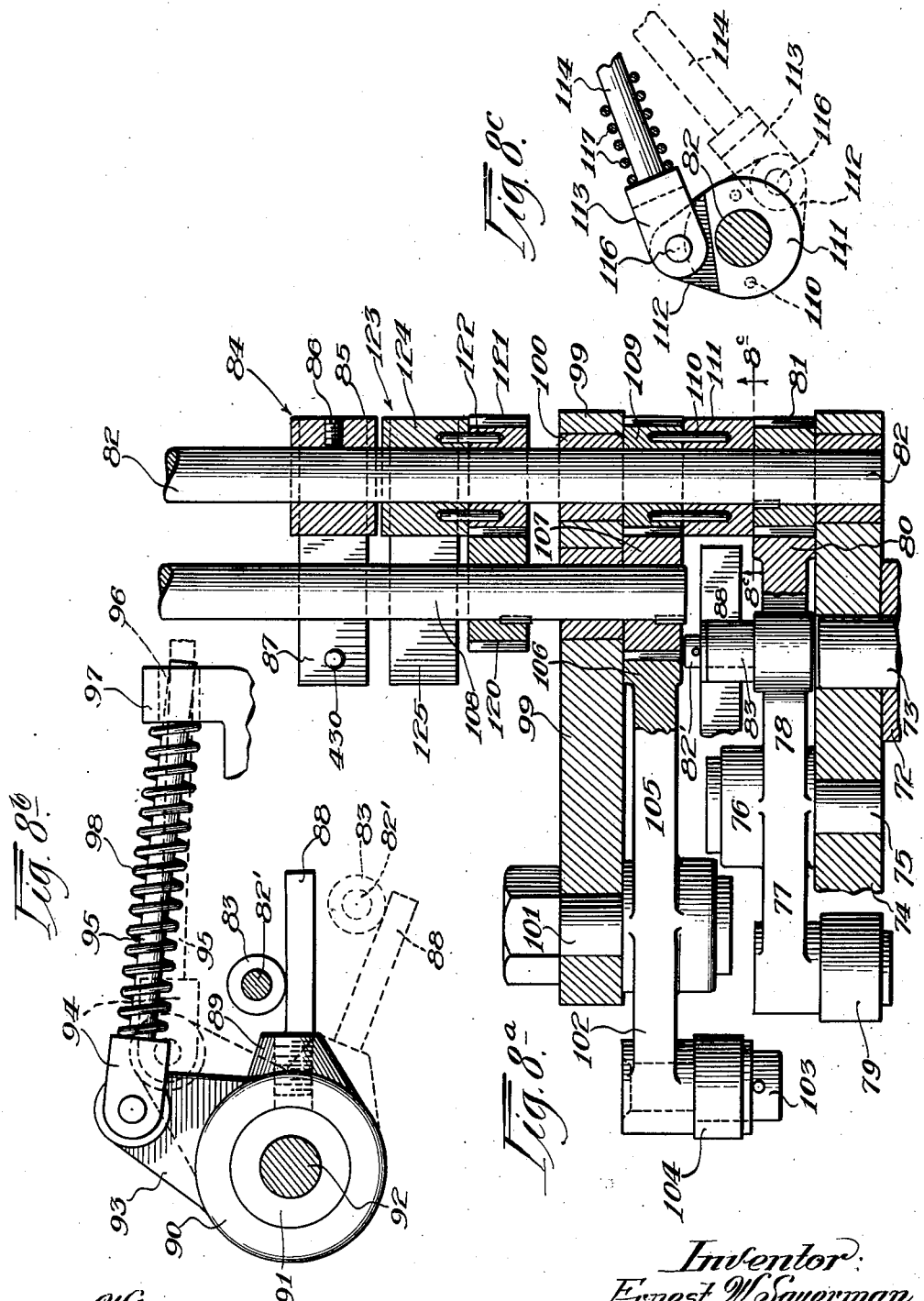

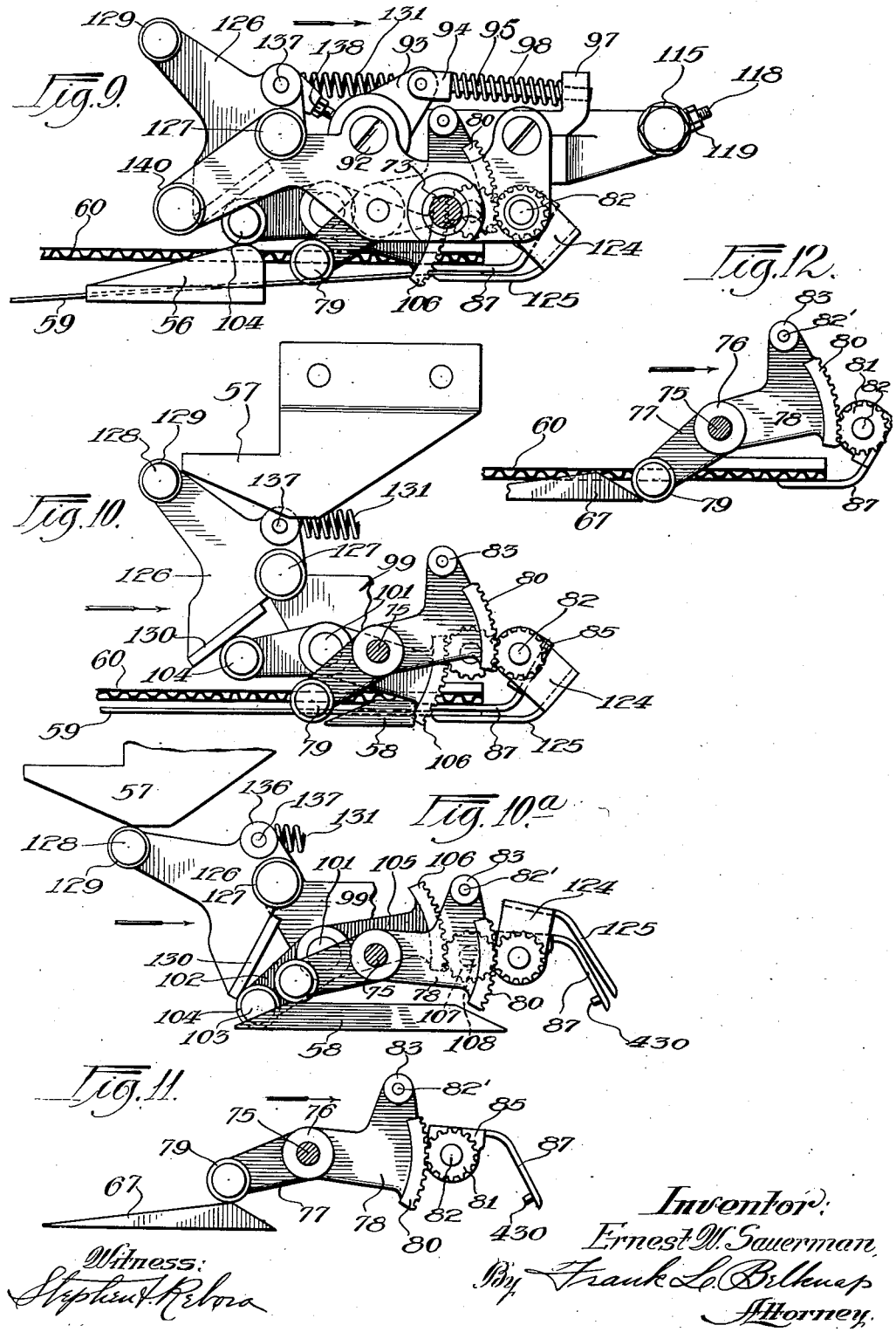

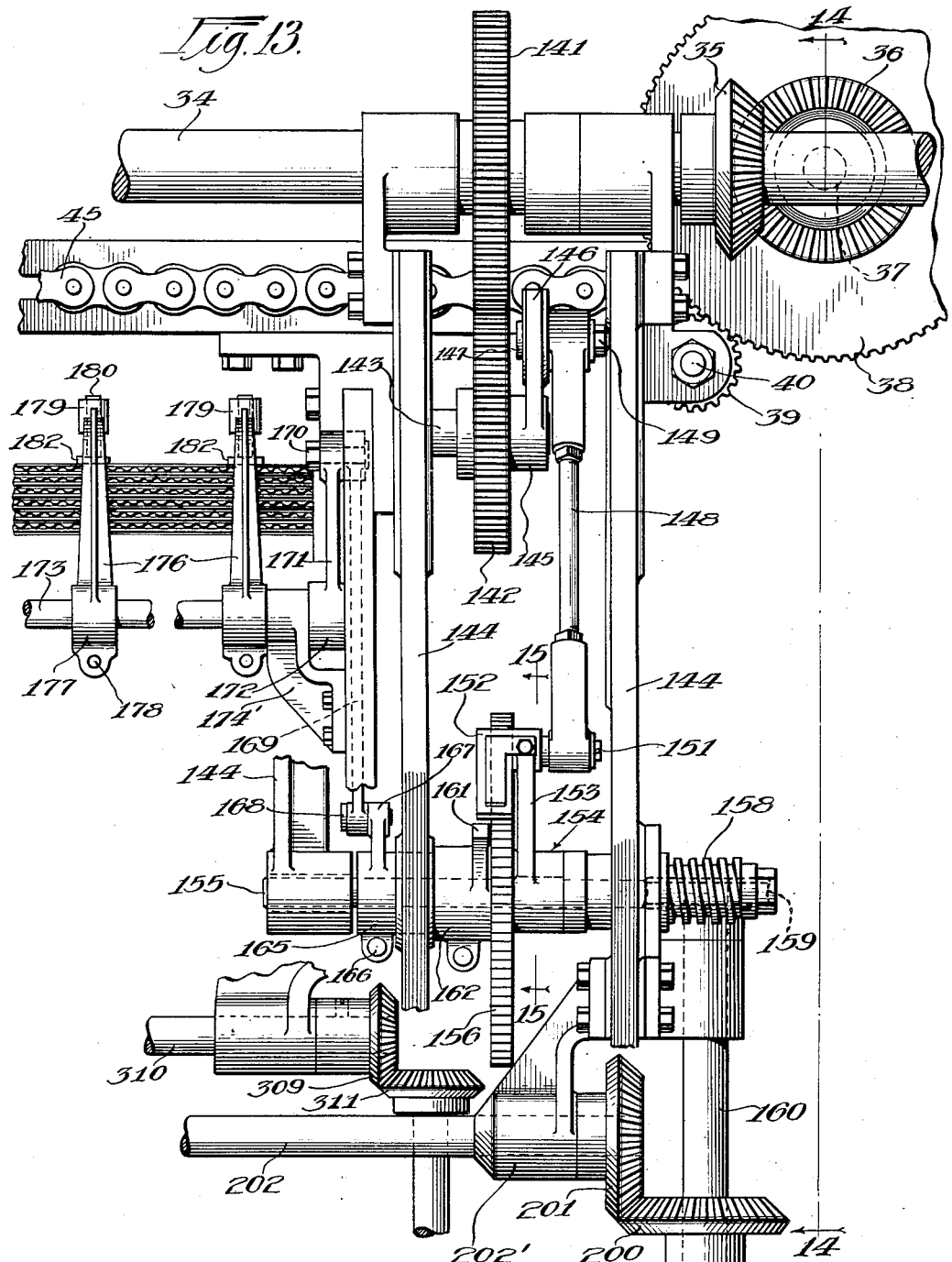

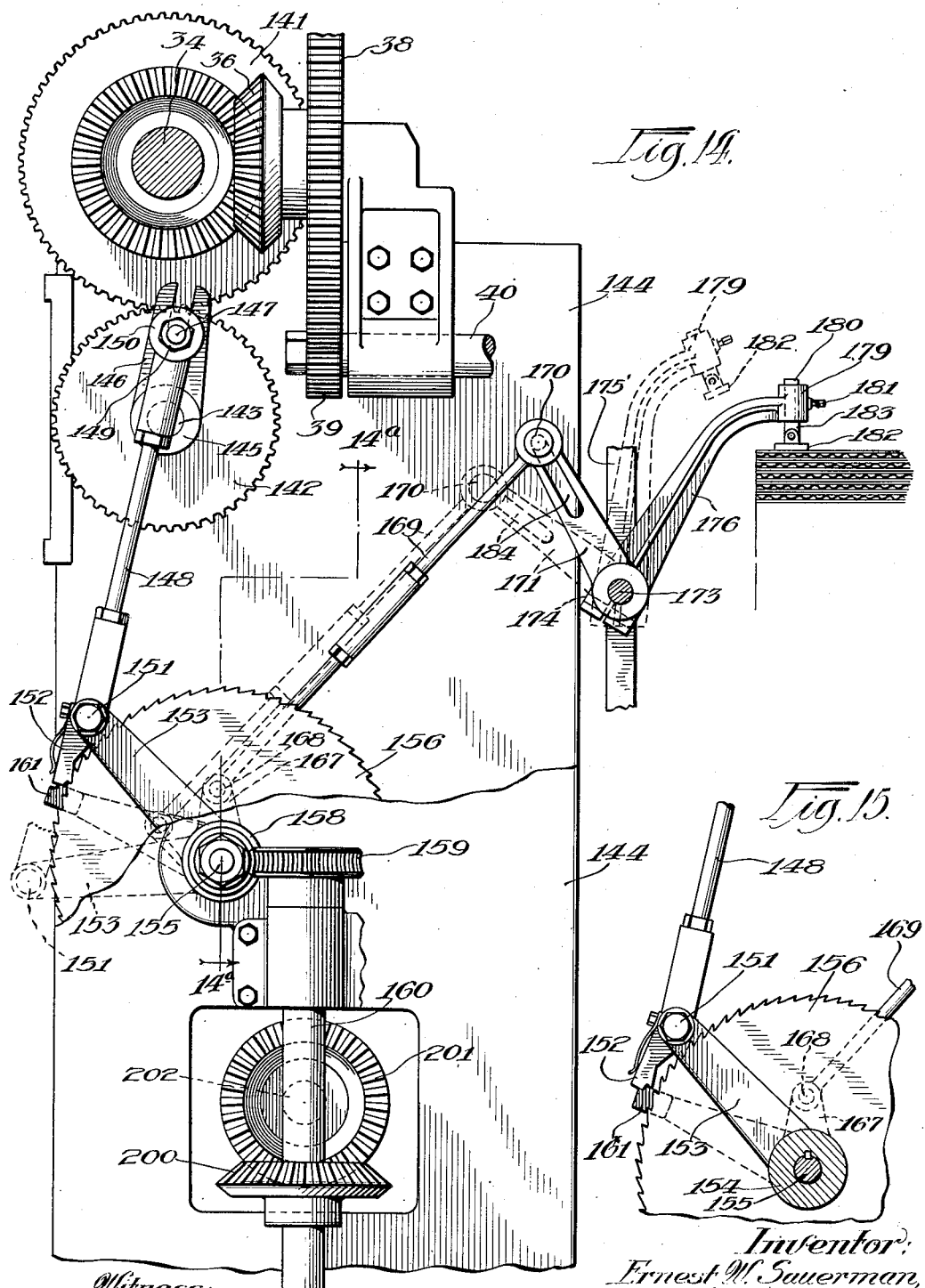

March 20, 1934. E. W. SAUERMAN 1,951,445
MANUFACTURE OF ONE-PIECE WINDOW ENVELOPE BLANKS
Original Filed April 19, 1929 31 Sheets-Sheet 15
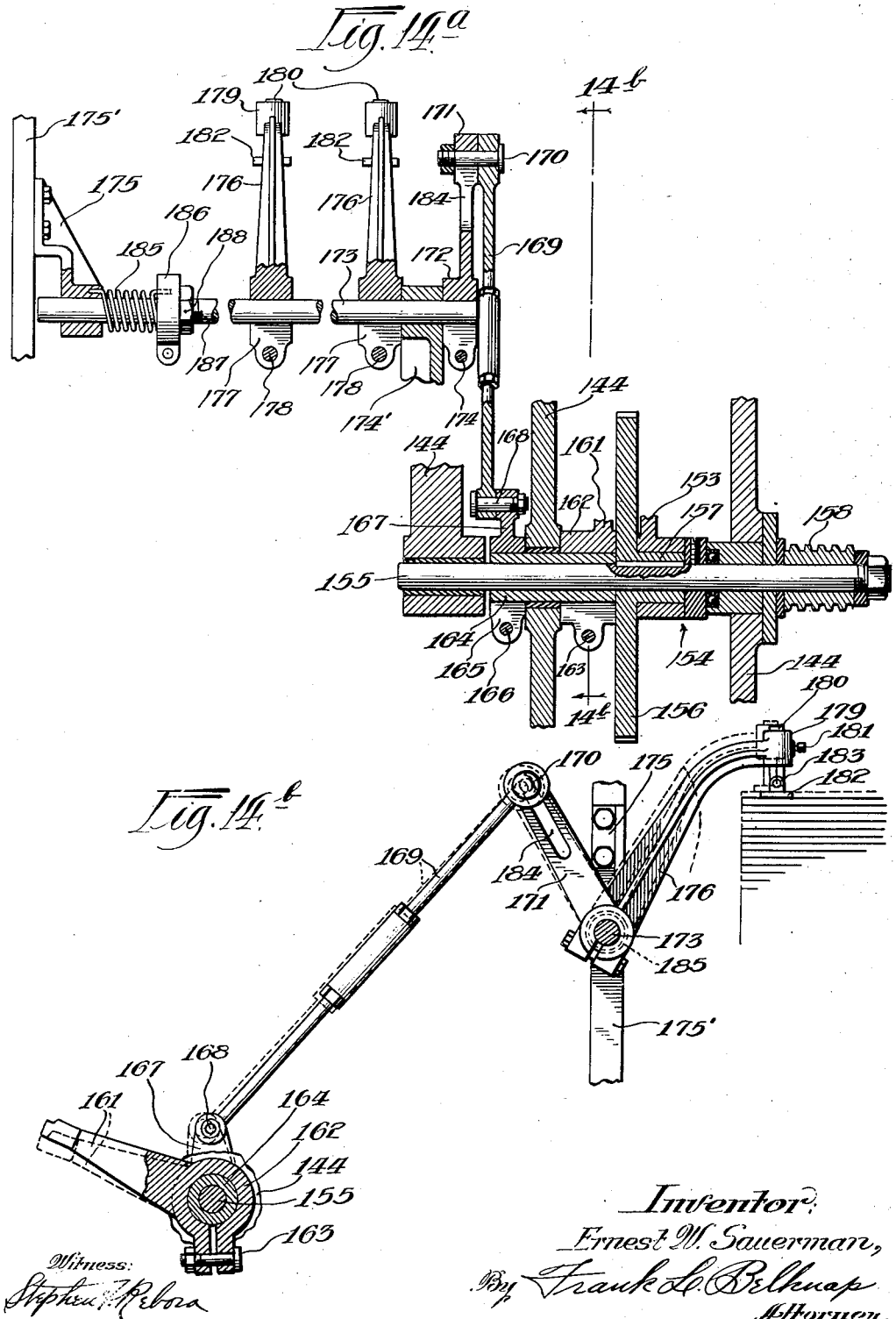
Inventor:
Ernest W. Sauerman,
By Frank L. Belknap
Attorney.

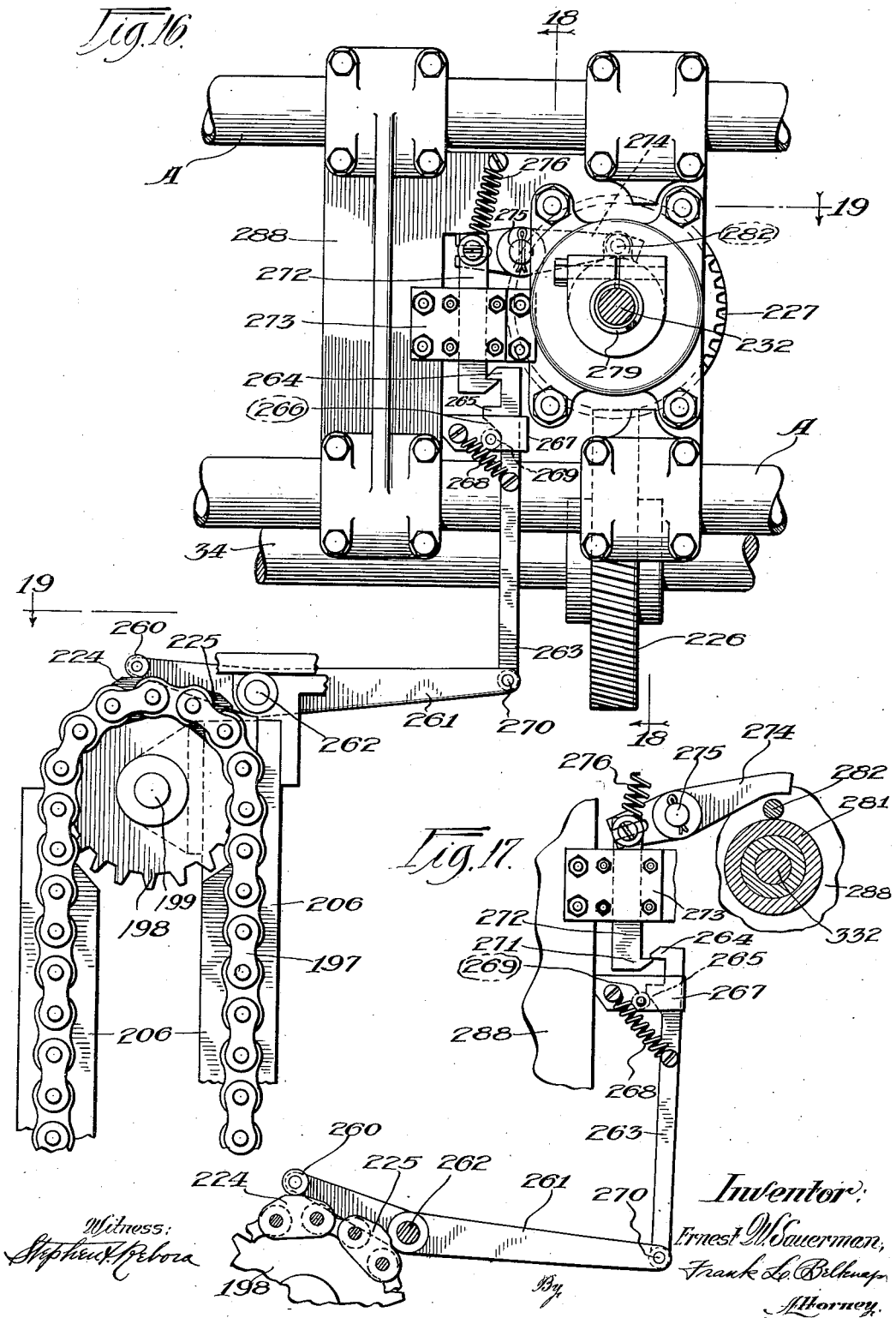

March 20, 1934.    E. W. SAUERMAN    1,951,445
MANUFACTURE OF ONE-PIECE WINDOW ENVELOPE BLANKS
Original Filed April 19, 1929    31 Sheets-Sheet 17

Witness:
Stephen T. Prbora

Inventor:
Ernest W. Sauerman,
Frank L. Belknap
Attorney.

March 20, 1934. E. W. SAUERMAN 1,951,445
MANUFACTURE OF ONE-PIECE WINDOW ENVELOPE BLANKS
Original Filed April 19, 1929 31 Sheets-Sheet 18
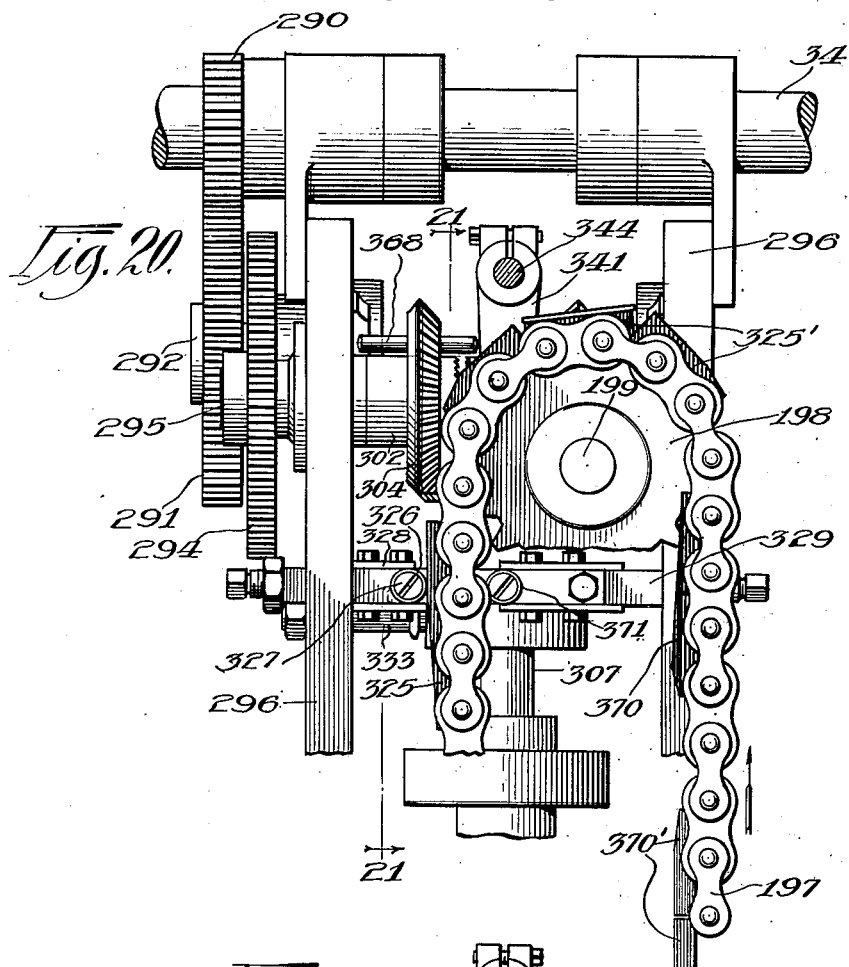
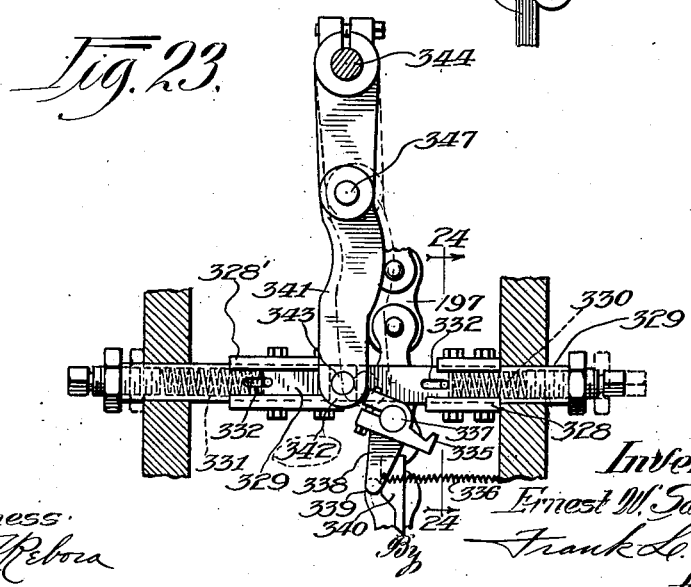

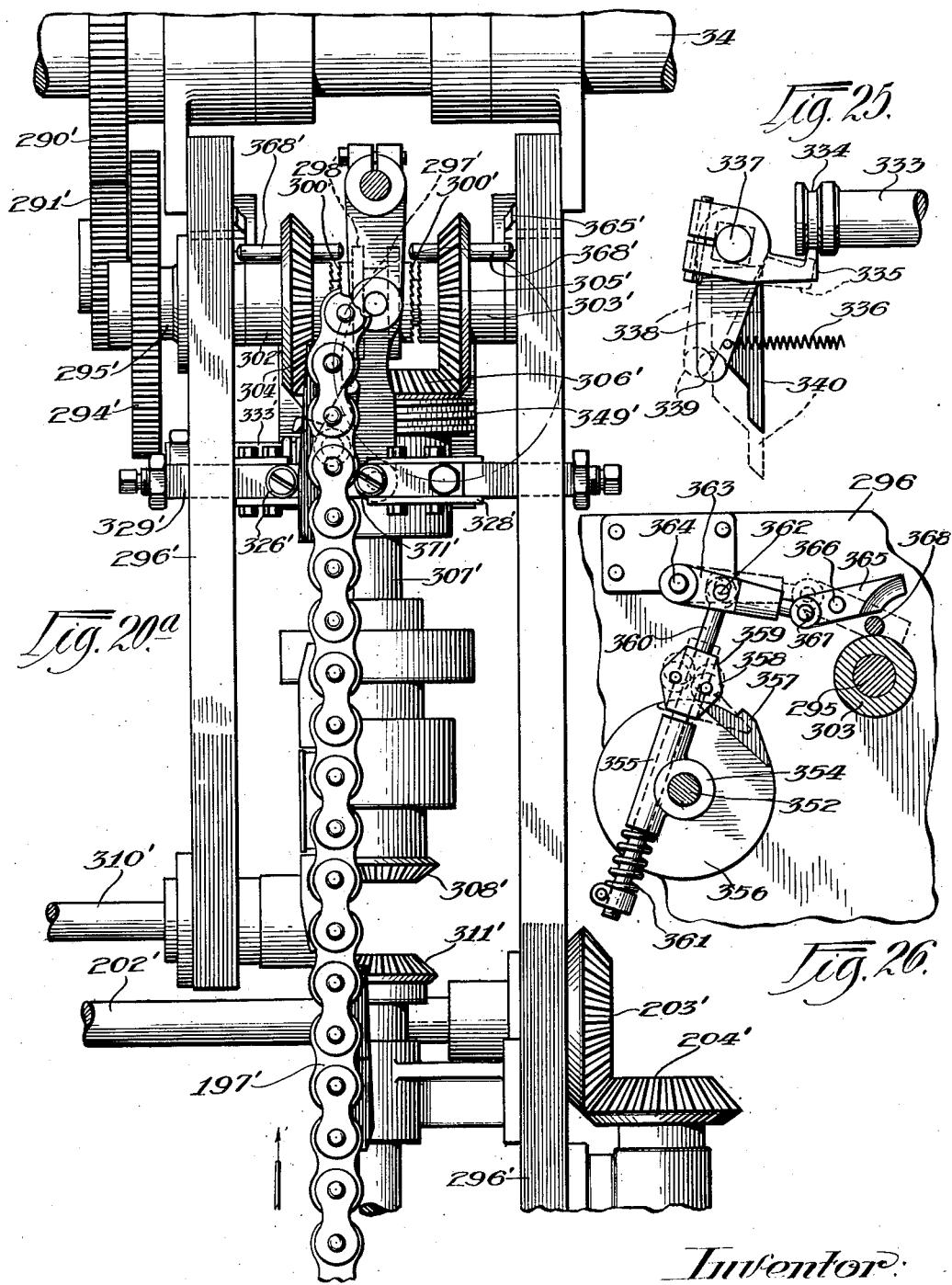

March 20, 1934.  E. W. SAUERMAN  1,951,445
MANUFACTURE OF ONE-PIECE WINDOW ENVELOPE BLANKS
Original Filed April 19, 1929  31 Sheets-Sheet 20
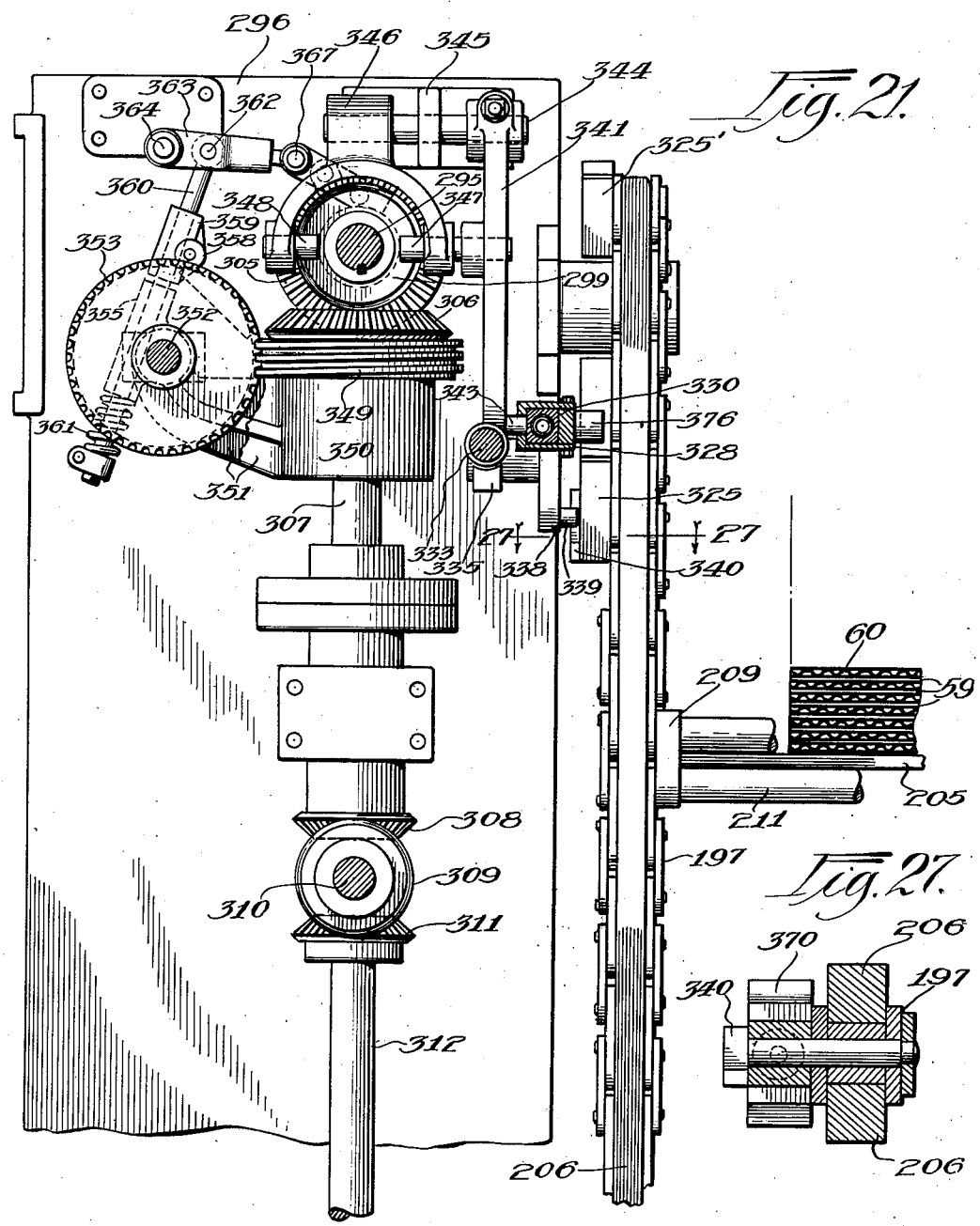

March 20, 1934.   E. W. SAUERMAN   1,951,445
MANUFACTURE OF ONE-PIECE WINDOW ENVELOPE BLANKS
Original Filed April 19, 1929   31 Sheets-Sheet 21
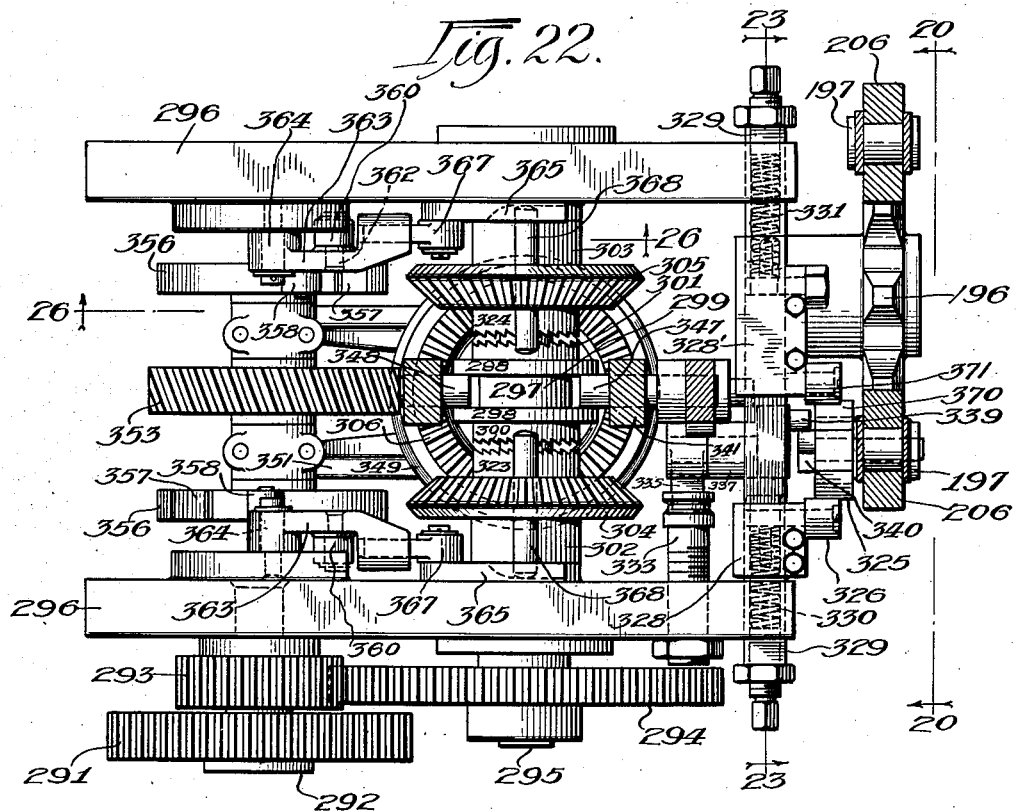
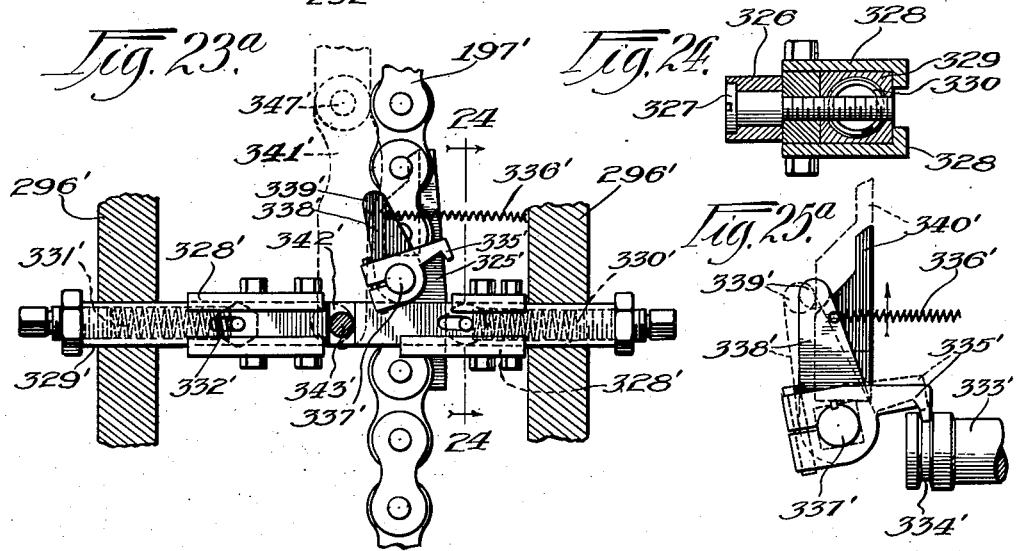

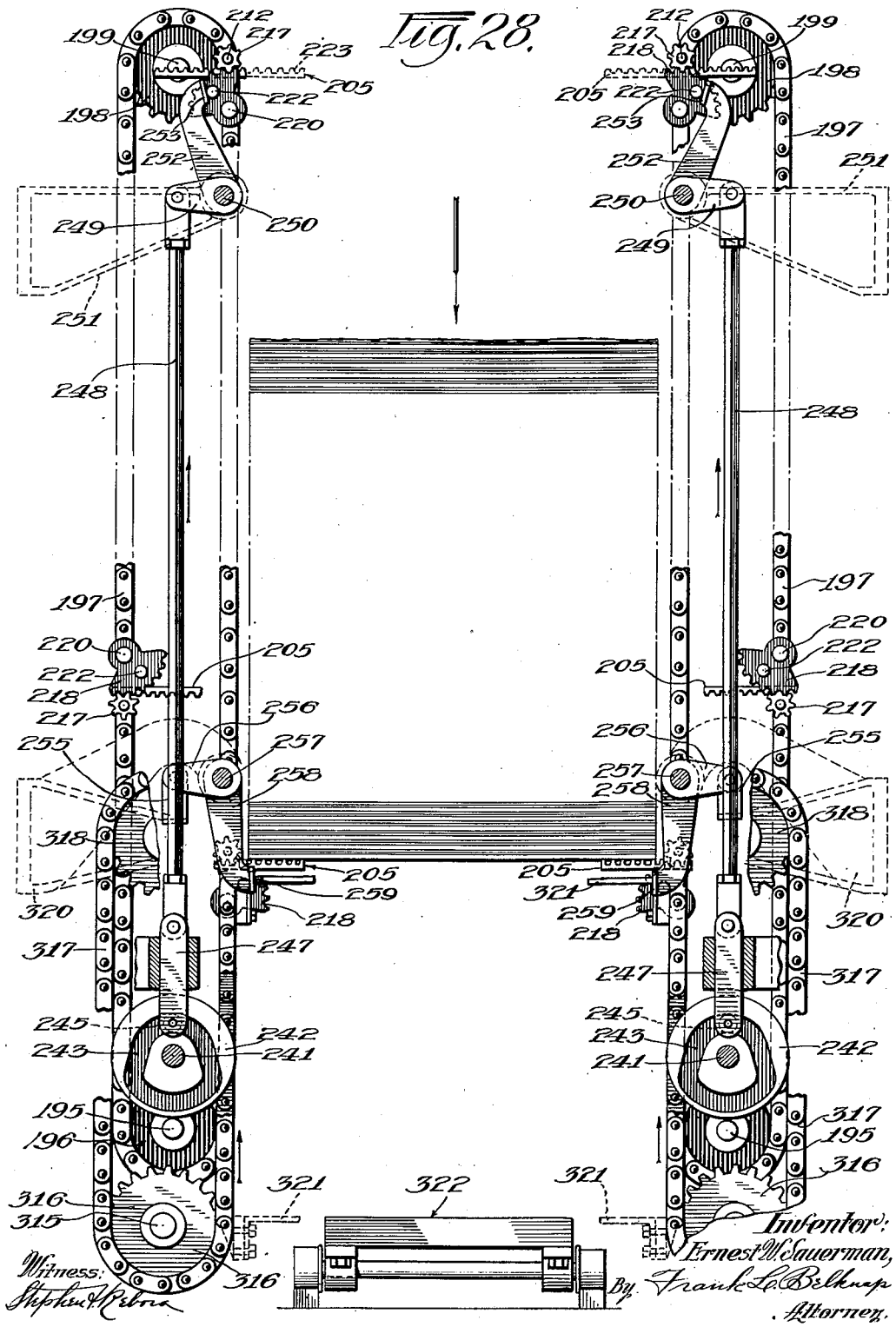

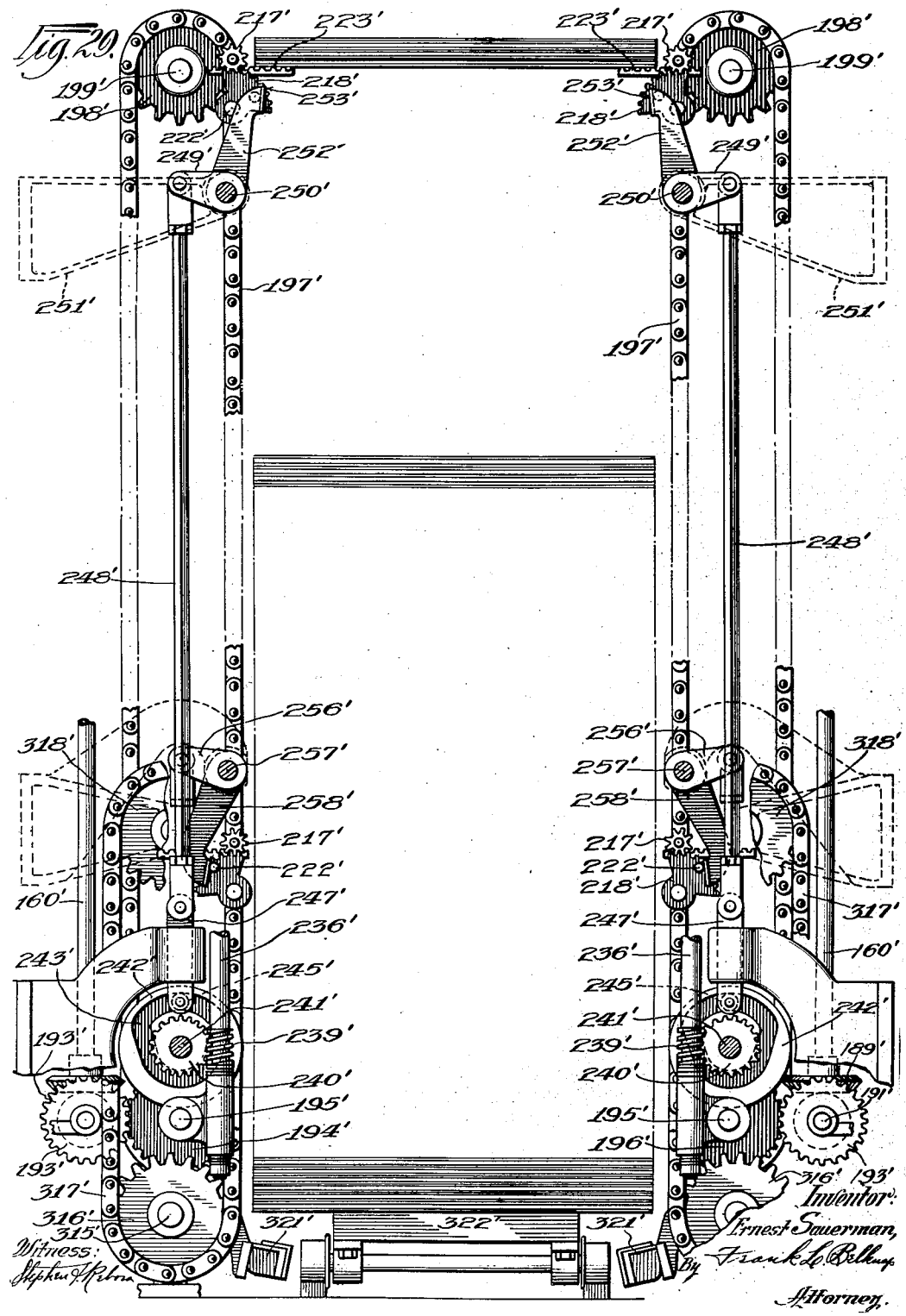

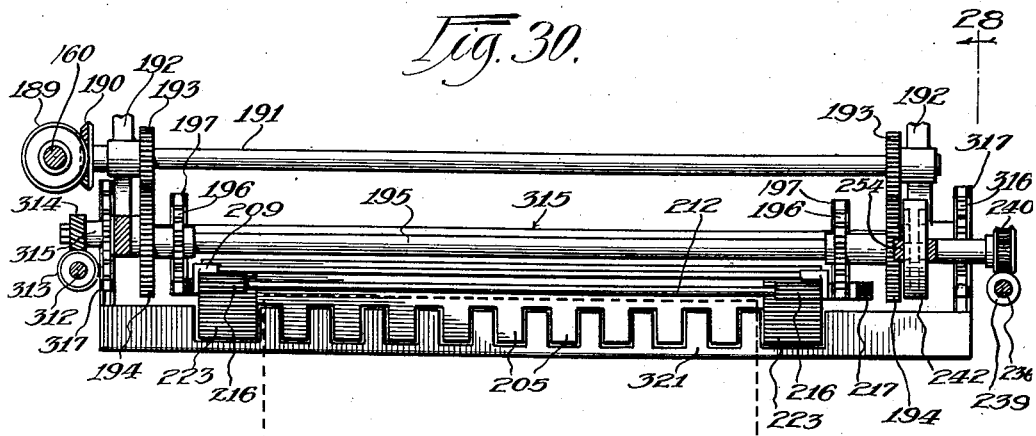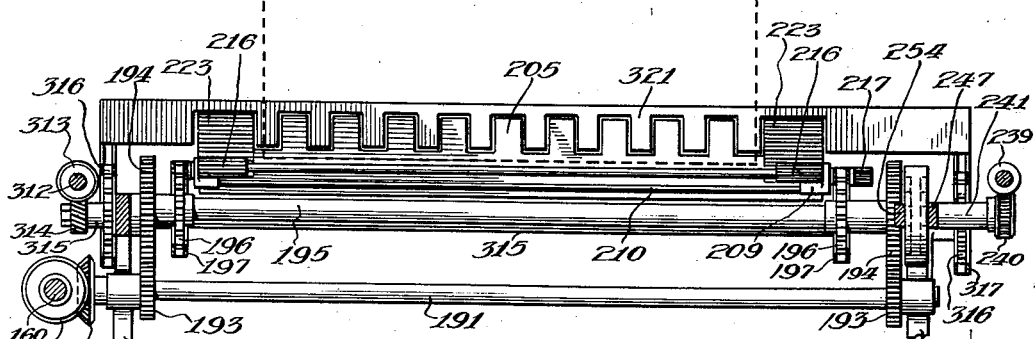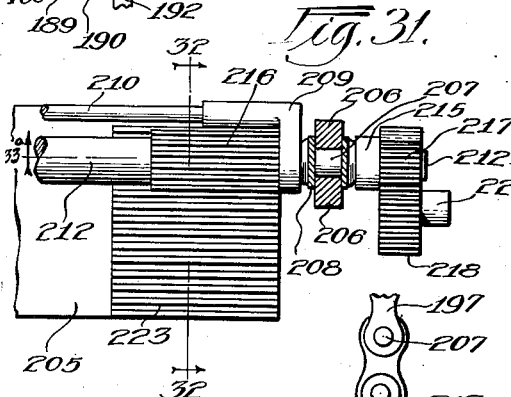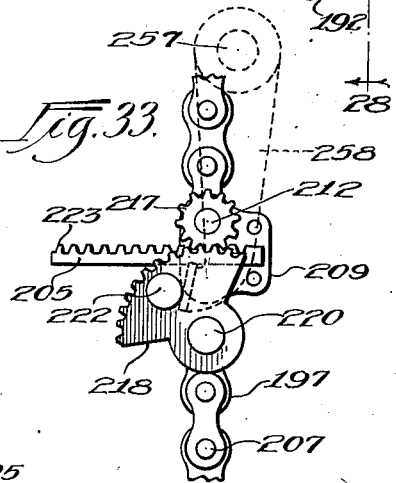

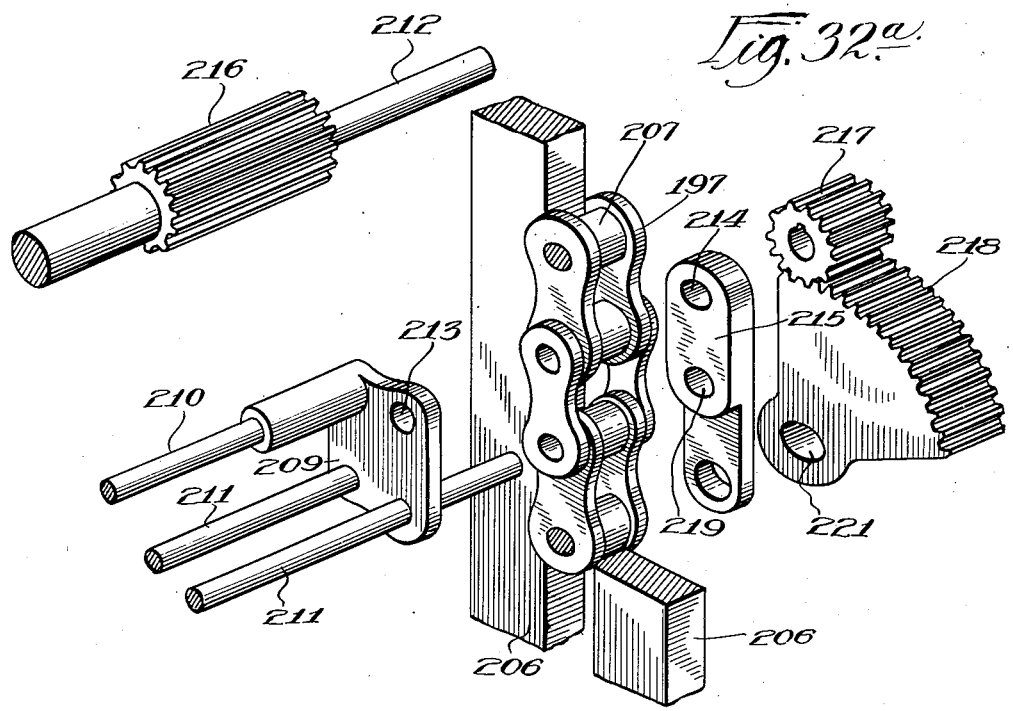
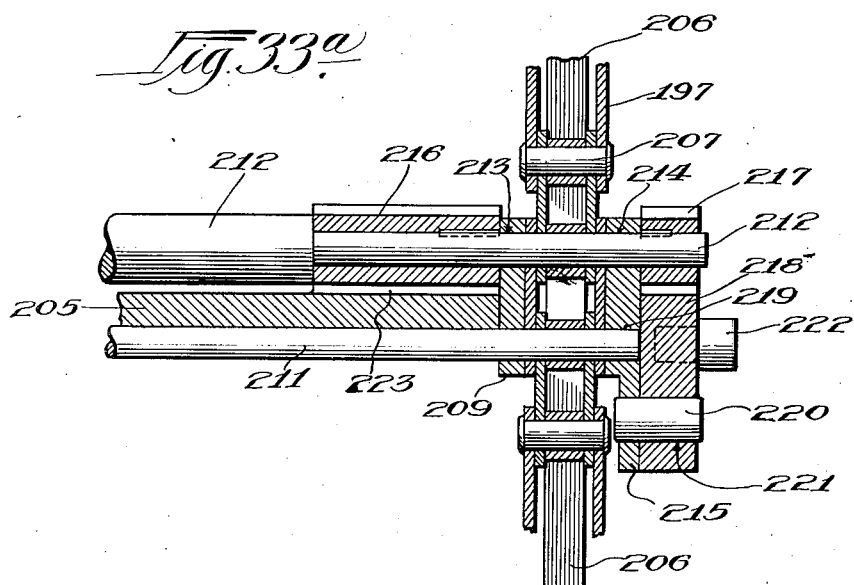

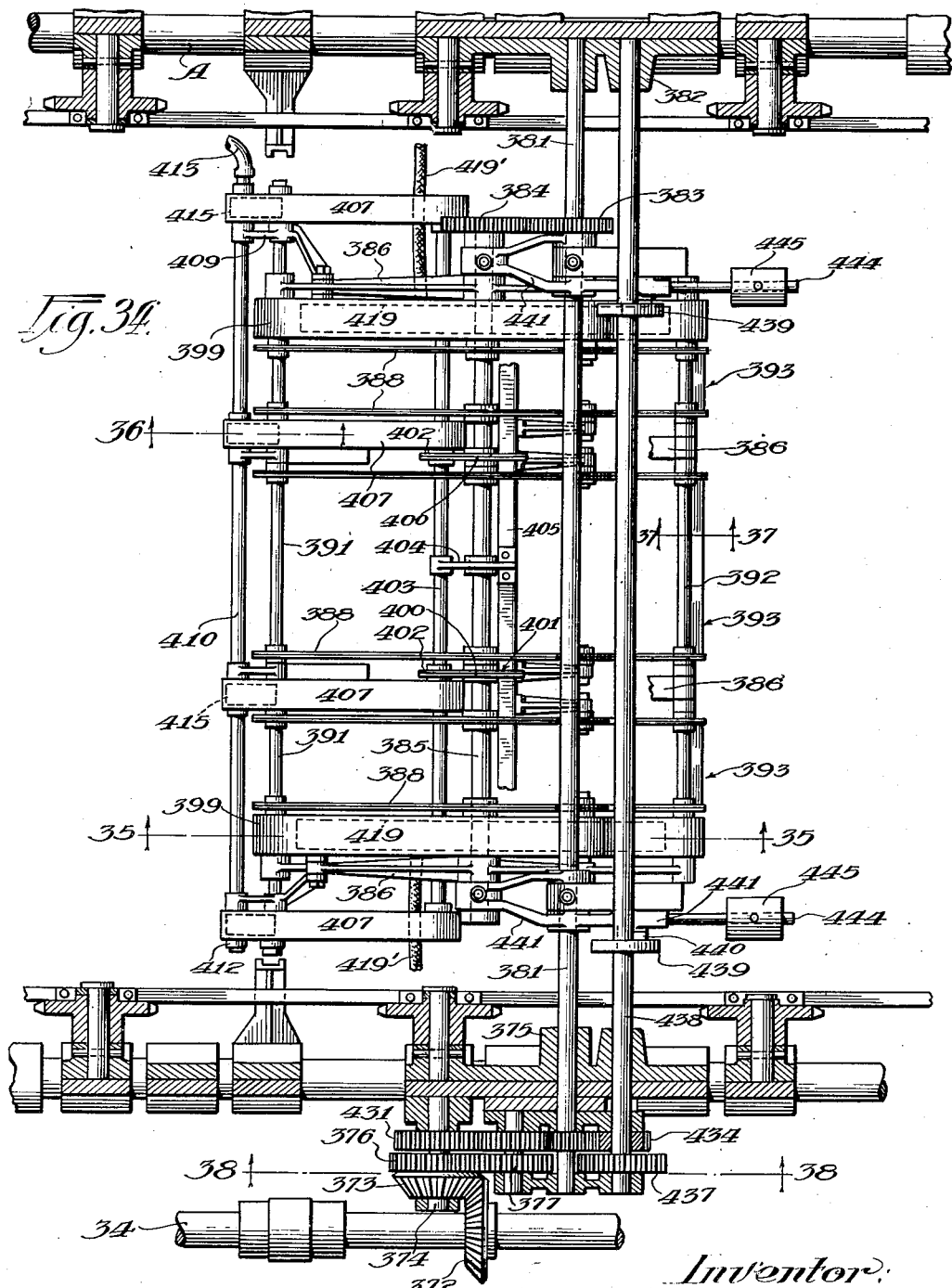

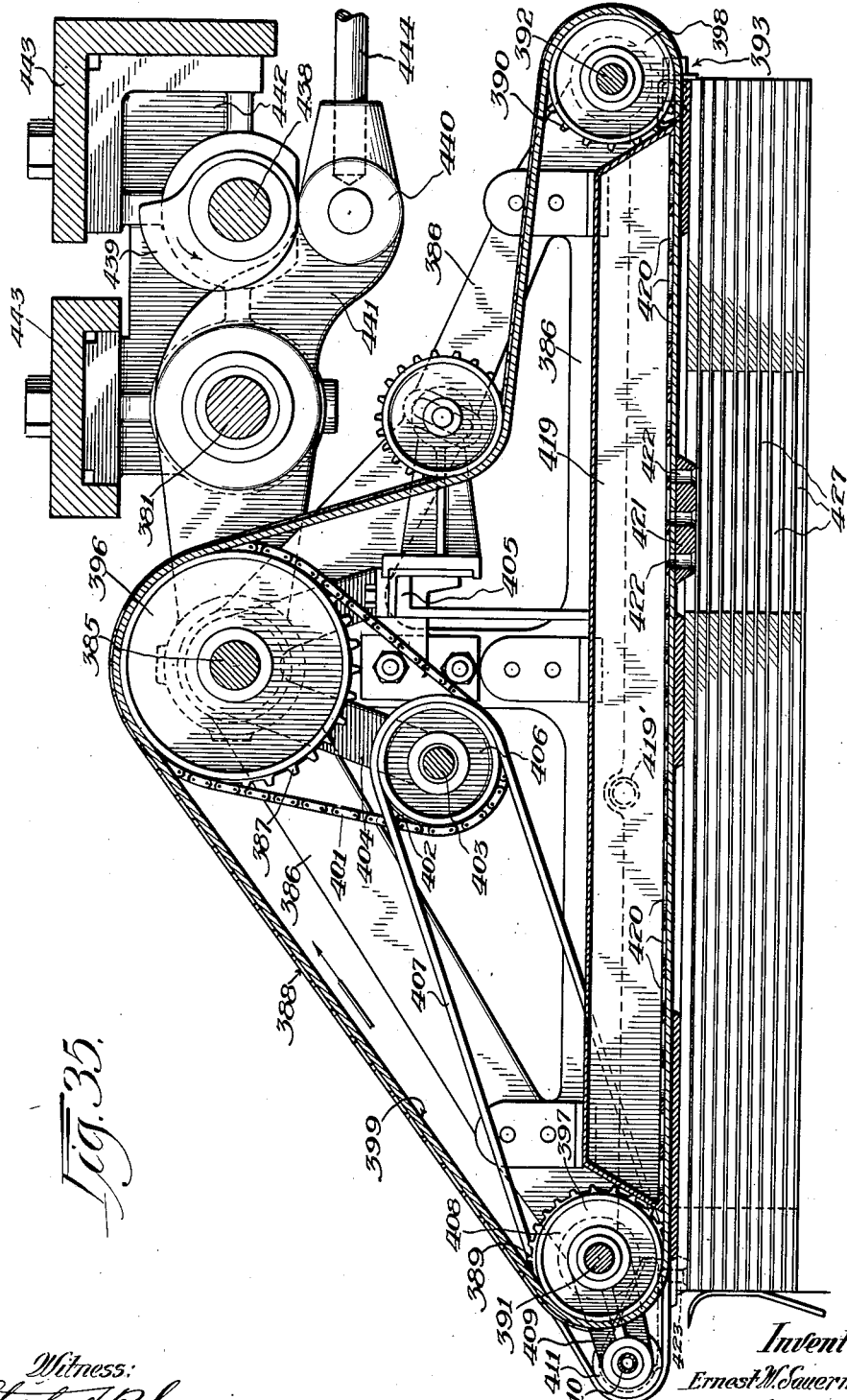

March 20, 1934.  E. W. SAUERMAN  1,951,445
MANUFACTURE OF ONE-PIECE WINDOW ENVELOPE BLANKS
Original Filed April 19, 1929   31 Sheets-Sheet 28
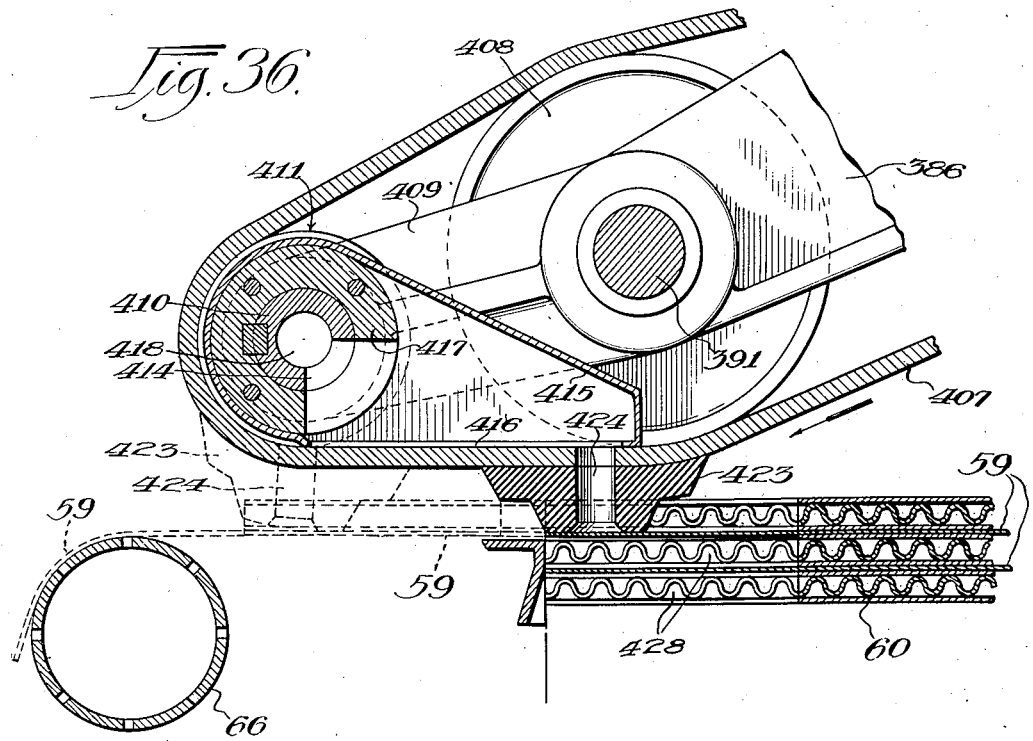
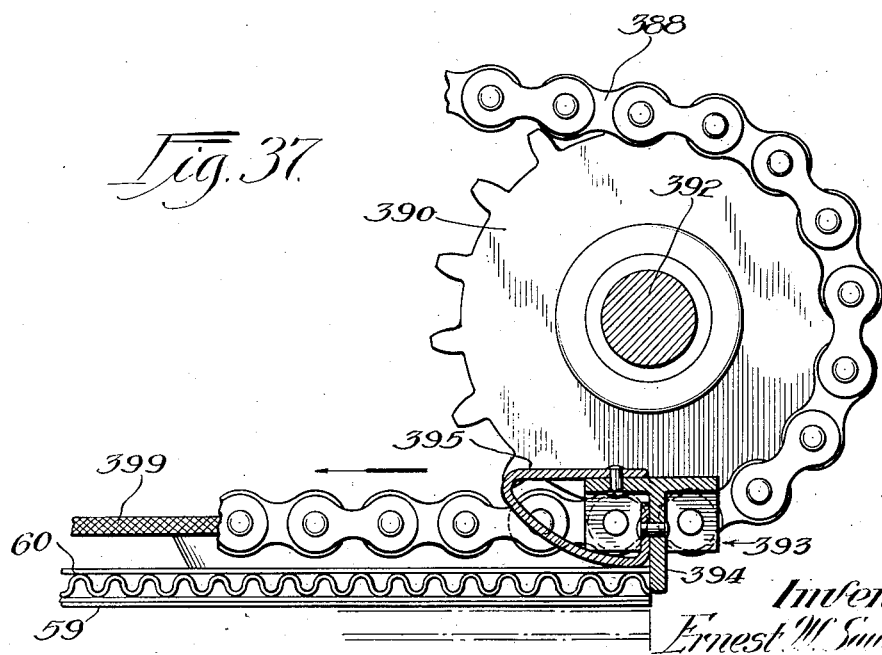

March 20, 1934.   E. W. SAUERMAN   1,951,445
MANUFACTURE OF ONE-PIECE WINDOW ENVELOPE BLANKS
Original Filed April 19, 1929   31 Sheets-Sheet 29
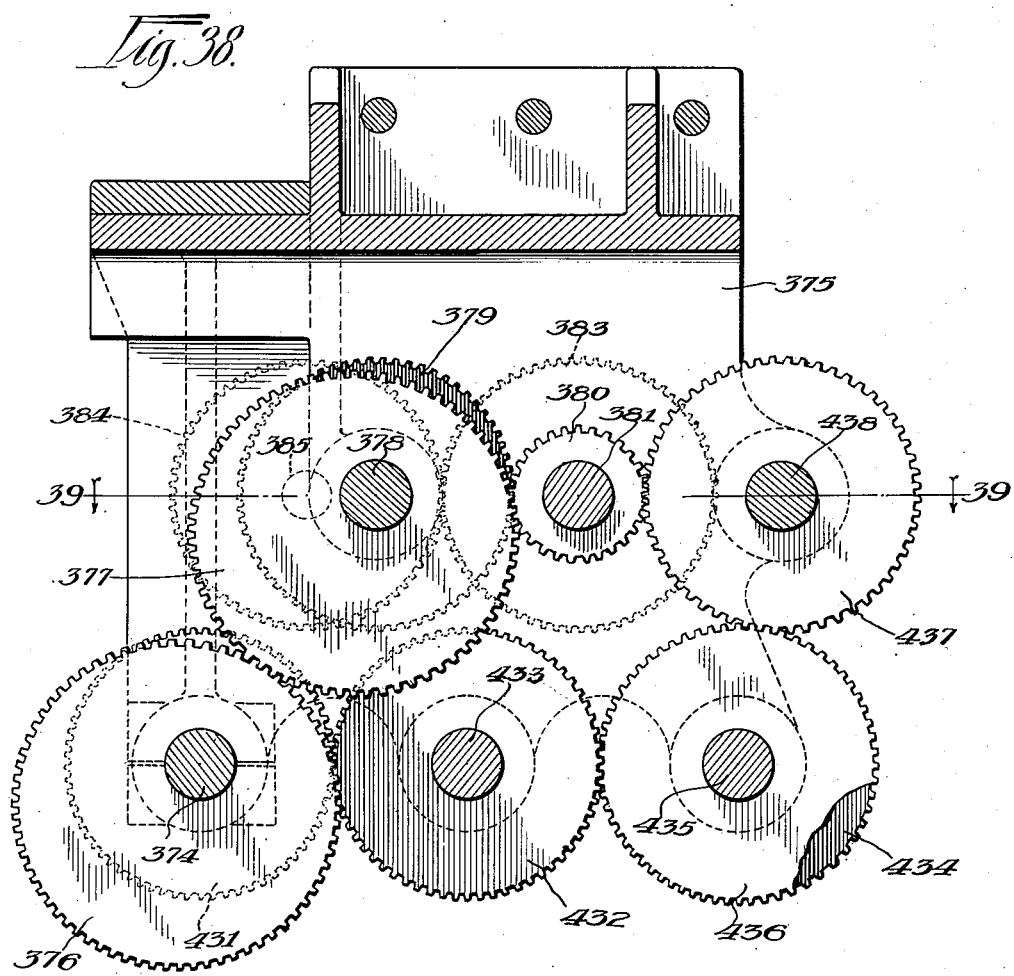
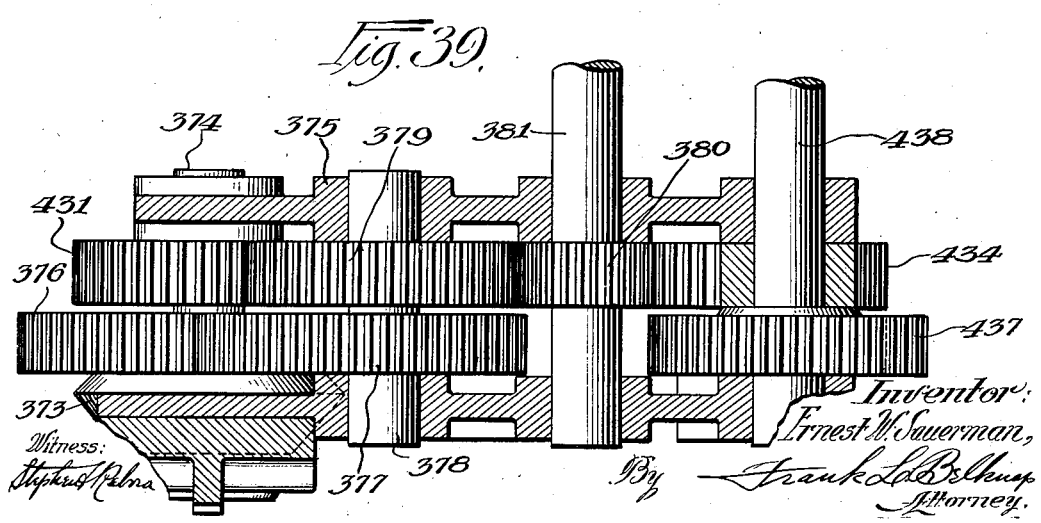

March 20, 1934.  E. W. SAUERMAN  1,951,445
MANUFACTURE OF ONE-PIECE WINDOW ENVELOPE BLANKS
Original Filed April 19, 1929  31 Sheets-Sheet 30
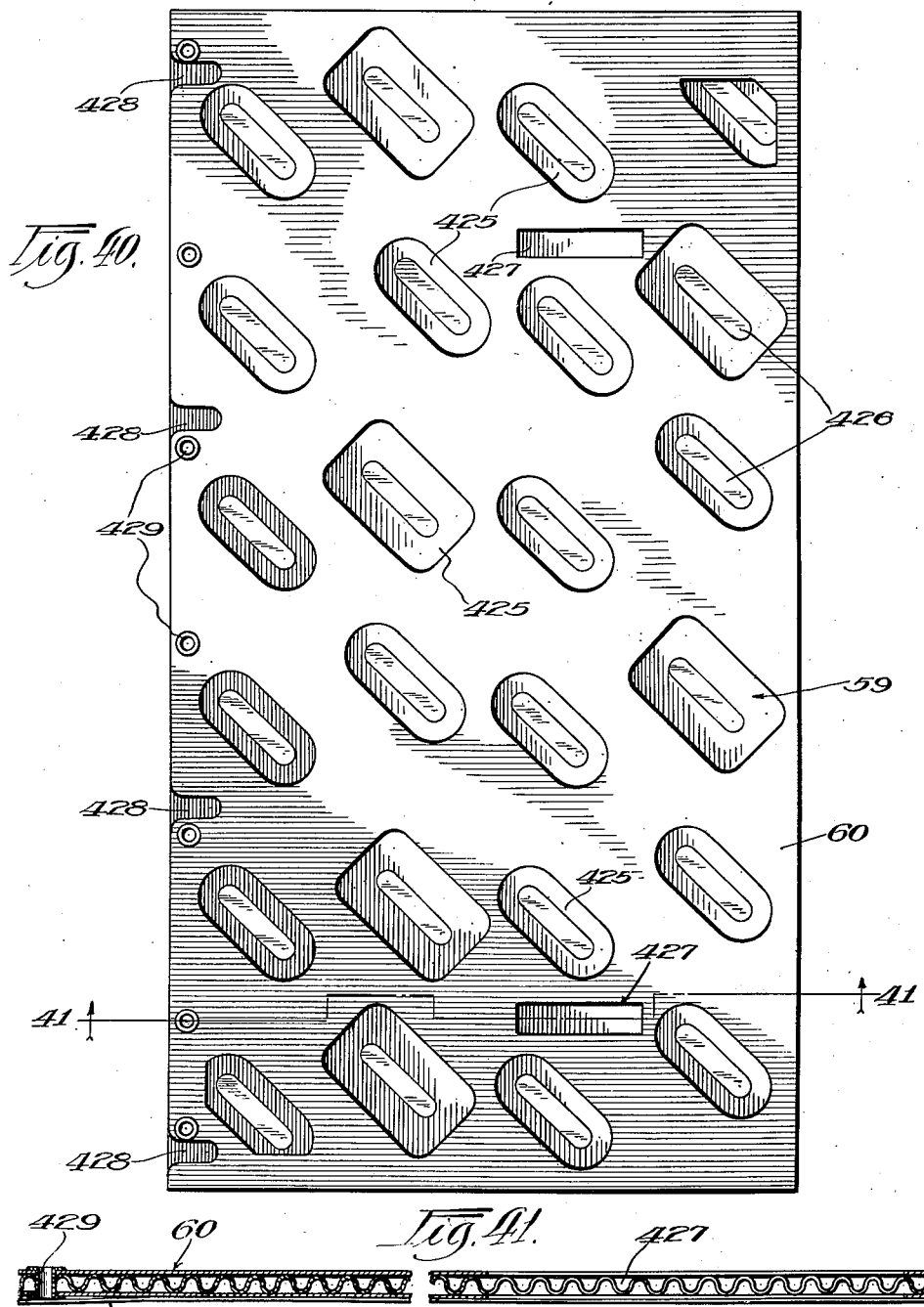

March 20, 1934.   E. W. SAUERMAN   1,951,445
MANUFACTURE OF ONE-PIECE WINDOW ENVELOPE BLANKS
Original Filed April 19, 1929   31 Sheets-Sheet 31
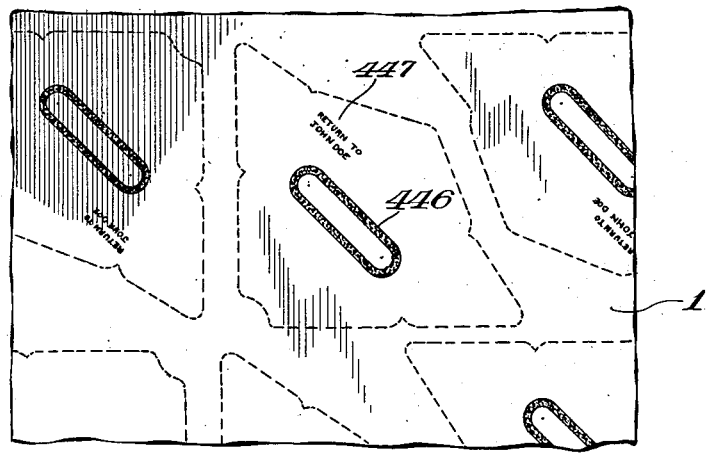
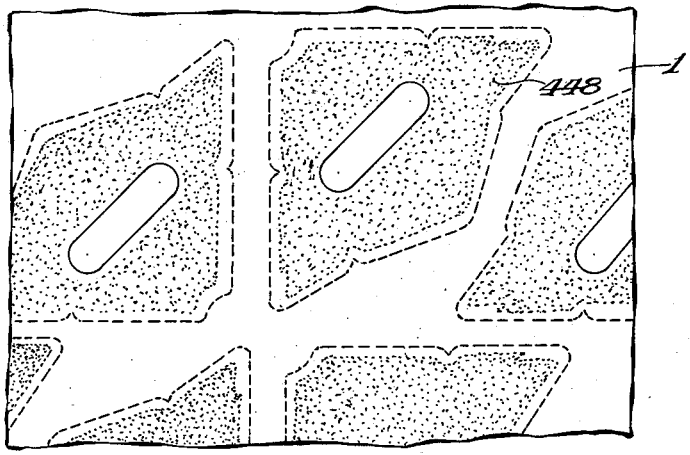
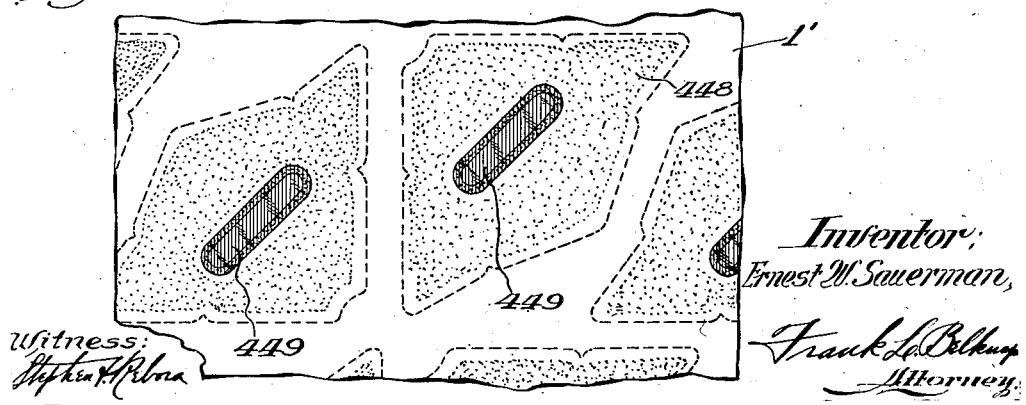

Patented Mar. 20, 1934

1,951,445

UNITED STATES PATENT OFFICE 1,951,445

MANUFACTURE OF ONE-PIECE WINDOW ENVELOPE BLANKS

Ernest W. Sauerman, Chicago, Ill., assignor to Transo Envelope Co., Chicago, Ill., a corporation of Delaware Application April 19, 1929, Serial No. 356,567
Renewed April 29, 1932

41 Claims. (Cl. 93—61)

This invention relates to improvements in the manufacture of one-piece window envelope blanks, and refers more particularly to a process and apparatus particularly designed to perform all of the operations required in the manufacture of blanks for one-piece window envelopes in a continuous series of steps and in one structural assembly.

One-piece window envelopes are used very extensively in present day commerce and are manufactured by applying to a sheet of paper oil or other saturant of a character which saturates and soaks into the fibers of the paper sheet to render that portion covered by the saturant sufficiently transparent to permit reading of data within the envelope through the window thus made.

In one commercial method of manufacturing blanks for this type of envelope, sheets of paper are fed, one at a time, to a printing press. The first operation places printed borders on selected spots of each sheet, each border in the finished envelope being exposed, functioning to conceal and render unnoticeable the rough ragged edges of the oil blot to be subsequently applied. The next operation may place transparency-destroying tints on the other surface of each sheet of configuration conforming substantially to, but slightly smaller than, an envelope blank laid out flat. The sheet is then fed to the oil applying mechanism which places oil blots in spaces left by the tint and on the same or opposite side of the sheet from the borders.

The saturant comprises ingredients having the required characteristics of saturating ability and transparency. The types of saturant developed and used in this art up to the present time require a substantial period of time to saturate and dry.

It is obvious, therefore, that the sheet containing the freshly applied oil blots in spaced areas thereon must be protected during the drying operation so that the oil will not be smeared or removed. According to present practise, therefore, each sheet contains, say from twelve to twenty-four envelope blanks, more or less. These sheets are removed from the printing and oil applying mechanism, and it is necessary to place between each sheet and the next sheet a protector, comprising a piece of cardboard, or the like, having areas cut out conforming to the shape of the window, and slightly larger.

These protectors function to prevent the wet, oiled sheets from sticking together or smearing during the drying operation. Therefore, the first requisite of such a protector is that it shall be thick enough to function effectively for its purpose. Experience has indicated that a good protector comprises a corrugated board consisting of two outer flat covering sheets enclosing and united with a corrugated ply. In practise the protector is approximately one-quarter inch in thickness. One advantage of using corrugated board is that, during the drying operation air has a chance to circulate through a stack very readily.

According to present practise, therefore, the oiled sheet is placed on a suitable support, and a protector placed on top thereof. The next oiled sheet is placed on top of the protector and another protector placed on top of this oiled sheet. This operation is continued until a large stack of protectors with interposed wet oiled sheets has been built up.

This stack is then removed on a truck and allowed to dry; if desired, to facilitate drying, it may be placed in an oven. While in the oven it may be subjected to a mild temperature sufficient to insure saturation of the fibers of the sheet and at the same time dry the oil sufficiently so that it can be subsequently handled without sticking. A temperature of approximately 150° F. has been found suitable for one type of saturant. The stack is retained in the oven for a length of time sufficient to permit saturation and drying of the wet sheets, for instance, from three to twenty-four hours, more or less, after which the stack is removed from the oven. The protectors are then separated from the oiled sheets and the protectors and dry sheets are collected separately. The dry oiled sheets, in stack form, are then subjected to the action of a die for cutting out the individual envelope blanks therefrom. Each blank is then folded, pasted and assembled ready for use. Prior to being assembled and folded, a return address and name may be printed on the blank in the proper place, as well as any other desired information.

Because of the types of saturant employed, it is obvious that the manufacture of one-piece window envelope blanks requires many manual operations, including particularly the operation of manually placing, one at a time, a protector on each wet oiled sheet subsequent to being severed, and the manual operation of separating the protectors and the dry oiled sheets, one at a time, subsequent to drying.

It is a primary object of the present invention to provide a process and apparatus particularly designed to make all these operations automatic and mechanical.

Among the other objects of the invention are to provide a machine in which a web of paper is fed continuously from a roll into one end of the machine while dry oiled sheets are removed from the other end; to provide a machine provided with mechanism for automatically placing a protector between each wet oiled sheet; to provide a machine of the character described equipped with a stack lowering mechanism and a separate independently operable stack raising mechanism; to provide means for automatically removing from the stack lowering mechanism a stack of protectors and interposed wet sheets when a stack of predetermined height has collected thereon, without interfering in any way with the continuous operation of the machine; to provide mechanism by which stacks containing a predetermined number of protectors and dried sheets are intermittently supplied to the stack raising elevator without interfering with the continuous operation of the machine; to provide a machine in which the stack lowering and stack raising mechanism each comprise a low speed elevator and a high speed elevator.

To provide a machine equipped with an endless conveyor having spaced gripping means adapted to convey individual protectors from the stack raising elevators to the stack lowering elevators; to provide in a construction of the character last described means for picking up a wet severed sheet and carrying same to the stack lowering elevator in alignment with a protector, to provide in a construction of the character last described means for automatically releasing the wet sheet and its protector substantially simultaneously, whereby the sheet and protector are permitted to drop individually on the stack lowering elevator and stack thereon; to provide in a construction of the character last described feeler mechanism adapted to contact the top protector on the stack lowering elevator to impart motion to the elevator, causing same to move downwardly the thickness of a protector and sheet.

Other objects of the invention are to provide, in a construction of the character described, means associated with each of the low speed elevators for simultaneously manipulating movable shelves functioning to move into and out of operative position to receive or relieve a stack; to provide in a construction of the character last described means for raising the high speed elevator on the stack lowering side of the machine to a position where it will receive a wet stack from the downwardly moving low speed stack lowering elevator; to provide similar mechanism acting in reverse for actuating the high speed elevator on the stack raising side of the machine to carry upwardly a dry stack to the low speed stack raising elevator moving upwardly toward ejecting mechanism; to provide in a construction of the character described a positively actuated ejector adapted to contact the inner edge of the top protector to move same forwardly relative to the stack, in combination with suction mechanism adapted to be imposed through apertures in the protector to separate the oiled sheeet from the stack and carry it forward with its protector; to provide in combination with the construction last described means for stripping and separating the dry oiled sheet from its protector, said latter means leading to a suitable collector for a dry stack of oiled sheets.

To provide gripper mechanism associated with said endless conveyor for gripping the separated protector at that point and carrying it around the machine to the stack lowering elevator where the protector meets another wet severed sheet; to provide in a construction of the character last described means for gripping each protector and independently operable means for gripping the paper sheet; to provide in a construction of the character last described protector gripping elements maintained closed under a constant spring tension and opened only by mechanical means; to provide in a construction of the character last described paper gripping elements maintained open and closed only by a positively actuated means.

To provide a clutch mechanism for functioning the movable shelves carried by the low speed elevators, which clutch mechanism is operated in turn by cams carried by the low speed elevators; to provide a separate independently operable clutch mechanism for functioning the high speed elevators, which clutch mechanism in turn is actuated by cams carried by the low speed elevators.

To provide feeler mechanism adapted to normally contact the top of the stack in each of the stack lowering and stack raising elevators, which feeler mechanism has cooperative association with mechanism for moving the low speed elevators.

To provide mechanism for actuating all of the aforementioned mechanisms in synchronized relation from one main drive.

In the drawings, Figs. 1 and 1a are side elevational views of the complete machine, omitting the printing and oiling mechanism.

Figs. 2 and 2a are similar views taken from the other side of the machine.

Fig. 3 is a diagrammatic elevational view of the printing, oiling and severing mechanism associated with the front end of the machine, looking at the side illustrated in Figs. 1 and 1a.

Fig. 4 is a diagrammatic elevational view of the side of the machine illustrated in Figs. 1 and 1a, with the frame and unnecessary mechanism removed.

Fig. 5 is a vertical sectional view taken on line 5—5 of Fig. 2a, looking in the direction of the arrows.

Fig. 5a is a vertical sectional view taken on line 5a—5a of Fig. 28.

Fig. 6 is an enlarged fragmentary elevational view of the receiving end of the machine illustrating the mechanism for, and manner of manipulating the protectors.

Fig. 8 is a vertical sectional view taken on line 8—8 of Fig. 7.

Fig. 8a is a cross sectional view taken on line 8a—8a of Fig. 8.

Fig. 8b is a fragmentary elevational view of the spring tensioned mechanism for actuating the protector grippers.

Fig. 8c is a vertical sectional view taken on line 8c—8c of Fig. 8a.

Figs. 9, 10, 10a, 11 and 12 are fragmentary diagrammatic side views of the mechanism for actuating the board and paper grippers, illustrating, respectively, the steps of gripping the board and paper; releasing both the board and paper grippers to drop the board and paper on the stack lowering elevator, after which the board gripper closes under spring tension; the mechanism for opening the board gripper to receive a board from the stack on the stack raising elevator; and the final step of gripping the board just removed.

Fig. 13 is an enlarged fragmentary elevational view taken from the side of the machine shown in Figs. 2 and 2a and illustrating the feeler mechanism.

Fig. 14 is a vertical sectional view taken on line 14—14 of Fig. 13 looking in the direction of the arrows.

Fig. 14a is a vertical sectional view taken on line 14a—14a of Fig. 14.

Fig. 14b is a cross sectional view taken on line 14b—14b of Fig. 14a looking in the direction of the arrows.

Fig. 15 is a fragmentary sectional view taken on line 15—15 of Fig. 13.

Fig. 16 is a vertical sectional view taken on line 16—16 of Fig. 5 looking in the direction of the arrows.

Figure 19:
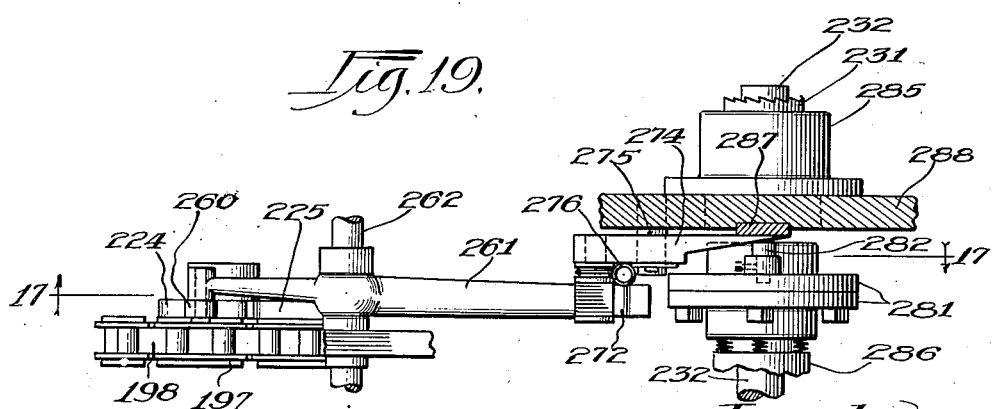

Fig. 17 is a vertical sectional view taken on line 17—17 of Fig. 19.

Figure 7:
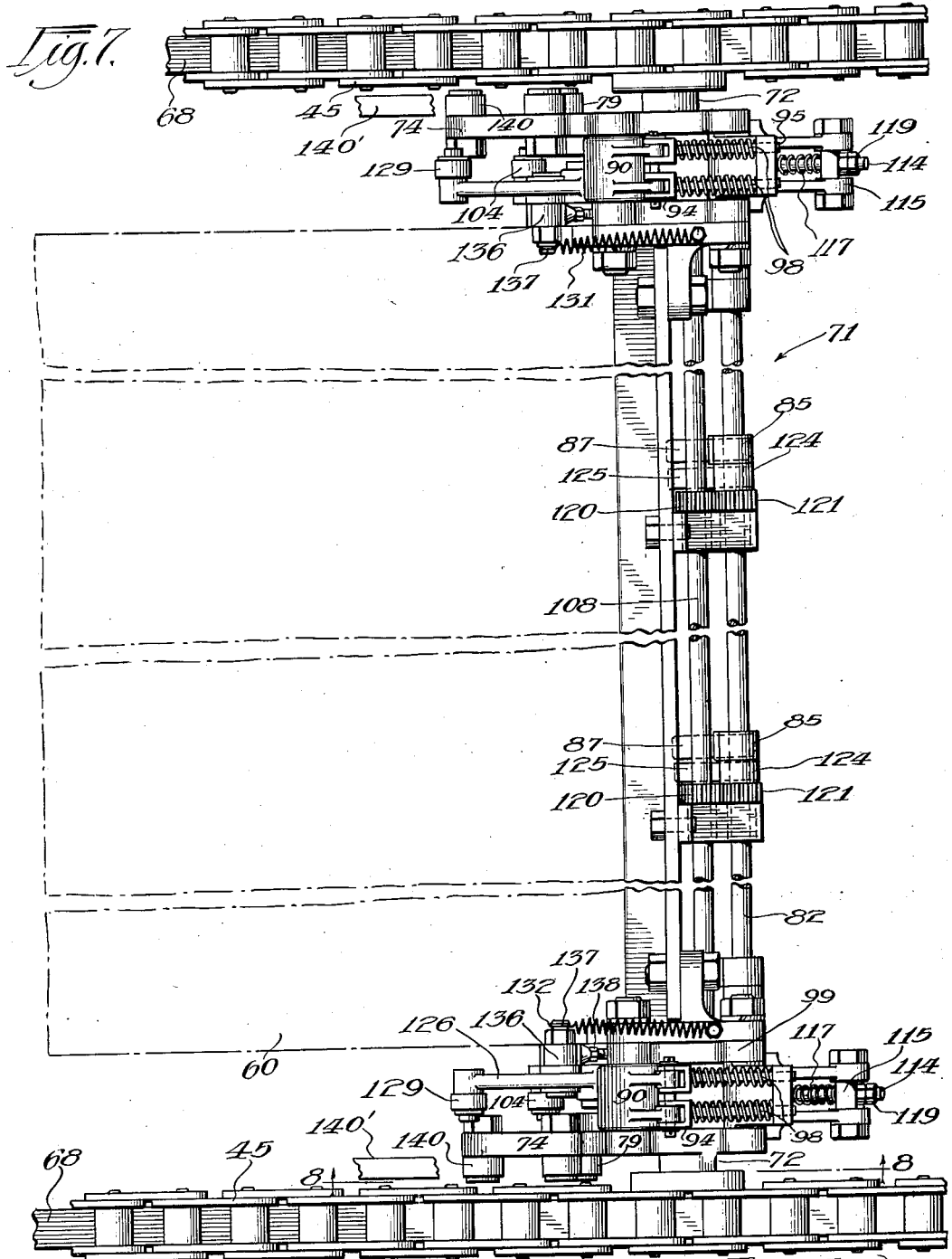
Fig. 7 is an enlarged fragmentary plan view of the conveyor carrying the gripper mechanism.
Figure 18:
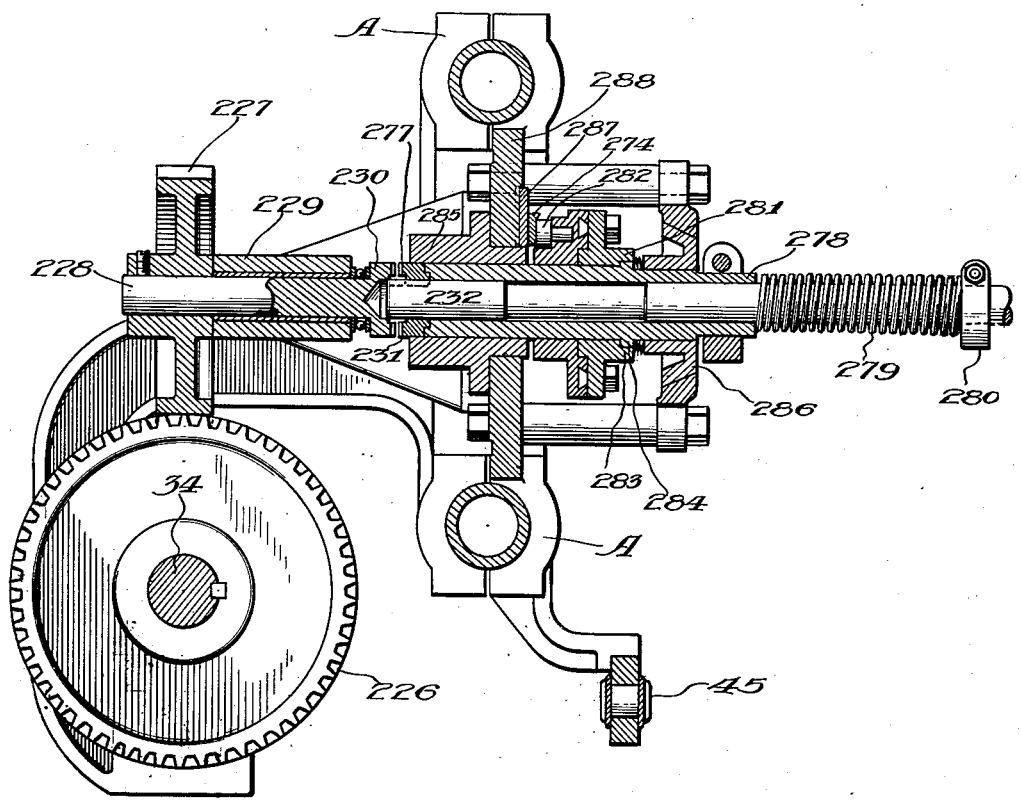

Fig. 18 is a vertical sectional view taken on line 18—18 of Fig. 16 looking in the direction of the arrows.

Fig. 19 is a transverse sectional view taken on line 19—19 of Fig. 16.

Fig. 20 is an enlarged elevational view of the stack lowering mechanism looking into the mechanism in the direction of the arrows shown on line 20—20 of Figs. 5 and 22.

Fig. 20a is a view similar to Fig. 20, but illustrating the stack raising side of the machine.

Fig. 21 is a vertical sectional view taken on line 21—21 of Fig. 20.

Fig. 22 is a plan view of the mechanism shown in Figs. 20 and 21.

Fig. 23 is a cross sectional view of the mechanism on the stack lowering side of the machine, taken on line 23—23 of Fig. 22, looking in the direction of the arrows.

Fig. 23a is a view similar to Fig. 23, illustrating the reversed position of similar mechanism on the stack raising side of the machine.

Fig. 24 is a cross sectional view taken on line 24—24 of Fig. 23, or Fig. 23a.

Fig. 25 is an enlarged fragmentary detail of the tripping mechanism illustrated in Fig. 23.

Fig. 25a is an enlarged fragmentary detail of the tripping mechanism illustrated in Fig. 23a.

Fig. 26 is a vertical sectional view taken on line 26—26 of Fig. 22 looking in the direction of the arrows.

Fig. 27 is a cross sectional view taken on line 27—27 of Fig. 21.

Fig. 28 is an elevational view, partly in vertical section, illustrating the stack lowering or wet elevator, looking into the machine from the side illustrated in Figs. 1 and 1a, the view being a sectional view taken on line 28—28 of Fig. 30.

Fig. 29 is a similar view of the stack raising, or dry elevator.

Fig. 30 is a transverse sectional view taken on line 30—30 of Fig. 5.

Fig. 31 is an enlarged fragmentary detail plan view of the shelf moving mechanism shown in Fig. 30.

Fig. 32 is a vertical sectional view taken on line 32—32 of Fig. 31.

Fig. 32a is an enlarged fragmentary perspective of the mechanism illustrated in Fig. 31, with parts disassembled for better illustration.

Fig. 33 is an elevational end view of the mechanism illustrated in Fig. 31.

Fig. 33a is a cross sectional view taken on line 33a—33a of Fig. 31 looking in the direction of the arrows.

Fig. 34 is a fragmentary plan view, partly in transverse section, illustrating the mechanism for removing and ejecting the protector and sheet from the stack raising or dry elevator.

Fig. 35 is an enlarged vertical sectional view taken on line 35—35 of Fig. 34.

Fig. 36 is an enlarged vertical sectional view taken on line 36—36 of Fig. 34.

Fig. 37 is an enlarged vertical sectional view taken on line 37—37 of Fig. 34.

Fig. 38 is an enlarged vertical sectional view taken on line 38—38 of Fig. 34.

Fig. 39 is a transverse sectional view taken on line 39—39 of Fig. 38.

Fig. 40 is a plan view of the protector illustrating its apertures surrounding the oil spots on the paper.

Fig. 41 is a cross sectional view taken on line 41—41 of Fig. 40.

Figs. 42, 43 and 44 are plan views, illustrating the continuous sheet fed from the roll during the different initial printing stages before being severed into smaller sheets and fed to the machine of this invention.

The machine comprises in combination certain elements and mechanisms, actuated simultaneously and operating in synchronized relation through one main power source or drive. Briefly these elements and mechanisms comprise:

Oiling and severing mechanism.
Conveyor for severed wet sheets.
Conveyor for protectors, carrying tripping mechanism.
Stack lowering;
   (a) Low speed rotary elevator carrying movable selves and cams for actuating the movable shelves and high speed elevator;
   (b) High speed reciprocating elevator carrying fixed shelves.
Stack raising mechanism;
   (a) High speed reciprocating elevator carrying fixed shelves.
   (b) Low speed rotary elevator carrying movable shelves and cams for actuating movable shelves and high speed elevator.
Feeler mechanism, and connection therebetween with mechanism for moving low speed elevator.
Independently operable grippers carried by protector conveyor;
   (a) Board grippers constantly closed under spring tension and positively opened;
   (b) Paper grippers constantly opened under spring tension and positively closed.
Clutch for operating movable shelves, actuated by cams carried by low speed elevators.
Clutch for operating high speed elevators, actuated by cams carried by low speed elevators.
Ejector comprising a pusher for the protector and suction mechanism for the sheet.

*Border printing, tinting, oiling and reversing mechanism*

Referring more particularly to Fig. 3, a roll 1 of paper of suitable character is mounted on the shaft 2 and is fed to the mechanism which prints the borders, tints one surface, places the oil blots and severs the continuous strip into separate sheets. In Fig. 3 I have illustrated in full lines the travel of the sheet 1 only to the tinting and oiling mechanism, but an operation will be described in which a border and a return address as well are printed simultaneously with the passage of the sheet through this part of the machine.

The continuous sheet 1', as shown in dotted lines, is fed from the roll 1 between suitable draw rolls 2' and between the cylinders 3, 4 and 5. The cylinder 3, which in this instance, is a border printing means, is mounted on a suitable shaft, and its surface receives ink through a chain of conventional composition and fountain rolls, illustrated as a whole at 3', to which ink is supplied from the fountain illustrated at 3''. The cylinder 4 is merely an impression or bed cylinder. The cylinder 5 may be utilized for the purpose of printing a return address. Ink is provided for the cylinder 5 through the medium of conventional composition and fountain rollers 5' to which ink is supplied from the fountain 5''.

It will be understood that the sheet 1' may be of any width, and in normal operation the dies on the cylinders 3 and 5 will be so arranged as to print on spaced areas of the sheet and still utilize as much of the sheet for the final envelope as is possible, as illustrated in Fig. 42.

The sheet 1' after leaving the cylinders 3 and 5 may pass between the cylinders 6 and 7. The cylinder 6 in this instance is a tinting cylinder for applying a tint to that surface of the sheet 1' opposite that to which the border and return address were applied by the cylinders 3 and 5, leaving open a space corresponding to what will eventually be the window of the envelope. Cylinder 6 is suitably mounted on a shaft and ink is supplied thereto by means of conventional composition and fountain rollers 6' and fountain 6''. 7 is an impression or bed cylinder suitably mounted on a shaft.

From the tinting mechanism, the sheet 1' may be fed to the mechanism which applies oil on spaced areas in the spaces left open in the tinting operation. This oiling mechanism may comprise the oil cylinder 8 and impression or bed cylinder 9. Cylinders 8 and 9 are suitably supported on shafts in the same manner as the other cylinders just described. Oil is applied to the face of the oil cylinder 8 through conventional composition and fountain rollers 8' and fountain 8''. 10 illustrates a receptacle placed under the rollers 8' for catching any drip.

The fountain 8'' may be mounted on a shaft 11 on the end of the frame 19 in such a manner that, when the machine is idle, the entire fountain may be swung down (as illustrated in dotted lines) and placed in a bath of solvent contained in the receptacle 12. This is important for the reason that the oil used in the manufacture of one-piece window envelopes is of a character that solidifies. Therefore, some means must be provided to readily clean the fountain 8'' when the machine is not in use.

The sheet 1' has had applied to it borders, return address, tint and oil blots, as illustrated in Fig. 44. It will be noted that the oil blots have been placed at irregularly spaced points on the continuous sheet.

The sheet is now fed to a transverse severing mechanism illustrated as a whole at 13, comprising a fly knife 14 mounted on shaft 15, and a stationary knife 16 mounted on support 17. The severing mechanism severs the continuous sheet into strips of a predetermined length containing a predetermined number of oil blots. In practical operation each strip may contain approximately the number illustrated in Fig. 40. From the severing mechanism the strips fall on the travelling belts 18 which feed the strips to the receiving end of the mechanism which automatically inserts and removes the protectors.

In Fig. 3 I have illustrated in a diagrammatic way the mechanism for applying the border, return address, tint and oil blot, for the reason that this part of the machine will utilize standard conventional printing machinery and, therefore, it requires no detailed illustration or explanation. The different cylinders described, as well as the composition rollers, fountains and transverse cutter mechanism are all suitably mounted on a frame designated as a whole at 19. I claim no particular novelty in the mechanism illustrated in Fig. 3 except as same may be claimed in combination with the mechanism for automatically inserting and removing the protectors. It is obvious, of course, that anyone of the steps enumerated may be eliminated. For instance, it may be desired to eliminate the return address in some instances. This can be done in an obvious manner. Or, in other instances where the paper used does not require it, the tinting step may be omitted. In explanation, it may be stated here that the type of paper used in the manufacture of one-piece window envelopes generally requires a tint on the inside to render it opaque.

It may be well at this point to describe the drive for the sheet conveying belts 18, and the manner in which this drive is synchronized in timed relation with the rest of the machine.

Referring more in detail to Figs. 1 and 2a, a motor 20 is provided with a shaft 21, which shaft carries pulley 22 driving pulley belt 23 and rotating pulley 24 mounted on shaft 25, bearing in frame 19. A pinion 26 is keyed to shaft 25, meshing with spur gear 27 mounted on shaft 28 bearing in frame 19. Spur gear 27 meshes with a gear 29 mounted on a shaft 30 bearing in brackets supported on frame 19. Gear 29 in turn meshes with a gear 31 mounted on shaft 15, which shaft 15, as has heretofore been described, carries the fly knife 14. Shaft 30 also has keyed to it a bevel gear 32, meshing with bevel gear 33 mounted on the main drive shaft 34 supported on suitable brackets forming part of frame 19 and main frame A. The main drive shaft 34 extends the entire length of the machine, as illustrated in Figs. 2 and 2a.

The drive shaft 34 carries a bevel gear 35, (Fig. 13) which in turn meshes with a bevel gear 36 mounted on a shaft 37. The shaft 37 carries a gear 38, which in turn meshes with a small pinion gear 39 mounted on a shaft 40. The shaft 40, on one end, (Fig. 1) carries a sprocket 41 for the reception of the sprocket chain 42. A corresponding sprocket 43, mounted on a shaft 44, is suitably journalled in the frame 19. The shafts 40 and 44 carry a series of spaced pulleys 40' (Fig. 6) intermediate their length for driving the tapes or belts 18. The tapes 18 have been described as functioning to convey the wet severed sheets from the fly knife 14 to the inlet end of the mechanism which automatically inserts and removes the protectors.

Describing now the drive for the chain conveyor which carries each protector singly from the stack raising or dry elevator back to the stack lowering or wet elevator—the chain conveyor is designated as a whole 45, driven by the sprocket gear 46 mounted on shaft 47 (see Figs. 1a and 2). The shaft 47 carries a spur gear 48 meshing with a driving gear 49 mounted on shaft 50. The shaft 50 also carries a bevel gear 51 (Fig. 2) adapted to mesh with a bevel gear 52 keyed to the main drive shaft 34. The arrangement is such that drive is transmitted from the main drive shaft 34 to the bevel gear 52, which in turn drives bevel gear 51 and shaft 50, causing gear 49 to drive gear 48. Gear 48 being keyed to shaft 47 will cause sprocket wheel 46 to be rotated, thus driving the chain conveyor 45. At the inlet end of the machine, the chain conveyor 45 registers with sprocket gear 53 mounted on shaft 54 (Figs. 1 and 2a).

Thus, it will be seen that the drive for the printing, oiling and severing machinery illustrated in Fig. 3 is synchronized in timed relation with the drive for the tapes 18 and conveyor 45 so that the grippers carried by the conveyor 45, hereinafter to be described in detail, will meet the wet severed sheet being conveyed by the tapes 18 at the exact time.

*Stack lowering and stack raising elevators*

In Fig. 4 I have illustrated in a diagrammatic way, with the frame A and other unnecessary parts removed, the stack lowering or wet elevator and the stack raising or dry elevator, together with the trippers, cams, ejecting mechanism, etcetera, necessary to properly illustrate same. The wet severed sheets of paper are conveyed by the conveyor 18 to a point just adjacent the inlet side of the stack lowering or wet elevator, designated as a whole at 55. Adjacent the inlet end of elevator 55 and mounted on frame A is a stationary cam 56 adapted to function mechanism carried by chain conveyor 45 to actuate gripping fingers also carried by chain 45, causing them to close and grip the sheet of paper and carry same to a position over and above the stack lowering elevator 55. Since the chain 45 is driven in timed relation with the balance of the machine, the inner edge of the protector carried by conveyor 45 will be brought up to a point at which the inner edge of the paper is gripped at the proper time so that the inner edge of the protector will be aligned with the inner edge of the sheet, as shown in Fig. 9.

The gripper mechanism is designed to be actuated to drop the protector and a wet sheet on the wet elevator 55. For this purpose a cam 57 supported on frame A is provided for releasing the paper gripper, while a cam 58, also suitably supported on frame A, is provided to release the board gripper. The positioning of the fixed cams 57 and 58 is such that the gripping elements are released substantially simultaneously so that the edges of the sheets and protectors will be substantially aligned on the elevator 55. The arrangement is such (see Figs. 9 and 10) that the sheet 59 is underneath, while the protector 60 is above.

It is, of course, obvious that the operation is continuous, that is, that the conveyor chain 45 is carrying protectors around continuously, and that wet sheets are being carried continuously by the tapes 18 to the wet elevator. Thus, a stack builds up on the elevator 55 comprising wet sheets and interposed protectors. The elevator 55 is driven in timed relation through mechanism hereinafter to be described so that the elevator moves downwardly slowly as wet sheets and protectors are deposited on the top thereof. The elevator 55 comprises a low speed and a high speed elevator. The low speed elevator moves downwardly from the top of the elevator, while the high speed elevator moves up and down in a restricted path at the base of elevator 55 to receive a stack of a predetermined height at the proper time.

The arrangement is such that the stack moving downwardly has continually added to it wet sheets and protectors. At the proper time, it is desired to remove that stack on a truck 61, the high speed elevator having moved up to a certain point, and when the base of the stack reaches that point the stack is transferred to the high speed elevator and thereafter deposited on the truck 61. The truck 61, containing a stack of wet sheets and interposed protectors, is taken out of the machine and placed in a drying oven or the like. All this time the machine is continuously operating without interruption. The chain 45 carrying the board and paper grippers continues on after depositing the board and paper on the wet elevator stack, the chain 45 travelling to the dry elevator stack.

This brings us to the pile raising or dry elevator, designated as a whole at 62. The wet stack removed on the truck 61 to a dryer, oven, or the like, remains there for a period of twelve to forty-eight hours, more or less, to insure sufficient time and sufficient heat to cause the oil to thoroughly saturate and impregnate the fibers of the paper and completely dry. The truck 61 containing a stack of dry sheets and interposed protectors is removed from the dryer or oven and wheeled into the stack-raising side of the machine. It is, of course, obvious that the operation of removing a wet stack and inserting a dry stack is going on all of the time and that there are a large number of stacks being dried at any one time, thus permitting a dry stack to be withdrawn and a wet stack to be substituted therefor in the dryer or oven.

The dry elevator 62, likewise, is made up of a high speed elevator and a low speed elevator, the high speed elevator being located at the base of the dry elevator 62. The arrangement is such that at the proper time the high speed elevator is actuated to remove a stack containing a predetermined number of dry sheets and protectors from the truck 61 carrying same up to the base of the low speed elevator. After the high speed elevator has reached its maximum upward travel, the low speed elevator relieves it of its load, the low speed elevator then carrying said load upwardly while the high speed elevator is actuated to move downwardly to normal position in readiness to receive another stack of dry sheets from the truck 61. The stack carried on the low speed elevator moves up to a point where it is in position to cause the ejection and separating of a protector and the sheet underneath it.

The ejecting mechanism is designated as a whole at 63, the arrangement being such that a positive ejector is brought into contact with the inner edge of the top protector to force same outwardly from the top of the stack, as shown in Fig. 37. Cooperatively associated with the ejector mechanism 63 is an intermittently operated source of vacuum applied through apertures in the protector whereby the dry sheet therebelow is likewise simultaneously removed from the dry stack and carried along to a point where it is separated from the protector. Interposed below the outwardly moving dry sheet is a suction roll 66 which functions to strip and separate the dry sheet 59', which may be then collected in any suitable receptacle or stack. Immediately adjacent to the suction roll 66 there is disposed a cam 67 supported on frame A adapted to actuate the board gripping elements carried by the conveyor 45, causing them to grip the protector which has just been ejected and carry same back to the starting point, as illustrated particularly in Fig. 6.

The conveyor 45 is guided in suitable tracks. While travelling on top the conveyor is illustrated as riding on top of a track 68 (Fig. 4), while, when travelling below, it may ride in the track 69. Above the track 69 there is a second track 70 to prevent vibration and misalignment. The track 70 is raised from a point approximately midway between the wet elevator 55 and dry elevator 62 to a point beyond dry elevator 62 for the purpose of accommodating the ejector mechanism 63, thus permitting the gripping elements carried by conveyor 45 to clear the ejector mechanism 63.

Gripping mechanism

The conveyor 45 comprises two transversely spaced endless chains, one disposed on each side of the machine. The chains 45 may be of the link and roller type, or may take any other conventional form. Extending between the chains across the machine and connected to move therewith are a number of spaced apart gripping mechanisms, designated as a whole 71 (see Figs. 7 to 11).

Projecting inwardly from, and fixedly connected to, the inner sides of each chain are gripper supports 72. Each gripper support 72 terminates in a trunnion or pin 73 on which is pivotally mounted a frame 74 for supporting a part of the gripper mechanism. Each frame 74 intermediate its length supports a trunnion or pin 75, on which the board gripping actuating mechanism is pivotally mounted. Pin 75 projects outwardly from a hub 76 comprising part of a casting including the arms 77 and 78 integral with the hub 76. The arm 77 terminates in a hub and trunnion which carries a roller 79. The other arm 78 terminates at its rear end in a segmental gear 80 adapted to mesh with a gear 81 keyed to shaft 82. A portion of the arm 78 projects upwardly, terminating in a hub and trunnion 82' carrying a roller 83.

Across the length of the shaft 82 in predetermined spaced relation, there may be provided a number of board grippers, designated as a whole 84, each comprising a collar 85 keyed to the shaft 82 by means of the set screw 86. Each collar 85 encircles shaft 82 and carries cooperatively associated with it a finger 87, which fingers are adapted to be manipulated to grip the protector. It is to be understood that the fingers 87 are fixedly connected to and rotate with the collars 85.

In use and operation, the board gripping fingers 87 are so designed as to normally be maintained closed under spring tension, being positively and mechanically opened to release the board on the wet elevator, returning to closed position immediately thereafter, being opened again at the point where they are to grip the protector being separated after removal from the dry stack and permitted to close to grip said protector and carry same over the machine and back to the wet elevator where they are to be again opened. These means for maintaining the grippers 87 in closed position will now be described.

The roller 83 is normally held up by means of the bar 88 projecting outwardly in the path of movement of said roller from the boss 89 carried by the casting 90, which casting rotates on bearing 91 encircling shaft 92. Projecting upwardly from the casting 90 are two ribs or arms 93, the upper ends of which are connected with the bifurcated ends 94 carried by each of the rods 95, the other end of which rods slide in an aperture 96 in a supporting frame 97. Interposed between the inner faces of the supports 97 and bifurcated ends 94 are compression springs 98. The arrangement is such that as the arm 78 is rocked downwardly when the roller 79 contacts cams 58 and 67 to open the board grippers 87, the spring 98 will be compressed (as indicated in dotted lines in Fig. 8b). As soon as the roller 79 rides off either of the cams 58 or 67, the spring 98 will expand to its normal position and cause the board gripper 87 to return to closed position through the mechanism just described. The full line illustration in Fig. 8b shows the normal position of the mechanism, while dotted lines illustrate the position of the mechanism when the board gripper 87 has been forced open by means of the cams 58 or 67.

A second frame 99 completes the support for the grippers, the frame 99 comprising the support for the mechanism which opens and closes the paper grippers. The frame 99 is loosely mounted on shaft 82, a suitable bearing 100 being interposed between it and the shaft 82. At the opposite end of the frame 99 there is pivotally mounted through the medium of the trunnion 101 an arm 102, terminating in a trunnion 103 on which is mounted the roller 104. The roller 104 is the roller which is adapted to contact the cam 56 (Fig. 9) to close the paper grippers, which are normally held open by a spring, hereinafter to be described, and grip the wet severed sheet of paper. The roller 104 rides on cam 56, rocking arm 102 on its pivot 101.

The arm 102 has an extension 105 terminating in a gear segment 106 adapted to mesh with gear 107 keyed to shaft 108, which gear 107 meshes in turn with a gear 109 loosely mounted on the shaft 82 and pinned through the medium of the pins 110 to a collar 111, also loosely mounted on shaft 82. The collar 111 (Fig. 8c) is provided with a projection which may be cut away inwardly, as shown at 112, to receive the bifurcated end 113 of a rod 114, loosely mounted in the support 115. A pin 116 connects the bifurcated portion 113 with the portion 112. A coil spring 117 encircles rod 114, being confined between the inner face of the bifurcated end 113 and the inner face of the support 115. The outer end of the rod 114 may be screw threaded, as shown at 118, to receive the adjustable nuts 119, which can be manipulated to increase or decrease the tension of the spring 117.

The shaft 108 also has keyed to its gears 120 which in turn mesh with gears 121, loosely mounted on the shaft 82, but pinned by means of the pins 122 to paper grippers, designated as a whole 123. Each paper gripper comprises a collar 124 having connected thereto a finger 125.

From the foregoing it will be understood that the board grippers 87 are maintained closed at all times under spring tension by means of the springs 98, except when they are opened positively by cam 58 and cam 67. The paper grippers 125 are always maintained open by means of the spring 117, except when the roller 104 meets cam 56 which rotates the gears 107 and 109 and thus the collar 111 to the dotted line position shown in Fig. 8c. It will be noted that the rotation of the collar 111 is past center so that when the paper gripper has been actuated to grip the paper by the cam 56, it will be retained in that closed position by the spring 117, as illustrated in dotted lines in Fig. 8c. While the rod 114 is in the position illustrated in dotted lines in Fig. 8c, the paper gripping finger 125 will be held closed in paper gripping position.

The positive mechanism for releasing the paper gripping finger 125 to release the paper will now be described. The mechanism at this time is in the position illustrated in Fig. 10. An arm 126 is pivoted at 127 to supporting frame 99. This arm has an upstanding projection carrying a trunnion 128, on which is mounted a roller 129. It is also provided with a downward projection carrying a hardened steel plate 130. As the gripping mechanism is moved forwardly by the chain 45, the roller 129 comes in contact with the downwardly slanting face of the cam 57, causing the arm 126 to rock on its pivot 127. By the mechanism heretofore described, the arm 102 carrying the paper gripping actuating roller 104 has been forced upwardly to the dotted line position indicated in Fig. 8, or in full lines in Fig. 10. The rocking of the arm 126 downwardly will cause the face of the hardened plate 130 to contact the roller 104 and force same downwardly to normal position, illustrated in full lines in Figs. 8 and 10a. The arm 126 will be held down until the roller 129 passes the low point of the cam 57, after which arm 126 is gradually returned to normal position under the influence of spring 131, which spring is connected to a portion of the arm 126 at 132 and anchored to a fixed member 133 projecting upwardly from a portion of the supporting frame 99. The face of the cam 57 from its low point slants upwardly to permit the arm 126 to return gradually to normal position under the influence of spring 131 to prevent the arm from jerking or flying upwardly to normal position.

Means are provided for permitting adjustment of the arm 126 slightly upwardly or downwardly as may be required to take care of initial adjustment and wear. This adjustment also functions as a stop to prevent excess upward movement of the arm 126 in its return to normal position. The adjustment comprises a screw bolt 134 adapted to have screw threaded adjustment with a boss 135 projecting from the casting, including the collar 136, mounted on a shaft 137, which shaft is supported in the arm 126. The outer end of the screw bolt 134 is adapted to contact a portion of the supporting frame 99. Thus, when the screw bolt 134 is rotated inwardly, the arm 126 will be raised upwardly due to the spring 131, while if it is rotated outwardly, the arm 126 is moved downwardly. For the purpose of locking the screw bolt 134 in any position of adjustment I provide the lock nut 138.

To insure that the protectors will not be unintentionally released from engagement with the grippers 87 while passing from the upper track to the lower track (see Fig. 6), I provide a guide roller 139 projecting from the supporting frame 74 adapted to ride in the guide track 70. Thus, as the gripping mechanism begins to move around the left end of the machine illustrated in Fig. 6, the frame 74 will be guided by engagement of the roller 139 with the guide track 70, preventing opening of the gripping fingers and properly carrying the protector. Another guide roller 140 (Fig. 8) may be mounted on the supporting frame 74 adapted to ride on auxiliary guide tracks 140' (Fig. 7) located adjacent to and inside of guide tracks 69 for the purpose of preventing rocking of the gripper mechanism during the time it is travelling in a horizontal plane.

Feeler mechanism

The stack lowering or wet elevator has motion imparted to it by mechanism placed in operation through the medium of feelers adapted to contact the upper sheet in a stack, the arrangement being such that the elevator is moved downwardly only a distance corresponding to the thickness of a wet sheet and its protector, and nor more, which movement is imparted to it by mechanism operated through cooperative association with the feelers. If for any reason a protector and its wet sheet is not dropped on the lowering or wet elevator the feeler will be caused to travel further to make contact with the top sheet of the stack, since it has been lowered the thickness of a protector and wet sheet and will thus not actuate mechanism imparting a downward movement to the elevator.

This feeler mechanism will now be described. Referring more particularly to Figs. 13, 14 and 14a, the main drive shaft 34 carries a gear 141 adapted to mesh with a gear 142 keyed to shaft 143 bearing in a support 144 connected to main frame A. The shaft 143 carries a collar 145, which collar surrounds the shaft 143 and has a projecting slotted arm 146. A stud 147 projecting from the end of a bell crank arm 148 is adapted to register with the slot in the arm 146. The length of throw or extent of movement of the bell crank arm 148 determines the distance which the elevator travels to lower the stack. Some adjustment must be provided to permit the throw or travel of the arm 148 to be shortened or lengthened. Therefore, the arm 146 is slotted.

The stud 147 is locked in the slot in any position of adjustment by means of the adjustable nut 149 and the friction washer 150. The slot in the arm 146 may be provided throughout its entire length. The arm 148 terminates in a pin 151 carrying a pawl 152. The pin 151 also passes through an arm 153 projecting upwardly from the casting designated as a whole 154, the arm 153 functioning as a pivotally mounted guide to guide the movement of the pawl 152.

The arrangement is such that a positive drive is imparted from main drive shaft 34 through the meshing of gears 141 and 142 to move the bell crank arm 148 and pawl 152. Due to the fact that the arm 153 is pivoted on the pin 151, the positive drive for moving the bell crank arm 148 will cause the arm 153 to rock but, since the arm 153 comprises part of the casting 154, it will serve to guide the movement of the arm 148 and pawl 152. It is to be noted that the casting 154 is loosely mounted on a shaft 155 (Fig. 14a), which latter is supported in the stationary frame 144. The shaft 155 has keyed to it a ratchet wheel 156, the latter having a hub 157 surrounding the shaft and interposed between the shaft and the casting 154. The shaft 155 also has at one end a worm 158, adapted to mesh with a worm wheel 159 (Fig. 14) mounted on shaft 160. The shaft 155 also supports an arm 161 projecting from a clamping collar 162, the ends of which are united by means of bolt 163. The collar 162 surrounds a sleeve 164 loosely mounted on the shaft 155. The sleeve 164 is much greater in length than the collar 162, and projects through the frame 144 (see Fig. 14a) terminating on the opposite side of the latter. That portion of the sleeve 164 projecting on the opposite side of the frame 144 is surrounded by a clamping collar 165, the ends of which are clamped together by means of the bolt 166. It is understood, of course, that the purpose of using a collar of the clamping type illustrated at 162 and 165 is to permit adjustment of the arm 161 and the arm 167 projecting upwardly from the collar 165.

To the upper end of the arm 167 is pivotally and removably connected, by means of the bolt and nut 168, a bell crank arm 169, which is pivotally and removably connected by means of the bolt and nut 170 with an arm 171 terminating in a clamping collar 172 surrounding the shaft 173. The collar 172 may be of the clamping type, the ends of which are united by the screw bolt 174. The shaft 173 is journalled in bearings provided in the brackets 174' and 175, connected, respectively, to the supporting frame 144 and a supporting frame 175' comprising part of the main supporting structure A of the machine. Intermediate brackets 174' and 175 the shaft may have fixed to it a number of spaced feeler arms 176; the connection between each arm and the shaft 173 may take the form of a clamping collar 177, the ends of which may be united by the bolts 178. Each arm 176 comprises a main body portion substantially straight provided with a curved end terminating in a hub 179. A pin 180 is adjustably mounted in the hub 179, a set screw 181 being provided for locking the pin 180 in any position of adjustment in an obvious manner. The pin 180 is provided at its lower end with a small plate or foot 182 having a pivotal connection at 183 whereby the foot 182 may have limited pivotal movement relative to the stationary pin 180. The arm 171 may be provided with the slot 184 to permit adjustment (Fig. 14).

The arrangement is such that movement is imparted to the arm 148 as heretofore described, and from it to the pawl 152. The pawl 152 contacts the arm 161, which, through locking of the sleeve 164 with its collar 162, imparts movement to the arm 167. This in turn imparts movement to the bell crank arm 169, and from it to the arm 171. The arm 171 being fixedly connected to the shaft 173 will cause said shaft to oscillate, thus imparting movement to the feeler arms 176, which latter are also fixedly connected with the shaft 173.

In Fig. 14 I have shown in dotted lines the position of the feeler arms and associated mechanism in one position, at which time the feeler arm is not in contact with the stack, while I have shown in full lines in Fig. 14 the position of the feeler arms and associated mechanism when the feeler is contacting a sheet in the stack. Thus, as the arm 148 is moved downwardly from the position illustrated in Fig. 14, the pawl 152 contacting the projecting end of the arm 161 will move said arm downwardly while at the same time the pawl, registering with one of the teeth of the ratchet wheel 156, will also impart rotation to the ratchet wheel. The function of imparting rotation to the ratchet wheel will be hereinafter described.

By reference to Fig. 13 it will be noted that the pawl is wide enough to contact both the arm 161 and a tooth of the ratchet wheel 156 at the same time. When the arm 148 has moved downwardly as far as permitted, it will have moved the feeler arms 176 away from the top of the stack and into the dotted line position illustrated in Fig. 14. Thus, it is to be seen that the feeler arms are positively removed from the top of the stack to an inoperative position.

Now, for the purpose of causing the feeler arms to return to contact the stack, I provide a coil spring 185 (Fig. 14a), which spring encircles the shaft 173, has one end anchored in the bracket 175 and the other end in an adjustable collar 186 clamped to the shaft 173. To permit adjustment of the tension on the spring 185, the shaft may be screw threaded, as shown at 187, to permit engagement of a lock nut 188 therewith abutting against the wall of the collar 186. The spring 185 functions to maintain the shaft 173 under tension at all times. When the feeler arms 176 have been moved by the mechanism previously described to an inoperative position, as illustrated in dotted lines in Fig. 14, the spring 185 has been distorted. Therefore, just as soon as the arm 148 starts to raise, the arm 161 will also raise by the influence of the spring 185 returning to normal position, causing the feeler arms to rock and bring the feet 182 into contact with the top sheet of the stack.

As heretofore described, the spring 185 functions to maintain the shaft 173 under tension at all times. Therefore, when the feeler arms 176 do not make contact with a sheet in the normal position of said feeler arms, they will continue to rock downwardly until contact is made, or until it has been lowered to the thickness of, say two or three protectors. The dotted lines in Fig. 14b illustrate the normal position of the feeler arms 176 contacting the upper sheet of the stack when everything is operating as desired, while the full lines in Fig. 14b illustrate the feeler arms 176 contacting the top sheet of the stack when a sheet and protector have not been placed on top of the stack between an up and down movement of the feeler arms, causing the feeler arm to travel down the thickness of a sheet or board in order to contact the sheet which is then on top. When this occurs, the mechanism associated with the arm 176 moves with it, thus raising the arm 161 to the full line position illustrated in Fig. 14b, or Fig. 15, causing the pawl 152 to be released from engagement with the ratchet wheel 156. Thus, when the arm 148 moves downwardly in its next movement, the pawl 152 will be held from engagement with any of the teeth of the ratchet wheel 176 and the ratchet wheel will not be rotated.

As heretofore described, the feelers function, through associated mechanism, to lower the wet elevator a distance equal to the thickness of a protector and a wet sheet each time that a wet sheet and protector are dropped on the stack on the elevator. As long as a sheet and protector are dropped on top of the pile, the feelers in their up and down movement will contact the upper sheet at the point at which the mechanism has been adjusted to impart movement to the ratchet wheel 156. But, when no sheet and protector have been dropped on the pile it is desired that no motion be transmitted to the elevator. Thus, the feeler moves beyond the point at which the mechanism has been set to impart motion to the ratchet wheel 156 and throws the arm 161 up sufficiently to disengage the pawl 152 from engagement with the ratchet wheel 156, thus imparting no rotation to the ratchet wheel and consequently no movement to the elevator. The mechanism associated with the ratchet wheel 156 for imparting drive to the elevator will now be described.

The shaft 155 has keyed to it a worm 158 adapted to mesh with a worm wheel 159 mounted on the shaft 160. Shaft 160 is a vertical shaft carrying a bevel gear 189 (Fig. 2a), which in turn meshes with a bevel gear 190 mounted on a horizontal shaft 191. The shaft 191 is journalled in supports 192 forming part of the supporting structure A (Fig. 30). Intermediate its length the shaft 191 has keyed to it spaced spur gears 193, which in turn mesh with gears 194 keyed to a shaft 195. Between the gears 194 the shaft 195 carries sprockets 196 adapted to engage sprocket chains 197. The sprocket chains 197 move vertically around the lower sprockets 196 and upper sprockets 198 mounted on a shaft 199 journalled in the main frame A (Figs. 2a and 28).

The shaft 160 intermediate worm wheel 159 and bevel gear 189 has keyed to it a bevel gear 200 (Fig. 14) adapted to mesh with a bevel gear 201 keyed to a shaft 202, journalled in a bracket 202' (Fig. 13) supported on the main frame A. A bevel gear 203 (Fig. 2a) is carried on the other end of the shaft 202 adapted to mesh with a bevel gear 204 connected to the vertical shaft 160'. The shaft 160' is a shaft operating similarly to shaft 160 carrying bevel gear 189 adapted to mesh with bevel gear 190 keyed to shaft 191. The shaft 191 similarly extends transversely across the machine and is journalled in suitable supporting bearings 192. Intermediate its length it is provided with a spur gear 193 adapted to mesh with gear 194 keyed to shaft 195 carrying sprockets 196 adapted to register with sprocket chain 197. Each sprocket chain 197 rotates around its sprocket 196 and a sprocket 198 mounted on a shaft 199.

To avoid confusion I think it well to here point out that the lowering elevator comprises two sets of transversely spaced endless chains 197 rotating around sprockets 196 and 198. I have described the drive to and through one set of transversely spaced chains and have also described the synchronized transmission of that drive from this set of chains to the opposite set by means of bevel gears 201, 203 and 204, and vertical shaft 160'. Since the gears, sprockets, chains and shafts are identical in timed relation and operation on each side of the elevator, I have identified similar mechanisms by the same numerals.

The chains 197 may be of the link type. As described, there are two sets of chains for the low speed lowering elevator, each set being transversely spaced, disposed adjacent the sides of the elevator and the individual chains in opposite sets being parallel longitudinally. The elevator proper comprises the combination with each set of chains 197 of one or more shelves 205. At this point it may be well to explain that one set of chains 197 and associated mechanism is longitudinally spaced from the other set so as to leave a space 55 between them sufficient to manipulate the stack of board and paper sheets, as illustrated in Fig. 1. Spaced around the length of each set of transversely spaced chains 197 I may connect any number of shelves 205. I have illustrated the use of three shelves, and the mechanism will be described using that number, but it is to be understood that the illustration of three shelves is not to be taken as a limitation, since any number of shelves 205 may be used.

As a feature of the present invention, provision is made for moving the shelves 205 into and out of the space 55 heretofore described, the purpose being to receive the stack and to relieve it at the proper time. In Figs. 30 to 33a the numeral 206 illustrates guides in which are adapted to ride the rollers or pins 207 extending between links of the chains 197. Connected to the inner faces of selected links and in opposed relation are bracket plates 209 connected by means of transverse rods 210. A description of the operation of one bracket will be sufficient for all of the brackets. A unit comprises two transversely spaced opposed shelf-supporting plates 209. Each transversely spaced pair of plates is connected by means of the rods 211 functioning to support the movable shelf 205. Each plate 209 is connected with the chain through the medium of the shaft 212 passing through the aperture 213 in the plate and the aperture 214 in a spacer bushing 215.

Intermediate the length of the shaft 212 and adjacent each end thereof it is provided with a rack gar 216 and a pinion gear 217, the latter adapted to mesh with a gear segment 218. The arrangement is such that the usual pin passing through an adjacent pair of links to connect same is removed and the shaft 212 substituted therefor, the rack gear 216 being disposed on one side of the chain with the plate 209 interposed therebetween while the spur gear 217 is located on the opposite side of the chain, spaced from the latter by means of the spacer bushing 215.

The next pin in succession is also removed from the link chain and the supporting rod 211 directly below the shaft 212 is passed therethrough, anchoring in the aperture 219 of the spacer bushing 215, the object being that that supporting shaft 211 will function as an auxiliary support for the spacer bushing 215. The latter is provided with an extension below the aperture 219 adapted to be connected to the gear segment 218 by means of a stub shaft 220 keyed to the extension of the spacer bushing 215 and loosely held in the aperture 221 of the gear segment 218. A fixed pin 222 is connected to and projects from the outer face of the gear segment 218 for a purpose to be hereinafter more particularly described. The rack gear 216 is adapted to mesh with a rack 223 formed on one surface of the shelf 205, the arrangement being such that each shelf 205 is provided with a rack adjacent each outer end, as illustrated in Figs. 30 and 31.

Describing now the mechanism for causing opposed shelves 205 to move horizontally toward and away from each other, and first describing the mechanism for moving the shelves away from each other, one of the chains 197 is provided with three spaced pairs of cams 224 and 225 (Figs. 16 and 17) (one pair only being shown for clearness) which function the mechanism for operating the shelves. I use a pair of cams conforming substantially to the shape of a link in preference to a single cam, for the reason that the cam must have a long surface, and it would be necessarily to provide too long a surface on one cam to turn about the sprockets.

It is only necessary that one chain carry the cams 224 and 225. The cams 224 and 225 function clutch mechanism which will now be described.

*Clutch for operating shelves*

Drive is transmitted from the main drive shaft 34 to the gear 226 (Fig. 18) keyed to it, which gear in turn meshes with a gear 227 keyed to shaft 228, which latter may be journalled in the bearing 229. The inner end of the shaft 228 terminates in a clutch face 230 opposed to and adapted to register with a corresponding clutch face 231. The clutch face 231 is keyed to the shaft 232 journalled in bearing 233 (Fig. 5) supported on the main frame A and carrying on its other end a bevel gear 234 adapted to mesh with a similar bevel gear 234' (Fig. 1) keyed to shaft 235', which shaft in turn carries two spaced bevel gears 236', which in turn mesh with bevel gears 235 (Figs. 1 and 5) carried on the upper end of shafts 236 supported in the main frame A by means of brackets 237 and bearings 238. Adjacent its lower end, each upright shaft 236 is provided with a worm 239 adapted to engage and register with a worm wheel 240 (Figs. 30 and 1) carried by shaft 241, which shaft carries a cam 242 (Fig. 28). The cam 242 is provided on both faces with grooves 243 and 244 (Fig. 5a) in which are adapted to ride the rollers 245 and 246. Roller 245 is carried by a link 247, which in turn is carried by the upright rod 248 (Fig. 5). The upper end of the upright rod 248 is pivotally connected to a bell crank 249 (Fig. 28), which latter is pivotally connected at 250 in bracket 251 supported by main frame A. An arm 252 is integral with the bell crank 249, whereby movement imparted to the bell crank will swing arm 252 with it. The arm 252 is provided with a face 253 adapted to contact the pin 222 projecting from the face of the segment 218. Thus, rocking of the arm 252 on the pivot 250 will cause the face 253 to contact the pin 222 on the segment 218, rocking said segment on the pivot 220 and rotating the gear 217 keyed to the shaft 212, thus rotating rack gear 216, which is also keyed on shaft 212, which rack 216 meshes with the rack teeth 223 of the shelf. Thus, the two uppermost opposed shelves will be moved inwardly or toward each other to receive stock.

The roller 246 (Figs. 5 and 5a) is carried by a link 254, which in turn is connected to a short upright rod 255. The short upright rod 255 is pivotally connected to bell crank 256 (Fig. 28) which latter is pivotally mounted on shaft 257. An arm 258 is integral with bell crank 256, projecting downwardly below said shaft, provided with a face 259 adapted to contact the pin 222 projecting from the face of the segment 218 to cause the shelves 205 to be moved outwardly and away from each other.

Describing now the shelf-operating clutch mechanism, a roller 260 (Fig. 17) is carried on the end of a rocker arm 261 pivoted to the main frame at 262. The opposite end of the rocker arm 261 is pivotally connected to an upright bar 263 which is provided at its upper end with a hook or finger 264. Intermediate its length it is also provided with the cam 265 provided with a cam face 266. The bar 263 is adapted to ride vertically in the guide plate 267, which latter is connected to the main frame A. A coil spring 268 has one end connected to the bar 263, the other end being anchored on the stationary guide plate 267, the arrangement being that, as the cam 225 contacts roller 260, the arm 261 will rock on pivot 262, pulling down bar 263 against the tension of the spring 268. The cam face 266 contacts a roller 269 fixed in the guide plate 267, which causes the bar 263 to rock outwardly on the pivot 270.

The hook 264, in one position, is adapted to engage a similar hook 271 projecting from the lower end of a bar 272 adapted to have vertical movement in the guide plate 273 attached to main frame A. The upper end of said bar 272 is connected to one end of a wedge 274, which latter is pivoted to be rocked on the pivot 275. A coil spring 276 has one end connected with that end of the wedge 274 to which the bar 272 is connected, while the other end of said spring is anchored to the main frame A. Thus, as the bar 263 is pulled downwardly by rocking of rocker arm 261 by the cams 224 and 225, the engagement of the hooks 264 and 271 will also pull down the bar 272, but since the bar 263 is rocked progressively outwardly by contact of the cam face 266 with the roller 269, eventually the hook 264 will slide out from engagement with hook 271, at which time arm 272 will be restored to its normal position through the medium of the spring 276. While the arm 272 is being pulled downwardly it will rock the wedge 274 on pivot 275, raising the inner end of said wedge from the engagement which will now be described.

Wedge 274 is the instrumentality which causes engagement and disengagement of the clutch faces 230 and 231. In the position shown in Figs. 16 and 18, the wedge 274 is illustrated as separating the two clutch faces 230 and 231. This is accomplished as follows: The shaft 232, adjacent the end to which the clutch face 231 is connected, is provided with a key-way 277, in which a key carried by the clutch face 231 is mounted for limited horizontal slidable movement. A sleeve 278 surrounds shaft 232, fixedly connected to rotate and slide with clutch face 231. A coil spring 279 is interposed intermediate the length of shaft 232 and confined between the outer end of sleeve 278 and an adjustable clamp 280.

A stationary or fixed collar 281 surrounds the sleeves 278, which collar is provided with a hardened pin 282 and with a shoulder 283 adapted to contact with a similar shoulder 284 projecting from the sleeve 278. The arrangement is such that as the wedge 274 is restored to normal position by means of the spring 276 it will contact the hardened pin 282 wedging same outwardly. This in turn will move the collar 281 outwardly and through the contact of the shoulder 283 of said collar with the shoulder 284 of the sleeve 278 will force said sleeve outwardly against the tension of spring 279, disengaging the clutch face 231 from the clutch face 230. When the wedge 274 is rocked upwardly by the mechanism heretofore described, the spring 279 will force the sleeve 278 inwardly. The shoulder 284 of said sleeve contacting shoulder 283 of collar 281 will force the latter to close the space between it and stationary bearing 285. At the same time, the sleeve forces the clutch face 231 into contact and registration with the clutch face 230. In this movement, the only purpose of moving collar 281 is to restore it to normal position so that when wedge 274 again rocks to normal position under the influence of spring 276, said collar 281 will be in a position to be moved outwardly to carry the sleeve and clutch face 231 out of engagement, it being understood that the clutch face 231, under the influence of spring 279, always has a tendency to engage clutch face 230. It is to be understood further that clutch face 230 is rotating continuously, while clutch face 231 and shaft 232 only rotate when in mesh therewith. The sleeve 278 is journalled in bearings 285 and 286. A hardened plate 287 connected to a plate 288 forming part of the main frame A may be provided on the opposite side of the wedge 274, as illustrated in Figs. 18 and 19. The wedge preferably tapers from a knife-like blade.

*High speed stack lowering elevator*

Drive is transmitted from main drive shaft 34 through a gear 290 (Figs. 2a, 20, and 22) to a gear 291 keyed to shaft 292. Immediately behind gear 291 there is another spur gear 293 also keyed to shaft 292. The spur gear 293 meshes in turn with a spur gear 294 keyed to shaft 295. The shaft 295 extends longitudinally of the machine parallel to the main drive shaft 34 and is journalled in suitable bearings in a supporting frame 296 supported by main frame A. Intermediate the length of shaft 295 there is keyed to it a sliding clutch collar 297, provided with two annular flanges 298 spaced from each other to form an annular recess 299. The collar 297 projects beyond each side of the flanges 298 for a short distance, terminating in clutch faces 300 and 301. The arrangement is such that the collar 297 is keyed to rotate with shaft 295, but is slidable thereon longitudinally of the shaft for a distance sufficient to permit clutch faces 300 and 301 to mesh with corresponding clutch faces to be presently described.

Also, intermediate the shaft 295 and positioned on both sides of the collar 297 are loosely mounted sleeves 302 and 303. Sleeve 302 has fixedly connected to it a bevel gear 304, while sleeve 303 has a similar bevel gear 305 fixedly connected thereto. Each of the bevel gears 304 and 305 meshes with a bevel gear 306 keyed to vertical shaft 307. Shaft 307 terminates in a bevel gear 308, meshing in turn with a bevel gear 309 keyed to horizontal shaft 310 (Fig. 2a), bevel gear 309 meshing in turn with bevel gear 311 keyed to vertical shaft 312. Shaft 310 terminates on its other end in a similar bevel gear 309 (Fig. 2a), meshing with a similar bevel gear 311 keyed to vertical shaft 312, the arrangement being such that the shaft 310 transmits drive from one side of the machine to the other side. Each of the shafts 312 terminates in a worm 313, each meshing in turn with a worm wheel 314 keyed to shaft 315, which shafts 315 extend transversely of the machine. Each of the shafts 315 (Fig. 5) has keyed to it adjacent each end of each shaft a sprocket 316, with which sprocket chain 317 is adapted to register.

Disposed a short distance above each of the sprockets 316 is a similar sprocket 318 around which sprocket chains 317 travel. Each of the sprockets 318 is keyed to a shaft 319, which shafts are journalled in suitable bearings carried by brackets 320 projecting from the main frame A.

It may be well to here explain that the arrangement of sprockets 316 and 318, chains 317 and shafts 315 and 319, which comprise what I have termed the high speed elevator, is similar to the arrangement of the sprockets 196 and 198, chains 197 and shafts 195 and 199, that is, I provide a pair of transversely spaced endless chains on each side of the open space 55. A unit comprises a pair of transversely spaced chains 317, lower sprockets 316, upper sprockets 318, shafts 315 and 319, and there is a unit on each side of the space 55, operating in timed relation with each other through the medium of the shaft 310. Similar numerals designate similar mechanisms on both sides of the space 55.

The arrangement is such, as will be hereinafter described, that the chains 317 are adapted to have a limited upward and downward movement, that is, the chains do not completely rotate, but are adapted to move upwardly to a certain point and then back downwardly. Each transversely spaced pair of chains 317 has fixedly connected thereto a shelf 321 (Fig. 28). Each shelf 321 is provided with cut-out portions intermediate its length to clear the projecting portions of each of the shelves 205, as shown particularly in Fig. 30, the arrangement being such that the shelves 205 carrying a stack will pass downwardly through and beyond shelves 321, depositing the stack on said latter shelves.

At this time the shelves 321 have reached their upper limit of movement (see Figs. 28 and 30). About that time, as heretofore described, mechanism is set in motion by cams 224 and 225 to cause lower shelves 205 to be moved away from each other and simultaneously, the then upper shelves toward each other. Thus, when power is transmitted to chains 317 as will presently be described to cause said chains carrying shelves 321 to move downwardly, the then lower shelves 205 will have been moved out of the way and there will be no obstruction, while the then upper shelves 205 will have been toward each other to receive sheets and boards. Shelves 321 are moved downwardly by the chains 317 to their low point, at which time the bottom of the stack contacts with and is deposited upon a truck 322 which has previously been inserted in the space 55 between opposite sides of the elevator. The truck 322 with a wet stack may then be removed by hand and brought to any suitable drying apparatus, such as an oven or furnace.

Returning now to Fig. 22, and describing the mechanism for controlling the movement of the high speed lowering elevators, it will be remembered that the collar 297 is slidably keyed to shaft 295 and provided with clutch faces 300 and 301. When clutch face 300 meshes with a corresponding clutch face 323, gear 304 is driven in a direction which, through the mechanism previously described, will cause sprocket chains 317 to carry shelves 321 upwardly.

Correspondingly, when it is desired to lower shelves 321, clutch face 301 meshes with clutch face 324, which in turn causes gear 305 to rotate in a direction opposite to the gear 304, causing chains 317 to carry shelves 321 (which now carry the wet load) downwardly.

I will now describe the mechanism which actuates collar 297 to raise the high speed elevator from its normal lowermost position. Chain 197 has mounted at spaced points throughout its length cams 325 (Fig. 20) of wedge shape. Cam 325 is adapted to contact a roller 326 supported on the head end of a pin or screw bolt 327 (Fig. 24), which latter is threadedly mounted in a sliding bracket 328, surrounding a bar 329 supported in frame 296, which bar from both ends inwardly is hollowed to receive coil springs 330 and 331.

The arrangement is such that as the cam 325 contacts roller 326, pin 327 and bracket 328 are moved outwardly relative to the bar 330. The bar is also provided adjacent each end with a slot 332, the arrangement being such that as bracket 328 moves relative to the bar 329 by means of cam 325, pin 327 will move in slot 332, thus compressing spring 330.

Bar 329 is held temporarily from movement by means of the following mechanism: A screw threaded stud 333 (Figs. 22 and 25) projects inwardly from the frame 296, provided adjacent its end with an annular groove 334. A latch 335 is normally held in the groove 334 by means of a coil spring 336. Latch 335 is keyed to a stub shaft 337, which is fixedly connected with the bar 329. The shaft 337 has keyed to it a downwardly projecting arm 338 provided at its lower end with a roller 339, the arrangement being such that the roller 339 is adapted to contact the face of an auxiliary cam 340 carried by the chain 197 immediately adjacent to cam 325 (Fig. 27).

It will be noted that the cam 325 (Fig. 20) makes contact with roller 326 a short distance before roller 339 is brought into contact with cam 340 so that the spring 330 is compressed and the bar 329 put under spring tension before the latch 335 is released to permit bar 329 to slide. The normal position of the arm 338 is shown in full lines in Fig. 25, while the dotted lines show the arm 338 in its outermost position after having been forced out by cam 340. In rocking from full line position to dotted line position, as shown in Fig. 25, arm 338 being keyed to stub shaft 337 will rock shaft 337, latch 335 being fixedly secured to shaft 337 will also be rocked downwardly to the dotted line position shown in Fig. 25, at which time the latch 335 drops out of engagement with recess 334. At that time the bar 329 being under the tension of spring 330 will move outwardly, as shown in dotted lines in Fig. 23.

Disposed intermediate the length of bar 329 and connected to move therewith is an upwardly projecting arm 341. The connection between bar 329 and arm 341 may comprise a groove or recess 342 in the face of the bar to register with or receive a pin 343 projecting from the base of arm 341, the arrangement being such that the bar 329 moves horizontally while the arm 341 rocks on the pivot 344. The pivot 344 takes the form of a shaft supported in a bracket 345 (Fig. 21), which bracket in turn is supporting on frame 296. The shaft 344 is provided at its opposite end with a pivotally mounted yoke 346 carrying inwardly projecting pins 347 and 348 adapted to register with the annular groove 299 between flanges 298.

The arrangement is such that the yoke 346 is adapted to rock and pivot on shaft 344. The pin 347 is longer than pin 348 and is fixedly connected to arm 341 intermediate the length of the latter. Thus, as the bar 329 moves to the dotted line position shown in Fig. 23 it will carry with it arm 341. Arm 341, through its fixed connection with pin 347, will cause sliding clutch 297 to slide to one side, thus bringing clutch face 300 into registration with clutch face 323. This will impart rotation to bevel gear 304, and through mechanism heretofore described will start the high speed elevator moving upwardly.

To insure that the bar 329 will be held in the dotted line position illustrated in Fig. 23 for a time sufficient to permit the high speed elevator to move to its highest position, the chain 197 carries auxiliary cams 325' (Figs. 20 and 21), the only purpose of which is to insure positive means for holding the bar in outward position. The high speed elevator will thus positively be moved upwardly to its highest position.

It is now necessary to restore sliding clutch 297 to neutral position by mechanism which will now be described. Immediately below bevel gear 306 and keyed to shaft 307 is a worm wheel 349 supported by means of a bearing 350 (Fig. 21). Bearing 350 is provided with supporting arms 351 for supporting shaft 352. Shaft 352 has keyed to it a worm gear 353 adapted to register and mesh with the worm wheel 349. Shaft 352 has loosely supported thereon a collar 354 (Fig. 26) which forms part of a casting including the hollow guide 355. Shaft 352 has keyed to it discs 356. Since the mechanism for restoring the sliding clutch 297 to neutral from both of its movements is the same, I will describe the mechanism for restoring it to neutral from one movement, and it is to be understood that the description will cover the restoration from both movements, it being understood that there are two complete sets of mechanism exactly identical, but operating in reversed relation to each other.

Each disc 356 is provided on its periphery with a hardened cam 357 adapted to contact a roller 358 carried in a bracket 359 fixedly connected with a shaft 360. Thus, as movement is transmitted to worm gear 353 by worm 349, shaft 352 will be rotated; this in turn causes discs 356, having cams 357, to rotate, bringing one of said cams into contact with one of the rollers 358. Roller 358, being mounted in housing 359 fixedly connected to shaft 360, will cause said shaft to move upwardly relative to stationary guide 355 against the tension of coil spring 361. The upper end of shaft 360 is pivotally connected at 362 to short arm 363, which latter is pivoted at 364 to a bracket carried by supporting frame 296. A knife 365 pivoted to supporting structure 296 at 366 is connected at 367 with the arm 363, the arrangement being such that as arm 360 is forced upwardly in the manner heretofore described against the tension of spring 361, arm 363 will rock on pivot 364 to the dotted line position shown in Fig. 26. Raising of the arm 363 to dotted line position will rock the knife 365 on fixed pivot 366 downwardly to the dotted line position shown in Fig. 26.

The outer end of knife 365 is wedge-shaped to apply an increasing force against the outer end of pin 368, which pins project through bevel gears 304 and 305, being mounted relative thereto for independent sliding movement. Thus, as the knife 365 is rocked downwardly, the pin 368 with which it comes in contact is forced inwardly against the surface of the adjacent flange 298 of sliding clutch 297, thus disengaging the clutch from engagement with the corresponding clutch face with which it was in contact at that time. Thus, the sliding clutch 297 is restored to neutral position, at which time further movement of the high speed elevator is stopped.

At this time the high speed elevator on the stack lowering side of the machine is in its uppermost position and will remain in that position until it is mechanically and positively moved downwardly. Mechanism for moving the elevator downwardly will now be described.

A set of cams 370 (Fig. 20) are carried on the inside of the chain 197 following each set of cams 325', the end of cam 325' being spaced slightly from the end of cam 370, during which time the sliding clutch 297 is being returned to neutral position. In the movement of chain 197 around sprocket 198, the cam 370 will be brought into contact with a roller 371 fixedly connected to guide housing 328' (Fig. 23). Thus, as contact is made between cam 370 and roller 371, the roller and guide 328' will slide relative to bar 329 a distance equal to the length of slot 332 compressing spring 331, the bar 329 being held from movement by engagement of the finger 335 in recess 334 (Fig. 25).

As heretofore described, a cam 340, which is right behind cam 370, will be carried by chain 197 to perform identically the same action as previously described herein for the mechanism shown in Fig. 25, which need not again be described. When the finger 335 is released from annular recess 334, the bar 329, being under spring tension, will slide, carrying arm 341 in a direction opposite to the movement heretofore described, thus causing the sliding clutch collar to move and bring the clutch face 301 into registration with clutch face 324. In this manner movement is imparted through clutch face 324 to bevel gear 305, meshing with bevel gear 306. Through mechanism heretofore described, except that it now operates in a reverse direction, movement is imparted to the high speed elevator, causing same to be lowered.

As will be seen by reference to Fig. 20 of the drawings, the mechanism for causing the high speed elevator on the lowering side of the machine to be lowered is similar to the mechanism which caused the high speed elevator to be raised.

Likewise, the mechanism for breaking engagement between clutch faces 301 and 324 is also similarly operated, the mechanism being so timed that as the elevator reaches its lowest position, the cam 357 is in position to actuate knife 365 to contact pin 368 and move the sliding clutch collar 297 into neutral, at which time the high speed elevator stops, since it has reached its desired position.

I have just completed a description of the operation of the machine up to the point where the wet stack is removed on truck 322 and placed in a suitable dryer. I have described in detail the feelers and associated mechanism by which the travel of the wet elevator is controlled. I have also described in detail the two independently operable clutch mechanisms for controlling, respectively, the movement of the shelves 205 and the movement of the high speed elevator.

I will now refer to the stack raising or dry elevator, wherein a stack of dry sheets and interposed protectors, after removal from the drying oven, are wheeled into the space 62. The dry elevator and its associated mechanism, both operative and operable, are identical in construction and actuation to the wet elevator heretofore described in detail, with the exception, of course, that the various mechanisms operate in reverse. Therefore, it will be unnecessary to encumber and needlessly complicate this description and the drawings by a complete description of the operation of the dry elevator. For this reason, I have designated parts in the dry elevator corresponding to identical parts of the wet elevator by the same numerals with the addition of a prime, and I will now describe very briefly the major reverse movements peculiar to the dry elevator.

Drive is transmitted from main drive shaft 34 to gear 141' (Fig. 2) and from gear 141' through mechanism identical to that previously described and illustrated in Fig. 13, to the feelers 176'. The feelers 176' operate in identically the same manner as feelers 176 and for the same purpose. When the feelers are not allowed to rock to a previously predetermined point in order to contact the top sheet in the upwardly moving pile, this restricted rock is transmitted to arm 161', which in turn throws pawl 152' out and prevents engagement between the pawl and the ratchet wheel 156', thus imparting no movement to the upwardly moving chains 197'. This brief description will suffice to more or less completely describe the identity between the mechanism comprising the lowering elevator and corresponding mechanism comprising the raising elevator as far as the operation of the feelers and the movement of the low speed elevator is concerned.

I will now describe briefly the mechanism for moving the shelves 205' toward and away from each other at the proper time.

Power is transmitted from main drive shaft 34 to gear 226' meshing with gear 227' on shaft 228', which functions a clutch mechanism identical to clutch mechanism illustrated in Fig. 18, which clutch mechanism controls movement imparted to shaft 232' (Fig. 1a) and from the latter to upright shafts 236' to the worms 239' and eventually to cams 242', which function, through similar mechanism heretofore described, the bell cranks 252' and 258'. It may be well to here describe that the bell cranks 252' and 258' operate in exactly the opposite manner to the arms 252 and 258. That is, arms 252' swing in, causing the shelves 205' to be moved away from each other, the arms 252' contacting rollers 222' rotating gear segments 218' meshing with gears 217', which, through mechanism previously described, moves shelves 205' away from each other. Similarly, arms 258' cause shelves 205' to be moved toward each other to receive and remove the load from the shelves 321' carried by the high speed elevator. This briefly describes the mechanism for causing the shelves to move toward and away from each other.

I will now describe the mechanism for actuating the high speed elevator.

Drive is transmitted from main drive shaft 34 to gear 290' (Fig. 2) and from the latter to a clutch mechanism similar to that illustrated in Figs. 20, 21, 22 and 23. For the sake of clearness I have illustrated in Figs. 20a, 23a and 25a the arrangement of the clutching mechanism in reverse peculiar to the dry elevator. Thus, movement is transmitted at the proper time to the high speed elevator to raise and lower same.

*Ejecting mechanism*

As still another feature of the present invention I provide an ejecting mechanism, designated as a whole at 63 in Fig. 4, located directly above the dry elevator, driven in timed relation with the rest of the machine and adapted to automatically and positively remove a protector and the sheet therebelow from the top of the upwardly moving stack. The ejector functions to bring a pusher in contact with an edge of the top protector, positively forcing said protector to move along with said pusher and simultaneously apply suction through apertures in the protector to the sheet therebelow to positively cause said sheet to be carried along with the protector to separating mechanism. Cooperatively associated with the pusher and suction mechanism I provide means for facilitating the ejection by the pusher through the medium of eccentrically mounted gears whereby, at the instant the pusher comes in contact with the edge of a protector, the travel of the belt carrying the pusher is speeded up to, in reality, jerk the protector from the top of the pile.

Describing now the pusher and suction elements which comprise the main part of the ejector 63, and referring more particularly to Figs. 34 to 39, drive is transmitted from main drive shaft 34 to a bevel gear 372 meshing with a similar bevel gear 373 keyed to shaft 374 supported in conventional bearings in a casting 375 supported on the main frame A. Behind bevel gear 373 shaft 374 has keyed to it an eccentrically mounted gear 376 adapted to mesh with a similar eccentrically mounted gear 377 keyed to shaft 378 supported in conventional bearings in the casting 375. Shaft 378 has keyed to it a spur gear 379 adapted to mesh with a pinion 380 keyed to shaft 381, which latter is a long shaft extending transversely across the machine supported on the end carrying pinion 380 in conventional bearings forming part of casting 375 and supported on its other end in conventional bearings forming part of the casting 382. Intermediate its length and on the side adjacent casting 382 shaft 381 has keyed to it a spur gear 383 adapted in turn to mesh with a similar spur gear 384 mounted on a shaft 385. Shaft 385 is shorter than shaft 381 and is supported in suitable bearings on the frame 386. Frame 386 constitutes the support for the pusher, suction elements, belts and other mechanism constituting the ejector proper, which will presently be described.

The eccentrically mounted gears 376 and 377 are so positioned relative to their respective shafts that the speed of rotation of shaft 381, and in turn shafts 391, 392 and the mechanism driven thereby is alternately speeded and slowed up. That is, on the low point of the eccentrics, the pushers 393 are in contact with the rear edge of the top protector, at which time, or slightly before which time, the speed of travel of the pushers is greatly accelerated to, in fact, jerk the top protector from the pile and insure its positive ejection.

The mechanism constituting the ejector proper will now be described.

Intermediate its length, the shaft 385 has keyed to it a number of spaced sprockets 387 adapted to register with main drive sprocket chains 388. Small sprockets 389 and 390 are disposed below and on both sides of the large sprocket 387, the sprockets 389 and 390 being keyed, respectively, to shafts 391 and 392 suitably supported in conventional bearings in the support 386.

The sprocket chains 388 are arranged in pairs, as illustrated in Fig. 34. Between each pair of chains 388 and fixedly connected to travel with the chains 388 are pusher members designated as a whole 393. By reference to Fig. 37 it will be seen that each pusher member 393 comprises in combination an angle iron with a projection 394 having fixedly connected thereto a gauge 395, the latter functioning to contact the upper surface of the protector to prevent the projection 394 from dropping down too low, thus preventing projection 394 from contacting more than one protector at a time.

Returning now to Fig. 34, intermediate its length shaft 385 is also provided with larger pulleys 396, and shafts 391 and 392 are likewise provided with spaced pulleys 397 and 398 intermediate their length to accommodate endless belts 399, of which there are two transversely spaced from each other and operating parallel to the longitudinal plane of the machine. Intermediate its length, shaft 385 also has keyed to it additional sprockets 400 adapted to register with short endless sprocket chains 401, meshing in turn with small sprockets 402 keyed to shaft 403 journalled in suitable bearings on the arm 404 projecting from and fixedly connected to a channel iron 405 supported on the structure 386.

Shaft 403 is similarly provided with spaced pulleys 406 intermediate its length around which are adapted to travel auxiliary endless belts 407, of which there may be four, as illustrated in Fig. 34.

Endless belts 407 are also adapted to travel around pulleys 408 keyed to shaft 391. Projecting outwardly from shaft 391 are a number of spaced supporting arms 409 for suitably supporting the suction conduit 410. Auxiliary pulleys 411 are loosely mounted on conduit 410 for rotary movement thereabout, the purpose being to cause the belts 407 to travel around pulleys 411, said belts 407 being positively driven by pulleys 408 and 406. Conduit 410 is closed at one end, as shown at 412, and open at its other end to receive a flexible hose 413; flexible hose 413 being connected in a conventional manner to a source of suction (not shown). The pipe 410 is closed on its periphery through its entire length except at the points where the belts 407 are travelling thereabout, at which points it is provided with restricted openings 414 (Fig. 36) confined in and leading to suction chamber or housing 415.

Chamber 415 is closed except on its base, where it is provided with an elongated slot 416 for a purpose to be presently described. A spacing collar 417 may surround conduit 410, spacing the housing 415 a desired distance therefrom, said spacing collar 417 being similarly provided with a cut-out 418 registering with the cut-out 414 and communicating with the interior of chamber 415.

I also provide main suction chambers or housings 419 (Fig. 35) extending longitudinally of the machine and suitably supported at the base of supporting structure 386. The chambers 419 are air tight, except on their base, where staggered slotted openings 420 are provided for a purpose to be presently described.

Each belt 399 is provided intermediate its length with one or more flexible suction cups 421 fixedly connected thereto and adapted to travel therewith. Each suction cup 421 is provided with openings 422 passing from its surface through the cup and through similar openings in the belt whereby communication is established between the slots 420 and the suction chamber 419 at the proper time. Each suction chamber 419 is connected to a flexible hose 419', which latter is connected in a usual manner to a source of suction (not shown).

Similarly, each belt 407 is provided with one or more suction cups 423 intermediate its length fixedly connected thereto and adapted to travel therewith, each cup 423 being provided with openings 424 extending from its outer surface through and in registration with similar openings in the belt 407 to establish communication between the suction cups 423 and the slot 416 in suction chamber 415, at the desired time.

Each protector 60 comprises, in the present instance, a three-ply structure consisting of a corrugated ply enclosed between and united by conventional covering sheets (Fig. 41). It may be well to here state that the protector 60, if desired, may be a solid fibrous structure made of one or a number of fibrous plies of suitable thickness. According to the particular embodiment of the invention illustrated in the drawings, each protector 60 is rectangular, having a length of 29 inches and a width of 27 inches, although it is to be understood that the protector may be larger or smaller than this particular embodiment. Intermediate its edges, each protector is provided with cut-outs 425 of various sizes and shapes, but conforming substantially to a slight enlargement of the shape and size of the oil blots 426. Also, intermediate the edges of each protector 60 it may be provided with elongated slot-like openings 427 adapted to accommodate the suction cups 421 in a manner to be presently described.

Adjacent one lateral edge, preferably the front edge, each protector 60 is also provided with inwardly slotted openings 428 adapted to register at the proper time with suction cups 423 in a manner to be presently described. On the same edge, each protector 60 may be provided with the eyelets 429 adapted to receive the lugs 430 (Figs. 10a and 11) carried by board gripping fingers 87.

Describing now the method and mechanism for positively ejecting a protector 60 and sheet 59 therebelow from the top of the stack, assume that the mechanism is in the position illustrated in Figs. 35, 36 and 37. Drive is transmitted through shaft 34, gear 372, gear 373, shaft 374, eccentrically mounted gears 376 and 377, spur gear 379, pinion 380 to shaft 381, gears 383 and 384 to shaft 385. From shaft 385 to sprocket chains 388 and 401, this in turn being transmitted to belts 399 and 407.

Suction is always maintained on conduit 410 and suction chambers 415 and 419. The pusher members 393 carried by chains 388 are in contact with the rear edge of the top protector, it being understood that the protector is uppermost and the sheet which it protects is immediately therebelow. At the time that pusher members 393 are in contact with the rear edge of the top protector, suction cups 421 are in registration with slotted openings 427 in the protector and also in registration with the slots 420 in suction chamber 419. At the same time suction cups 423 are in registration with slotted openings 428 in the front edge of the protector, which suction cups, through the medium of communicating ducts 424, being also in communication with suction chamber 415.

At this time, therefore, suction is being applied to the sheet 59 at its front edge and intermediate its width. As the chains 388 carrying pusher members 393 and belts 399 and 407 carrying suction cups 421 and 423 are rotated by the drive just described, the pusher members 393 will push and slide the top protector from the pile, said pusher members continuing to travel to the front end of the ejector. Simultaneously, suction is being applied as described in a number of spaced points to the sheet 59, causing said sheet to be picked up by said suction and carried with the protector to a separator 66, which separates the sheet from the protector by means of suction imposed on the separator 66 in an obvious manner, said dry sheets designated 59' in Fig. 4 being collected in a suitable receptacle, while the protectors are picked up by the gripping fingers in a manner heretofore described in describing Figs. 4 and 12.

I have only illustrated in Fig. 34 one set of pusher members 393. It is to be understood that there may be one or more pusher members suitably spaced throughout the length of the chains 388 and timed to contact the protector at the right instant. Similarly, there may be one or more suction cups 421 and 423 suitably spaced throughout the length of belts 399 and 407 to correspond with the number of ejectors.

Since the suction cups 421 and 423 project outwardly from belts 399 and 407, some provision must be made for lifting the frame 386 and the entire mechanism supported thereby so that said suction cups 421 and 423 will clear the upper surface of the top protector until said suction cups 421 and 423 can register respectively with the slots 427 and 428, at which time the frame 386 carrying the entire ejecting mechanism will lower to a position substantially in contact with the upper surface of the top protector. The means for raising and lowering the supporting structure 386 carrying the entire ejecting mechanism in timed relation will now be described.

Starting with the drive for said lowering and raising mechanism, power is transmitted from main drive shaft 34 through bevel gears 372 and 373 keyed to shaft 374. Also keyed to shaft 374 behind the eccentrically mounted gear 376 is a gear 431 (Fig. 38) adapted to mesh with a spur gear 432 keyed to shaft 433 journalled in suitable bearings in the casting 375. Gear 432 in turn meshes with a similar spur gear 434 keyed to shaft 435, also suitably journalled in bearings in casting 375. On the shaft 435 there is also keyed a similar spur gear 436 in front of gear 434, adapted to mesh with spur gear 437 keyed to shaft 438, which shaft is similar in length to shaft 381, being journalled on one end in suitable bearings provided in casting 375, and at its other end journalled in suitable bearings provided in casting 382. Intermediate the length of shaft 438 and preferably adjacent the ends thereof the shaft has fixedly connected thereto cams 439, adapted to rotate in the direction illustrated by the arrow in Fig. 35. The face of each cam 439 is adapted to contact a roller 440 carried by a bell crank arm 441 pivotally mounted on shaft 381.

Shafts 381 and 438 are so long that they require auxiliary support intermediate their length, which is provided by the supporting structure 442 suspended from angle irons 443 forming part of main frame A, it being understood that supporting structure 442 and angle irons 443 are stationary, while supporting structure 386 carrying the ejecting mechanism is raised and lowered.

The other end of bell crank lever 441 surrounds shaft 385, as illustrated clearly in Fig. 35. Thus, as the cams 439 are rotated by means of the drive just described, the bell crank lever 441 will rock on pivot 381, raising the frame 386 and the entire ejecting mechanism a distance sufficient to permit the suction cups 421 and 423 to clear the top protection. It is to be noted that the face of cam 439 is formed so that the ejecting mechanism is raised gradually, but drops rather abruptly and quickly. To minimize the shock attendant upon the abrupt and quick lowering of the ejecting mechanism, I provide an adjustable counterbalance comprising a rod 444 and adjustable counterweight 445.

The arrangement of the gearing illustrated particularly in Figs. 38 and 39 is such that the cams 439 are functioned in timed relation with the main drive and the drive for the ejectors and suction pads whereby the ejecting mechanism is raised and lowered at the proper time.

In Figs. 42, 43 and 44 I have illustrated plan views of the sheet during different stages of manufacture. For instance, in Fig. 42 I have illustrated one side of the sheet after it has had applied thereto borders 446 by means of cylinder 3 (Fig. 3) and return addresses 447 by means of cylinder 5 (Fig. 3). It is to be understood that the dotted lines illustrated in Figs. 42, 43 and 44 are not actually printed, but are shown in the drawings to illustrate the final form of the flat envelope blank as the blank is eventually cut from the sheet.

In Fig. 43 I have illustrated the sheet reversed relative to Fig. 42 after it has had applied thereto tint 448 by means of the tinting cylinder 7 (Fig. 3). It should be observed that the edge of the tinting is inside of the edge of the final blank as cut from the sheet to leave room for the application of a suitable adhesive thereto. It should also be observed in Fig. 43 that the space to be occupied by the oil forming the window is left untinted.

Fig. 44 is a view similar to Fig. 43 illustrating the blank after having had the oil blots 449 applied thereto, which blots, after drying, will render those parts of the sheet to which they are applied transparent to permit reading matter to be read therethrough.

This completes a description of the mechanism and its operation. It is to be observed that all of the different mechanisms operate in timed relation, the arrangement being such that all of such mechanisms receive their drive direct from main drive shaft 34, thus all of the different mechanisms forming part of the complete combination are actuated and driven in timed relation relative to every other part of the machine.

While I have illustrated and described the utility of the present invention as applied to the manufacture of blanks for one-piece window envelopes, it is to be understood that the process and apparatus features involved are not to be limited solely to use in the manufacture of one-piece window envelope blanks, but can be used with equal facility in all types of slip sheeting work wherein a protector of any kind must be interposed between two sheets.

I have used the expressions "oil" and "oil blot" in the specification and claims hereof. It is to be understood that this expression is to be interpreted as embracing and including all types of solutions or substances capable of functioning as saturants for the purpose of application to a sheet to render the spot covered by the solution or substance transparent.

It is to be understood that different types of saturant are preferably used for different grades of paper. Naturally, one type of saturant may dry more quickly than another. I have described in the foregoing specification the step of drying a wet stack by subjecting it to heat in an oven. It is to be understood, of course, that this is purely illustrative and that I may or may not dry by heat. As a matter of fact, with some types of saturants a better drying takes place at atmospheric temperature in the open.

I have also described the application to the continuously advancing sheet of a border and return address, and a transparency-destroying tint. It is to be understood that any one or all of these may be eliminated without interfering with the present invention.

I claim as my invention:

1. A machine comprising in combination, means for feeding singly wet sheets and protectors therefor, stack accumulating mechanism receiving said sheets and protectors from said feeding means, means for lowering said stack to permit removal thereof for drying, means for elevating a dry stack, means for ejecting dry sheets and protectors from said dry stack, and means for driving and actuating said mechanisms in synchronized relation.

2. A machine comprising in combination, means for feeding singly wet sheets and protectors therefor, stack accumulating mechanism receiving said wet sheets and protectors from said feeding means, means for lowering said stack as sheets and protectors continue to accumulate thereon, means for interrupting accumulation on said stack when the stack reaches a predetermined height and simultaneously starting accumulation of a new stack to permit removal of said interrupted stack for drying, means for elevating a dry stack, means for ejecting dry sheets and protectors from said dry stack, and means for driving and actuating said mechanisms in synchronized relation.

3. A machine comprising in combination, means for feeding singly wet sheets and protectors therefor, stack accumulating mechanism receiving said sheets and protectors from said feeding means, means for lowering said stack to permit removal thereof for drying, means for elevating a dry stack, means for ejecting dry sheets and protectors from said dry stack, and means receiving power from a single power source for driving and actuating said mechanisms in synchronized relation.

4. A machine comprising in combination, means for feeding singly wet sheets and protectors therefor, stack accumulating mechanism receiving said sheets and protectors from said feeding means, means for lowering said stack to permit removal periodically of a predetermined number for drying, means for elevating a dry stack, means for ejecting dry sheets and protectors from said dry stack, means for separating the dry sheets from their respective protectors, means for collecting the dry sheets, and means receiving power from a single power source for driving and actuating all of said mechanisms in synchronized relation.

5. In combination, means for successively accumulating stacks of wet sheets and interposed protectors, means for lowering each successive stack to permit its removal for drying when it reaches a predetermined height, means for successively elevating dry stacks, one at a time, means cooperatively associated therewith for ejecting singly a sheet and protector from the dry stack, and means for driving and actuating all of said mechanisms in synchronized relation.

6. In combination, means for successively accumulating stacks of wet sheets and interposed protectors, comprising means for feeding wet sheets and protectors singly thereto, means for lowering each successive stack to permit its removal for drying when it reaches a predetermined height, means for successively elevating dry stacks, one at a time, means cooperatively associated therewith for ejecting singly a sheet and protector from the dry stack, and means for driving and actuating all of said mechanisms in synchronized relation from a single source of power.

7. In combination, supporting structure, means for feeding a continuous strip of paper from a roll into the receiving end of said structure, means for applying oil blots to spaced areas of said advancing strip, severing means acting on said strip to sever same into smaller sheets containing a predetermined number of spaced oil blots, a conveyor receiving said severed wet sheets from the severing means, a second conveyor carrying a protector for each of said wet severed sheets, stack lowering mechanism receiving said sheets and protectors from said conveyors, means to permit removal of a stack of wet sheets and interposed protectors of a predetermined height from said stack lowering mechanism, stack raising mechanism receiving a stack of dry sheets and interposed protectors, ejecting mechanism positioned adjacent the stack raising mechanism to eject singly a protector and dry sheet as a unit, and means for driving and actuating all of said mechanisms in synchronized relation from a single power source.

8. In combination, supporting structure, means for feeding a continuous strip of paper from a roll into the receiving end of said structure, means for applying oil blots to spaced areas of said advancing strip, severing means acting on said strip to sever same into smaller sheets containing a predetermined number of spaced oil blots, a conveyor receiving said severed wet sheets from the severing means, a second conveyor carrying a protector for each of said wet severed sheets, stack lowering mechanism receiving said sheets and protectors from said conveyors, means to permit removal of a stack of wet sheets and interposed protectors of a predetermined height from said stack lowering mechanism, stack raising mechanism receiving a stack of dry sheets and interposed protectors, ejecting mechanism positioned adjacent the stack raising mechanism to eject singly a protector and dry sheet as a unit, means for separating each sheet from its protector, means for accumulating said sheets, and means for driving and actuating all of said mechanisms in synchronized relation from a single power source.

9. A machine comprising in combination, means for feeding singly wet sheets and protectors therefor, stack accumulating mechanism receiving said sheets and protectors from said feeding means, means for lowering said stack to permit removal thereof for drying, means for elevating a dry stack, means for ejecting dry sheets and protectors from said dry stack, feeler mechanisms cooperatively associated with each of the stack lowering and stack elevating mechanisms for imparting controlled movement thereto, and means for driving and actuating all of said mechanisms in synchronized relation.

10. A machine comprising in combination, means for feeding singly wet sheets and protectors therefor, stack accumulating mechanism receiving said sheets and protectors from said feeding means, means for lowering said stack to permit removal thereof for drying, means for elevating a dry stack, means for ejecting dry sheets and protectors from said dry stack, the stack lowering and stack elevating mechanisms each comprising a low speed elevator and a high speed elevator, and means for driving and actuating said mechanisms in synchronized relation.

11. A machine comprising in combination, means for feeding singly wet sheets and protectors therefor, stack accumulating mechanism receiving said sheets and protectors from said feeding means, means for lowering said stack to permit removal thereof for drying, means for elevating a dry stack, means for ejecting dry sheets and protectors from said dry stack, the stack lowering and stack elevating mechanisms each comprising a low speed elevator and a high speed elevator, feeler mechanism cooperatively associated with each of the stack lowering and stack elevating mechanisms for imparting controlled movement to said low speed elevators, and means for driving and actuating said mechanisms in synchronized relation.

12. A machine comprising in combination, means for feeding singly wet sheets and protectors therefor, stack accumulating mechanism receiving said sheets and protectors from said feeding means, means for lowering said stack to permit removal thereof for drying, means for elevating a dry stack, means for ejecting dry sheets and protectors from said dry stack, the stack lowering and stack elevating mechanisms each comprising a low speed elevator and a high speed elevator, each low speed elevator comprising longitudinally spaced endless chains carrying movable shelves adapted to be actuated successively toward and away from each other, and means for driving all of said mechanisms in synchronized relation.

13. A machine comprising in combination, means for feeding singly wet sheets and protectors therefor, stack accumulating mechanism receiving said sheets and protectors from said feeding means, means for lowering said stack to permit removal thereof for drying, means for elevating a dry stack, means for ejecting dry sheets and protectors from said dry stack, the stack lowering and stack elevating mechanisms each comprising a low speed elevator and a high speed elevator, each high speed elevator comprising longitudinally spaced endless chains having shelves fixedly connected to move therewith, and means for driving and actuating said mechanisms in synchronized relation.

14. A machine comprising in combination, means for feeding singly wet sheets and protectors therefor, stack accumulating mechanism receiving said sheets and protectors from said feeding means, means for lowering said stack to permit removal thereof for drying, means for elevating a dry stack, means for ejecting dry sheets and protectors from said dry stack, the stack lowering and stack elevating mechanisms each comprising a low speed elevator and a high speed elevator, each low speed elevator comprising longitudinally spaced chains carrying movable shelves adapted to be actuated successively toward and away from each other, each high speed elevator comprising longitudinally spaced chains having shelves fixedly connected to travel therewith, and means for driving and actuating said mechanisms in synchronized relation.

15. A machine comprising in combination, means for feeding singly wet sheets and protectors therefor, stack accumulating mechanism receiving said sheets and protectors from said feeding means, means for lowering said stack to permit removal thereof for drying, means for elevating a dry stack, means for ejecting dry sheets and protectors from said dry stack, the stack lowering and stack raising mechanisms each comprising a low speed elevator and a high speed elevator, each low speed elevator comprising longitudinally spaced endless chains carrying movable shelves, clutch mechanism, and cams carried by chains of the low speed elevators to actuate the movable shelves toward or away from each other and means for actuating the stack lowering and stack raising mechanism in synchronized relation.

16. A machine comprising in combination, means for feeding singly wet sheets and protectors therefor, stack accumulating mechanism receiving said sheets and protectors from said feeding means, means for lowering said stack to permit removal thereof for drying, means for elevating a dry stack, means for ejecting dry sheets and protectors from said dry stack, the stack lowering and stack elevating mechanisms each comprising a low speed elevator and a high speed elevator, each low speed elevator comprising longitudinally spaced endless chains carrying movable shelves, clutch mechanism, cams carried by the chains of the low speed elevators to actuate the high speed elevators, and means for driving and actuating said mechanisms in synchronized relation.

17. In combination, supporting structure, means for feeding a continuous strip of paper from a roll into the receiving end of said structure, means for applying oil blots to spaced areas of said advancing strip, severing means acting on said strip to sever same into smaller sheets containing a predetermined number of spaced oil blots, a conveyor receiving said severed wet sheets from the severing means, a second conveyor carrying a protector for each of said wet severed sheets, stack lowering mechanism receiving said sheets and protectors from said conveyors, means to permit removal of a stack of wet sheets and interposed protectors of a predetermined height from said stack lowering mechanism, stack raising mechanism receiving a stack of dry sheets and interposed protectors, ejecting mechanism positioned adjacent the stack raising mechanism to eject singly a protector and dry sheet as a unit, said protector conveyor carrying protector and sheet grippers, cams fixedly connected to said supporting structure in the path of said conveyor to successively actuate said grippers, and means for driving and actuating all of said mechanisms in synchronized relation from a single power source.

18. In combination, supporting structure, means for feeding a continuous strip of paper from a roll into the receiving end of said structure, means for applying oil blots to spaced areas of said advancing strip, severing means acting on said strip to sever same into smaller sheets containing a predetermined number of spaced oil blots, a conveyor receiving said severed wet sheets from the severing means, a second conveyor carrying a protector for each of said wet severed sheets, stack lowering mechanism receiving said sheets and protectors from said conveyors, means to permit removal of a stack of wet sheets and interposed protectors of a predetermined height from said stack lowering mechanism, stack raising mechanism receiving a stack of dry sheets and interposed protectors, ejecting mechanism positioned adjacent the stack raising mechanism to eject singly a protector and dry sheet as a unit, said protector conveyor comprising two transversely spaced endless chains travelling longitudinally of the machine and carrying a plurality of spaced gripper mechanisms extending across the machine between the chains, and means for driving and actuating all of said mechanisms in synchronized relation from a single power source.

19. In combination, supporting structure, means for feeding a continuous strip of paper from a roll into the receiving end of said structure, means for applying oil blots to spaced areas of said advancing strip, severing means acting on said strip to sever same into smaller sheets containing a predetermined number of spaced oil blots, a conveyor receiving said severed wet sheets from the severing means, a second conveyor carrying a protector for each of said wet severed sheets, stack lowering mechanism receiving said sheets and protectors from said conveyors, means to permit removal of a stack of wet sheets and interposed protectors of a predetermined height from said stack lowering mechanism, stack raising mechanism receiving a stack of dry sheets and interposed protectors, ejecting mechanism positioned adjacent the stack raising mechanism to eject singly a protector and dry sheet as a unit, said protector conveyor comprising two transversely spaced endless chains travelling longitudinally of the machine and carrying a plurality of spaced gripper mechanisms extending across the machine between the chains, each gripper mechanism comprising a plurality of spaced protector grippers and a plurality of independently operable sheet grippers, and means for driving and actuating all of said mechanisms in synchronized relation from a single power source.

20. In combination, supporting structure, means for feeding a continuous strip of paper from a roll into the receiving end of said structure, means for applying oil blots to spaced areas of said advancing strip, severing means acting on said strip to sever same into smaller sheets containing a predetermined number of spaced oil blots, a conveyor receiving said severed wet sheets from the severing means, a second conveyor carrying a protector for each of said wet severed sheets, stack lowering mechanism receiving said sheets and protectors from said conveyors, means to permit removal of a stack of wet sheets and interposed protectors of a predetermined height from said stack lowering mechanism, stack raising mechanism receiving a stack of dry sheets and interposed protectors, ejecting mechanism positioned adjacent the stack raising mechanism to eject singly a protector and dry sheet as a unit, said protector conveyor comprising two transversely spaced endless chains travelling longitudinally of the machine and carrying a plurality of spaced gripper mechanisms extending across the machine between the chains, each gripper mechanism comprising a plurality of spaced protector grippers and a plurality of independently operable sheet grippers, each of said protector grippers being maintained normally closed under spring tension, cams fixed to said supporting structure for positively opening said protector grippers, and means for driving and actuating all of said mechanisms in synchronized relation from a single power source.

21. In combination, supporting structure, means for feeding a continuous strip of paper from a roll into the receiving end of said structure, means for applying oil blots to spaced areas of said advancing strip, severing means acting on said strip to sever same into smaller sheets containing a predetermined number of spaced oil blots, a conveyor receiving said severed wet sheets from the severing means, a second conveyor carrying a protector for each of said wet severed sheets, stack lowering mechanism receiving said sheets and protectors from said conveyors, means to permit removal of a stack of wet sheets and interposed protectors of a predetermined height from said stack lowering mechanism, stack raising mechanism receiving a stack of dry sheets and interposed protectors, ejecting mechanism positioned adjacent the stack raising mechanism to eject singly a protector and dry sheet as a unit, said protector conveyor comprising two transversely spaced endless chains travelling longitudinally of the machine and carrying a plurality of spaced gripper mechanisms extending across the machine between the chains, each gripper mechanism comprising a plurality of spaced protector grippers and a plurality of independently operable sheet grippers, each of said sheet grippers being maintained normally opened under spring tension, cams fixed to the supporting structure for positively closing said sheet grippers, and means for driving and actuating all of said mechanisms in synchronized relation from a single power source.

22. A machine comprising in combination, means for feeding singly wet sheets and protectors therefor, stack accumulating mechanism receiving said sheets and protectors from said feeding means, means for lowering said stack to permit removal thereof for drying, means for elevating a dry stack, means for ejecting dry sheets and protectors from said dry stack, the stack lowering and stack elevating mechanisms each comprising a low speed elevator and a high speed elevator, each low speed elevator comprising longitudinally spaced endless chains carrying movable shelves adapted to be actuated successively toward and away from each other, each of said movable shelves being provided with a rack adapted to engage a rack gear carried by the endless chains forming part of the low speed elevator, and means for driving and actuating all of said mechanisms in synchronized relation.

23. A machine comprising in combination, a conveyor for feeding wet sheets, a separate conveyor carrying a protector for each of said wet sheets and guided on an endless track, stack lowering mechanism receiving said sheets and protectors from said conveyors to permit removal of a stack for drying, stack elevating mechanism receiving a stack of dry sheets and interposed protectors, ejecting mechanism positioned adjacent the stack elevating mechanism to eject singly a protector and dry sheet as a unit, and means for driving and actuating all of said mechanisms in synchronized relation.

24. A machine comprising in combination, means for feeding singly wet sheets and protectors therefor, stack accumulating mechanism receiving said sheets and protectors from said feeding means, means for lowering said stack to permit removal thereof for drying, means for elevating a dry stack, means for ejecting dry sheets and protectors from said dry stack, the stack lowering and stack elevating mechanisms each comprising a low speed elevator and a high speed elevator, each low speed elevator comprising longitudinally spaced chains carrying movable shelves adapted to be actuated successively toward and away from each other, each high speed elevator comprising longitudinally spaced chains having shelves fixedly connected to travel therewith, said movable and fixed shelves being provided with staggered cut-outs and projections to permit the movable shelves to clear the fixed shelves, or vice versa, and means for driving and actuating said mechanisms in synchronized relation.

25. A machine comprising in combination, means for feeding singly wet sheets and protectors therefor, stack accumulating mechanism receiving said sheets and protectors from said feeding means, means for lowering said stack to permit removal thereof for drying, means for elevating a dry stack, means for ejecting dry sheets and protectors from said dry stack, said ejector means comprising a pusher adapted to contact the rear edge of the top protector in the dry stack and suction elements adapted to contact the sheet, and means for driving and actuating said mechanisms in synchronized relation.

26. A machine comprising in combination, means for feeding singly wet sheets and protectors therefor, stack accumulating mechanism receiving said sheets and protectors from said feeding means, means for lowering said stack to permit removal thereof for drying, means for elevating a dry stack, means for ejecting dry sheets and protectors from said dry stack, said ejector means comprising a pusher adapted to contact the rear edge of the top protector in the dry stack and suction elements adapted to contact the sheet, the speed of travel of said pusher being intermittently accelerated by eccentrically mounted gears when the pusher comes in contact with the rear edge of said top protector, and means for driving and actuating said mechanism in synchronized relation.

27. A machine comprising in combination, a conveyor for feeding wet sheets, a separate conveyor carrying a protector for each of said wet sheets and guided on an endless track, stack lowering mechanism receiving said sheets and protectors from said conveyors to permit removal of a stack for drying, stack elevating mechanism receiving a stack of dry sheets and interposed protectors, ejecting mechanism positioned adjacent the stack elevating mechanism to eject singly a protector and dry sheet as a unit, said endless track being raised to clear the ejector mechanism, and means for driving and actuating all of said mechanisms in synchronized relation.

28. A machine comprising in combination, means for feeding singly wet sheets and protectors therefor, stack accumulating mechanism receiving said sheets and protectors from said feeding means, means for lowering said stack to permit removal thereof for drying, means for elevating a dry stack, means for ejecting dry sheets and protectors from said dry stack, the stack lowering and stack elevating mechanisms each comprising a low speed elevator and a high speed elevator, each low speed elevator comprising longitudinally spaced chains carrying movable shelves adapted to be actuated successively toward and away from each other, each high speed elevator comprising longitudinally spaced chains having shelves fixedly connected to travel therewith, two separate cams fixed to the chains comprising the low speed elevator, two independently operable clutches cooperatively associated respectively with the low speed elevators and high speed elevators to actuate the movable shelves and high speed elevators intermittently by means of said separate cams, and means for driving and actuating said mechanisms in synchronized relation.

29. A method which comprises accumulating singly wet sheets and interposed protectors in a vertical stack, lowering said stack to permit the continued accumulation of sheets and protectors on the top thereof, periodically interrupting further accumulation on said stack when it has reached a predetermined height and starting the accumulation of a new stack, drying the interrupted stack, vertically elevating said dry stack, ejecting singly a dry sheet and protector as a unit from the top of said dry stack, separating each dry sheet from its protector and collecting the dry sheets.

30. A method which comprises applying oil blots to spaced areas of a continuously advancing sheet, severing said sheet into smaller sheets each containing a plurality of spaced wet oil blots, accumulating said wet sheets in a vertical stack, interposing therebetween during accumulation a protector for each wet sheet, lowering said stack to permit continued accumulation of wet sheets and protectors on the top of said stack, interrupting further accumulation when the stack has reached a predetermined height and commencing the accumulation of a new stack, drying said interrupted stack, positively ejecting from the top of the dry stack a dry sheet and protector as a unit, and separating each dry sheet from its protector.

31. A machine comprising in combination, means for feeding singly wet sheets and protectors therefor, stack accumulating mechanism receiving said sheets and protectors from said feeding means, means for lowering said stack to permit continued accumulation of protectors and sheets on the top thereof, means for supporting and elevating a second stack comprising a plurality of protectors, means for ejecting protectors singly from said second stack, and means for driving and actuating said mechanisms in synchronized relation.

32. A machine comprising in combination, means for feeding singly wet sheets and protectors therefor, stack accumulating mechanism receiving said wet sheets and protectors from said feeding means, means for lowering said stack as sheets and protectors continue to accumulate thereon, means for interrupting accumulation on said stack when said stack reaches a predetermined height and simultaneously starting accumulation of a new stack, means for supporting and elevating a second stack comprising a plurality of protectors, means for ejecting protectors singly from said second stack and means for driving and actuating said mechanisms in synchronized relation.

33. A machine comprising in combination, means for feeding singly wet sheets and protectors therefor, stack accumulating mechanism receiving said sheets and protectors from said feeding means, means for lowering said stack as sheets and protectors continue to accumulate thereon, means for interrupting accumulation on said stack when the stack reaches a predetermined height and simultaneously starting accumulation of a new stack to permit removal of said interrupted stack for drying, means for successively elevating, one at a time, vertical stacks each comprising a plurality of protectors, means for ejecting protectors singly from the vertical stack being elevated and means receiving power from a single power source for driving and actuating all of said mechanisms in synchronized relation.

34. In combination, supporting structure, means for feeding a continuous strip of paper from a roll into the receiving end of said structure, means for applying oil blots to spaced areas of said advancing strip, severing means acting on said strip to sever same into smaller sheets containing a predetermined number of spaced oil blots, stack accumulating mechanism, conveying means for delivering said severed wet sheets and protectors to said stack accumulating mechanism, means for lowering said stack as sheets and protectors continue to accumulate thereon, means for interrupting accumulation on said stack when the stack reaches a predetermined height and simultaneously starting accumulation of a new stack to permit removal of said interrupted stack for drying, means for supporting and elevating a second stack comprising a plurality of protectors, means for ejecting protectors singly from said stack, and means for driving and actuating all of said mechanisms in synchronized relation from a single power source.

35. In combination, supporting structure, means for feeding a continuous strip of paper from a roll into the receiving end of said structure, means for applying oil blots to spaced areas of said advancing strip, severing means acting on said strip to sever same into smaller sheets containing a predetermined number of spaced oil blots, stack accumulating mechanism, conveying means for delivering said severed wet sheets and protectors therefor to the stack accumulating mechanism, means for lowering said stack as sheets and protectors continue to accumulate thereon, means for interrupting accumulation on said stack when the stack reaches a predetermined height and simultaneously starting accumulation of a new stack to permit removal of said interrupted stack, said conveying means comprising transversely spaced endless chains travelling longitudinally of the machine and carrying a plurality of spaced gripper mechanisms extending transversely of the machine between the chains, and means for driving and actuating all of said mechanisms in synchronized relation from a single power source.

36. In combination, supporting structure, means for feeding a continuous strip of paper from a roll into the receiving end of said structure, means for applying oil blots to spaced areas of said advancing strip, severing means acting on said strip to sever same into smaller sheets containing a predetermined number of spaced oil blots, stack accumulating mechanism, conveying means for delivering said severed wet sheets and protectors therefor to the stack accumulating mechanism, means for lowering said stack as sheets and protectors continue to accumulate thereon, means for interrupting accumulation on said stack when the stack reaches a predetermined height and simultaneously starting accumulation of a new stack to permit removal of said interrupted stack, said conveying means comprising transversely spaced endless chains travelling longitudinally of the machine and carrying a plurality of spaced gripper mechanisms extending transversely of the machine between the chains, each gripper being maintained normally closed under spring tension, cams fixed to said supporting structure for positively opening said grippers, and means for driving and actuating all of said mechanisms in synchronized relation from a single power source.

37. A method which comprises maintaining a vertical stack comprising a plurality of protectors, removing protectors from the top of said stack and carrying the same forwardly in seriatim, applying oil blots to spaced areas of a continuously advancing web of paper, severing said web into unit sheets of dimensions substantially equal to the dimensions of the protectors, carrying said sheets forwardly in seriatim in timed relationship with the movement of said protectors, bringing each of said sheets into registration with each of said protectors in seriatim, carrying forwardly the protectors and sheets as units, and depositing each of the units upon the top of a descending stack.

38. A method which comprises elevating a vertical stack comprising a plurality of protectors, removing said protectors in seriatim from the top of said stack, applying oil blots to spaced areas of a continuously advancing web of paper, severing said web into sheets each containing a plurality of spaced oil blots, carrying said sheets forwardly and bringing the same into contact with said protectors, passing each of said sheets in contact with a protector forwardly as a unit, depositing said units upon the top of a vertical stack and maintaining the top of said stack in substantially a fixed horizontal plane.

39. A method which comprises applying oil blots to spaced areas of a continuously advancing web of paper, severing said web into sheets each containing a plurality of spaced wet oil blots, carrying said sheets forwardly in seriatim, feeding a plurality of protectors forwardly in seriatim in timed relation with the passage of said wet sheets, bringing each of said sheets into contact with a protector, passing each sheet and a protector forwardly as a unit, accumulating said wet sheets and protectors in a vertical stack and lowering said stack to permit continued accumulation of wet sheets and protectors on the top of said stack.

40. A method which comprises feeding singly wet sheets and protectors therefor whereby a sheet and a protector are fed forwardly as a unit while the protector is maintained substantially immovable with respect to the sheet, accumulating said sheets and protectors in a vertical stack, lowering said stack to permit continued accumulation of wet sheets and protectors on the top of the stack, periodically interrupting accumulation on said stack when the stack reaches a predetermined height and simultaneously starting accumulation of a new stack.

41. A method which comprises elevating a vertical stack comprising a plurality of protectors, removing said protectors in seriatim from the top of said stack, feeding said protectors forwardly and bringing the same into registration with sheets each containing a plurality of spaced wet impressions, passing each of said sheets in registration with a protector forwardly as a unit, accumulating said wet sheets and protectors in a vertical stack, lowering said stack to permit accumulation of wet sheets and protectors on the top of the stack, periodically interrupting the removal of protectors in seriatim from the stack being elevated and simultaneously starting the removal of protectors in seriatim from the top of another stack being elevated.

ERNEST W. SAUERMAN.